(12) United States Patent
Zhang et al.

(10) Patent No.: US 11,540,037 B2
(45) Date of Patent: Dec. 27, 2022

(54) OPEN EARPHONE

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 6 days.

(21) Appl. No.: 17/169,467

(22) Filed: Feb. 7, 2021

(65) Prior Publication Data

US 2021/0160606 A1    May 27, 2021

Related U.S. Application Data

(63) Continuation of application No. 17/129,733, filed on Dec. 21, 2020, now Pat. No. 11,425,481, which is a
(Continued)

(30) Foreign Application Priority Data

| Apr. 30, 2019 | (CN) | 201910364346.2 |
| Sep. 19, 2019 | (CN) | 201910888067.6 |
| Sep. 19, 2019 | (CN) | 201910888762.2 |

(51) Int. Cl.
  *H04R 1/10*  (2006.01)
  *H04R 1/02*  (2006.01)
  (Continued)

(52) U.S. Cl.
  CPC .......... *H04R 1/1016* (2013.01); *G02C 11/00* (2013.01); *G02C 11/10* (2013.01); *G06F 3/16* (2013.01);
  (Continued)

(58) Field of Classification Search
  CPC . H04R 1/00; H04R 1/02; H04R 1/026; H04R 1/028; H04R 1/10; H04R 1/1008;
  (Continued)

(56) References Cited

U.S. PATENT DOCUMENTS

| 5,327,506 A | 7/1994 | Stites, III |
| 5,572,594 A | 11/1996 | Devoe et al. |

(Continued)

FOREIGN PATENT DOCUMENTS

| CN | 1270488 A | 10/2000 |
| CN | 101022678 A | 8/2007 |

(Continued)

OTHER PUBLICATIONS

International Search Report in PCT/CN2019/130880 dated Apr. 1, 2020, 5 pages.

(Continued)

*Primary Examiner* — Thang V Tran
(74) *Attorney, Agent, or Firm* — Metis IP LLC

(57) ABSTRACT

The present disclosure relates to a waterproof open earphone. The waterproof open earphone may include a housing, at least one button, at least one elastic pad, and at least one pair of speaker units. The housing may be placed on a head or at least one ear of a user while not blocking an ear canal of the user. The at least one button may be set on the housing, wherein each of the at least one button corresponds to a button hole. The at least one elastic pad may correspond to the at least one button, respectively, wherein each elastic pad prevents the corresponding button from moving relative to the button hole. Each pair of the at least one pair of speaker units may generate sound within a frequency range from two sound guiding holes through two sound guiding tubes.

19 Claims, 55 Drawing Sheets

Related U.S. Application Data continuation of application No. PCT/CN2020/088482, filed on Apr. 30, 2020.

(51) Int. Cl.

| | |
|---|---|
| *H04R 1/26* | (2006.01) |
| *H04R 1/44* | (2006.01) |
| *G06F 3/16* | (2006.01) |
| *H04M 1/03* | (2006.01) |
| *H04M 1/78* | (2006.01) |
| *H04R 1/24* | (2006.01) |
| *H04R 1/28* | (2006.01) |
| *H04R 3/02* | (2006.01) |
| *H04R 1/34* | (2006.01) |
| *H04W 4/80* | (2018.01) |
| *H04R 1/22* | (2006.01) |
| *H04R 3/00* | (2006.01) |
| *H04R 5/02* | (2006.01) |
| *G10L 21/038* | (2013.01) |
| *H04R 5/033* | (2006.01) |
| *H04S 7/00* | (2006.01) |
| *G02C 11/00* | (2006.01) |
| *H04R 1/38* | (2006.01) |
| *H04R 9/06* | (2006.01) |
| *G10L 21/0208* | (2013.01) |
| *G02C 11/06* | (2006.01) |
| *G10L 21/0216* | (2013.01) |

(52) U.S. Cl.
CPC ............... *G06F 3/162* (2013.01); *G06F 3/165* (2013.01); *G10L 21/0208* (2013.01); *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/028* (2013.01); *H04R 1/10* (2013.01); *H04R 1/105* (2013.01); *H04R 1/1008* (2013.01); *H04R 1/1025* (2013.01); *H04R 1/1041* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(58) Field of Classification Search
CPC .. H04R 1/1016; H04R 1/1025; H04R 1/1041; H04R 1/105; H04R 1/1075; H04R 1/1083; H04R 3/00; H04R 3/005; H04R 3/02; H04R 5/02; H04R 5/033; H04R 5/0335; H04R 9/06; H04R 2201/103; H04R 2201/02166; H04R 2410/05; H04R 2420/07; H04R 2400/11; G06F 3/16; G06F 3/162; G06F 3/165; H04M 1/03; H04M 1/035; H04M 1/78; H04W 4/80; G10L 21/0208; G10L 21/038; G10I 2021/02166; H04S 7/304; G02C 11/00; G02C 11/06; G02C 11/10
See application file for complete search history.

(56) References Cited

U.S. PATENT DOCUMENTS

| | | |
|---|---|---|
| 6,062,337 A | 5/2000 | Zinserling |
| 6,817,440 B1 | 11/2004 | Kim |
| 8,891,800 B1 | 11/2014 | Shaffer |
| 9,036,851 B2 | 5/2015 | Peng |
| 9,985,596 B1 | 5/2018 | Litovsky et al. |
| 10,375,479 B2 | 8/2019 | Graber |
| 10,499,140 B2 | 12/2019 | Gong et al. |
| 2006/0113143 A1 | 6/2006 | Ishida |
| 2007/0098198 A1 | 5/2007 | Hildebrandt |
| 2007/0223735 A1 | 9/2007 | LoPresti et al. |
| 2007/0291971 A1 | 12/2007 | Halteren |
| 2008/0101589 A1 | 5/2008 | Horowitz et al. |
| 2009/0147981 A1 | 6/2009 | Blanchard et al. |
| 2010/0246864 A1* | 9/2010 | Hildebrandt ............ H04R 3/12 381/310 |
| 2010/0310106 A1 | 12/2010 | Blanchard et al. |
| 2011/0170730 A1 | 7/2011 | Zhu |
| 2012/0177206 A1 | 7/2012 | Yamagishi et al. |
| 2012/0263324 A1 | 10/2012 | Joyce et al. |
| 2013/0051585 A1 | 2/2013 | Karkkainen et al. |
| 2013/0108068 A1 | 5/2013 | Poulsen et al. |
| 2013/0169513 A1 | 7/2013 | Heinrich et al. |
| 2013/0266170 A1 | 10/2013 | Yamagishi |
| 2014/0226843 A1 | 8/2014 | Pan |
| 2015/0049873 A1 | 2/2015 | Heidenreich et al. |
| 2016/0119721 A1 | 4/2016 | Doshida et al. |
| 2016/0127841 A1 | 5/2016 | Horii |
| 2017/0180878 A1* | 6/2017 | Petersen ............ H04R 25/453 |
| 2017/0195795 A1 | 7/2017 | Mei et al. |
| 2017/0201823 A1 | 7/2017 | Shetye et al. |
| 2017/0208395 A1 | 7/2017 | Wan et al. |
| 2017/0230741 A1 | 8/2017 | Matsuo et al. |
| 2017/0238096 A1 | 8/2017 | Nakagawa et al. |
| 2017/0353780 A1 | 12/2017 | Huang et al. |
| 2017/0353793 A1 | 12/2017 | Sun et al. |
| 2018/0048952 A1 | 2/2018 | Hong et al. |
| 2018/0091883 A1 | 3/2018 | Howes et al. |
| 2018/0167711 A1 | 6/2018 | Lin |
| 2018/0227660 A1 | 8/2018 | Azmi et al. |
| 2018/0271383 A1 | 9/2018 | Lee |
| 2018/0295449 A1 | 10/2018 | Morgan et al. |
| 2018/0367885 A1 | 12/2018 | Gong et al. |
| 2018/0376231 A1 | 12/2018 | Pfaffinger |
| 2019/0026071 A1 | 1/2019 | Tamaoki et al. |
| 2019/0052954 A1* | 2/2019 | Rusconi Clerici Beltrami .......... H04R 1/2811 |
| 2019/0071011 A1 | 3/2019 | Konno et al. |
| 2019/0104352 A1 | 4/2019 | Ozawa et al. |
| 2019/0238971 A1* | 8/2019 | Wakeland ............ H04R 1/347 |
| 2019/0261080 A1 | 8/2019 | Gerber et al. |
| 2020/0112783 A1* | 4/2020 | Wakeland ............ H04R 1/1091 |
| 2020/0137476 A1 | 4/2020 | Shinmen et al. |
| 2020/0169801 A1 | 5/2020 | Zhu |
| 2020/0252708 A1 | 8/2020 | Zhu |
| 2021/0014595 A1* | 1/2021 | Li ............ H04R 1/1041 |

FOREIGN PATENT DOCUMENTS

| | | |
|---|---|---|
| CN | 101098353 A | 1/2008 |
| CN | 201426167 Y | 3/2010 |
| CN | 103108268 A | 5/2013 |
| CN | 103179483 A | 6/2013 |
| CN | 103209377 A | 7/2013 |
| CN | 103260117 A | 8/2013 |
| CN | 203233520 U | 10/2013 |
| CN | 203301726 U | 11/2013 |
| CN | 204377095 U | 6/2015 |
| CN | 104869515 A | 8/2015 |
| CN | 104883635 A | 9/2015 |

(56) References Cited

FOREIGN PATENT DOCUMENTS

| | | |
|---|---|---|
| CN | 204810512 U | 11/2015 |
| CN | 204948313 U | 1/2016 |
| CN | 204948328 U | 1/2016 |
| CN | 204948329 U | 1/2016 |
| CN | 205336486 U | 6/2016 |
| CN | 205510154 U | 8/2016 |
| CN | 205754812 U | 11/2016 |
| CN | 106231462 A | 12/2016 |
| CN | 106303779 A | 1/2017 |
| CN | 106341752 A | 1/2017 |
| CN | 106792304 A | 5/2017 |
| CN | 206193360 U | 5/2017 |
| CN | 107231585 A | 10/2017 |
| CN | 206575566 U | 10/2017 |
| CN | 206640738 U | 11/2017 |
| CN | 206865707 U | 1/2018 |
| CN | 107820169 A | 3/2018 |
| CN | 207070281 U | 3/2018 |
| CN | 207075075 U | 3/2018 |
| CN | 207340125 U | 5/2018 |
| CN | 108650597 A | 10/2018 |
| CN | 108712695 A | 10/2018 |
| CN | 207939700 U | 10/2018 |
| CN | 109032558 A | 12/2018 |
| CN | 109151680 A | 1/2019 |
| CN | 208572417 U | 3/2019 |
| CN | 208675298 U | 3/2019 |
| CN | 109640209 A | 4/2019 |
| CN | 208783039 U | 4/2019 |
| EP | 2765786 A2 | 8/2014 |
| EP | 3404931 A1 | 11/2018 |
| JP | H0993684 A | 4/1997 |
| JP | 2004343286 A | 12/2004 |
| KR | 20080103334 A | 11/2008 |
| WO | 0225990 A1 | 3/2002 |
| WO | WO-02078393 A2 * | 10/2002 ........... H04R 25/402 |
| WO | 2005053351 A1 | 6/2005 |
| WO | 2015087093 A1 | 6/2015 |
| WO | 2016206764 A1 | 12/2016 |
| WO | 2018107141 A1 | 6/2018 |
| WO | 2020220970 A1 | 11/2020 |

OTHER PUBLICATIONS

International Search Report in PCT/CN2019/130884 dated Mar. 20, 2020, 6 pages.
International Search Report in PCT/CN2019/130886 dated Mar. 31, 2020, 6 pages.
International Search Report in PCT/CN2019/130944 dated Mar. 26, 2020, 6 pages.
International Search Report in PCT/CN2019/130921 dated Apr. 1, 2020, 6 pages.
International Search Report in PCT/CN2019/130942 dated Mar. 26, 2020, 6 pages.
International Search Report in PCT/CN2020/070540 dated Apr. 2, 2020, 6 pages.
International Search Report in PCT/CN2020/070550 dated Mar. 27, 2020, 6 pages.
International Search Report in PCT/CN2020/070545 dated Apr. 15, 2020, 6 pages.
International Search Report in PCT/CN2020/070551 dated Mar. 27, 2020, 7 pages.
International Search Report in PCT/CN2020/070542 dated Mar. 27, 2020, 6 pages.
Intemational Search Report in PCT/CN2020/070539 dated Apr. 7, 2020, 8 pages.
International Search Report in PCT/CN2020/088190 dated Jul. 30, 2020, 6 pages.
International Search Report in PCT/CN2020/106759 dated Oct. 28, 2020, 6 pages.
International Search Report in PCT/CN2020/116319 dated Dec. 11, 2020, 6 pages.
International Search Report in PCT/CN2020/087002 dated Jul. 14, 2020, 4 pages.
Written Opinion in PCT/CN2020/087002 dated Jul. 14, 2020, 5 pages.
International Search Report in PCT/CN2020/088482 dated Aug. 5, 2020, 4 pages.
Written Opinion in PCT/CN2020/088482 dated Aug. 5, 2020, 4 pages.
International Search Report in PCT/CN2020/083631 dated Jun. 29, 2020, 4 pages.
Written Opinion in PCT/CN2020/083631 dated Jun. 29, 2020, 4 pages.
International Search Report in PCT/CN2020/087034 dated Jul. 22, 2020, 4 pages.
Written Opinion in PCT/CN2020/087034 dated Jul. 22, 2020, 5 pages.
International Search Report in PCT/CN2020/084161 dated Jul. 6, 2020, 4 pages.
Written Opinion in PCT/CN2020/084161 dated Jul. 6, 2020, 4 pages.
Written Opinion in PCT/CN2020/087526 dated Jul. 23, 2020, 4 pages.
International Search Report in PCT/CN2020/087526 dated Jul. 23, 2020, 5 pages.

* cited by examiner

OPEN EARPHONE

CROSS-REFERENCE TO RELATED APPLICATIONS

This application is a Continuation of U.S. application Ser. No. 17/129,733, filed on Dec. 21, 2020, which is a Continuation of International Application No. PCT/CN2020/088482, filed on Apr. 30, 2020, and claims priority to Chinese Patent Application No. 201910888067.6, filed on Sep. 19, 2019, Chinese Patent Application No. 201910888762.2, filed on Sep. 19, 2019, Chinese Patent Application No. 201910364346.2, filed on Apr. 30, 2019, the contents of each of which are hereby incorporated by reference.

TECHNICAL FIELD

The present disclosure generally relates to the field of electronic devices, and in particular, to an open earphone.

BACKGROUND

As indispensable electronic devices in daily life, earphones are widely used in various fields. The most common earphones are in-ear earphones and headphones, which form closed couplings with user's ears and hence have low sound leakage. However, long-term use of such earphones may cause ear pain and hearing damage. Moreover, it is difficult for the user to hear external sound when wearing such earphones, which is potentially dangerous. Therefore, open earphone is designed and used. However, there is generally a sound leakage when using the open earphone. When the volume is relatively high and the environment is relatively quiet, sound leakage may be especially prominent and obvious, which not only affects the work or life of people around it, but also leaks what the user hears.

In addition, a user may hope to use an open earphone when he/she is swimming or outside in rainy days. The user may press buttons of the open earphone to achieve certain functions (e.g., pausing/playing music and answering a call). However, when the user presses the buttons, even if the open earphone is claimed to be waterproof, liquid may enter the open earphone through space or holes near the buttons. Therefore, it is desirable to provide an open earphone with improved waterproof performance and sound leakage reduction capability.

SUMMARY

In response to the problem, the present disclosure provides an open earphone. By performing frequency division processing of audio signals and setting a plurality of sound guiding holes with adjusting distances between the sound guiding holes, the sound leakage prevention capability of the open earphone may be improved, thereby improving the user experience. By improving sealing performances of one or more components of the open earphone (e.g., circuit housings, buttons, etc.), the waterproof performance of the open earphone may be improved.

In order to achieve the purposes, the technical solutions provided by the present disclosure are as follows:

According to one aspect of the present disclosure, a waterproof open earphone is provided. The waterproof open earphone may include a housing, at least one button, at least one elastic pad, and at least one pair of speaker units. The housing is placed on a head or at least one ear of a user while not blocking an ear canal of the user. The at least one button is set on the housing, wherein each of the at least one button corresponds to a button hole. The at least one elastic pad corresponds to the at least one button, respectively, wherein each elastic pad prevents the corresponding button from moving relative to the button hole. Each pair of the at least one pair of speaker units generate sound within a frequency range from two sound guiding holes through two sound guiding tubes.

In some embodiments, the at least one pair of speaker unit includes a pair of low-frequency speaker units and a pair of high-frequency speaker units, wherein the pair of first frequency speaker units generate sound within a first frequency range from two first sound guiding holes through two first sound guiding tubes, and the pair of second frequency speaker units generate sound within a second frequency range from two second sound guiding holes through two second sound guiding tubes, wherein the second frequency range includes a frequency higher than the first frequency range.

In some embodiments, the first frequency range includes a frequency lower than 650 Hz and the second frequency range includes a frequency higher than 1000 Hz.

In some embodiments, the first frequency range and the second frequency range overlap each other.

In some embodiments, the two first guiding holes are spaced apart from each other by a first distance, and the two second guiding holes are spaced apart from each other by a second distance, the first distance being greater than the second distance.

In some embodiments, the first distance is not greater than 40 mm and the second distance is not greater than 7 mm.

In some embodiments, the first distance is 30 mm and the second distance is 5 mm.

In some embodiments, a center point of one of the first sound guiding holes or the second sound guiding holes is not greater than 10 cm from a center point of the ear canal of the user.

In some embodiments, a radius of the first guiding tubes or the second guiding tubes is between 1.75 mm and 5 mm.

In some embodiments, a length of the first guiding tubes or the second guiding tubes is not greater than 100 mm.

In some embodiments, a length-diameter ratio of the first guiding tubes or the second guiding tubes is not greater than 200 mm.

In some embodiments, the sound generated by the pair of first frequency speaker units or the pair of second frequency speaker units are in opposite phases.

In some embodiments, the waterproof open earphone further includes a circuit housing including an accommodating body and a cover, wherein a cavity that has an opening at one end of the accommodating body is set on the accommodating body and the cover is covered on the opening of the cavity to seal the cavity.

In some embodiments, the elastic pad is set on a first recessed area and a second recessed area corresponding to the button hole is set on the elastic pad, the second recesses area extending to inside of the button hole.

In some embodiments, the button includes a button body and a button contact point, wherein the button body is disposed on a side of the elastic pad away from the circuit housing and the button contact point extends to inside of the second recessed area.

In some embodiments, the circuit housing further includes a main sidewall and an auxiliary sidewall connected to the main sidewall, wherein the first recessed area is configured on an outer surface of the auxiliary side wall.

In some embodiments, the circuit housing further includes a button circuit board, and a button switch corresponding to the button hole is set on the button circuit board, wherein when the user presses the button, the button contact point contacts and triggers the button switch.

In some embodiments, the button includes at least two button single bodies disposed away from each other and a connecting portion connected to the at least two button single bodies, wherein the button contact point is set on each of the at least two button single bodies and a elastic bump for supporting the connecting portion is set on the elastic pad.

In some embodiments, the waterproof open earphone further includes a rigid pad disposed between the elastic pad and the circuit housing, wherein a through hole is set on the rigid pad and the second recessed area further extends to the inside of the button hole through the through hole.

In some embodiments, the elastic pad and the rigid pad abut each other.

In some embodiments, the waterproof open earphone further includes a housing casing covering periphery of the circuit housing and periphery of the button.

In some embodiments, the housing casing includes a bag-shaped structure with one end open and the circuit housing and the button enter the inside of the housing casing through the open end.

In some embodiments, an annular flange protruding inward is set on the open end of the housing casing, an end of the circuit housing is set as a stair shape and forms an annular platform, wherein when the housing casing covers periphery of the circuit housing, the annular flange is in contact with the annular platform.

In some embodiments, a sealant is applied in a joint region of the annular flange and the annular platform to firmly connect the housing casing with the circuit housing.

In some embodiments, the waterproof open earphone further includes an auxiliary piece, wherein the auxiliary piece includes a board.

In some embodiments, a hollowed area is set on the board and a mounting hole is set on the main sidewall and located inside the hollowed area.

In some embodiments, the waterproof open earphone further includes a conductive column inserted into the mounting hole, wherein a glue groove is formed at periphery of the conductive column.

In some embodiments, a notch is set in the hollowed area of the auxiliary piece and a first strip rib is integrally formed on the inner surface of the main sidewall corresponding to the notch, wherein the first strip rib fit and the auxiliary piece cooperate to make the glue groove closed.

In some embodiments, the conductive column includes a columnar body inserted into the mounting hole and a positioning protrusion is set on an outer peripheral surface of the columnar body, wherein the positioning protrusion is engaged with the inner surface of the main sidewall to fix the conductive column to the mounting hole.

In some embodiments, the columnar body is divided into a first columnar body and a second columnar body, with respect to an insertion direction of the columnar body along the mounting hole, wherein a cross section of the first columnar body is larger than a cross section of the second columnar body. The mounting hole is divided into a first hole section and a second hole section corresponding to the first columnar body and the second columnar body in cross section along the insertion direction and an annular platform is formed at a junction of the first hole section and the second hole section, wherein when the columnar body is inserted into the mounting hole, a side of the first columnar body facing the second columnar body is supported on the annular platform and the positioning protrusion is engaged with the inner surface of the main sidewall.

In some embodiments, an accommodating cavity along an axial direction is set on the columnar body, wherein an open end of the accommodating cavity is on an end surface of the second columnar body facing an inside of the circuit housing. The conductive column includes a spring inside the accommodating cavity and a conductive contact point, wherein one end of the conductive contact point abuts the spring inside the accommodating cavity and another end of the conductive contact point is exposed to the inside of the circuit housing through the open end of the accommodating cavity. A main control circuit board is set in the circuit housing, including a contact corresponding to the conductive contact point of the conductive column wherein the conductive contact point is elastically pressed on the contact of the main control circuit board.

In some embodiments, the insertion direction of the conductive column is perpendicular to a main surface of the main control circuit board.

In some embodiments, the cover includes a rigid support and a cover layer, wherein the rigid support is physically connected to the accommodating body and the cover layer provides a seal for the cavity after the rigid support is connected to the accommodating body.

In some embodiments, a shape of a side of the rigid support facing the accommodating body is matched with the opening and the cover layer covers the outer surface of the rigid support away from the accommodating body.

In some embodiments, the rigid support includes an insertion portion and a cover portion, wherein the cover portion is covered on the opening and the insertion portion is set on a side of the cover portion and extends into the cavity along an inner wall of the cavity to fix the cover portion on the opening.

In some embodiments, the accommodating body includes an opening edge that matches with the opening, the covering portion is pressed on an inner region of the opening edge close to the opening, and the cover layer cover an outer surface of the cover portion away from the accommodating body and is pressed on an outer region on the periphery of the inner region of the opening edge which achieves a sealing with the opening edge.

In some embodiments, a contact end surface of the cover portion and the opening edge and a contact end surface of the cover layer and the opening edge are flat as each other. The cover layer further extends along a region between the cover portion and the opening edge to an inner region of the opening edge.

In some embodiments, a switch hole corresponding to the switch is set on the rigid support, the cover layer covers the switching hole, and a pressing portion is set at a position corresponding to the switching hole, wherein the pressing portion extends toward the inside of the cavity through the switching hole, wherein when a corresponding position of the cover layer is pressed, the pressing portion press the switch of the circuit component and trigger the circuit component 130 to execute a preset function.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure may be further described in terms of exemplary embodiments. The exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
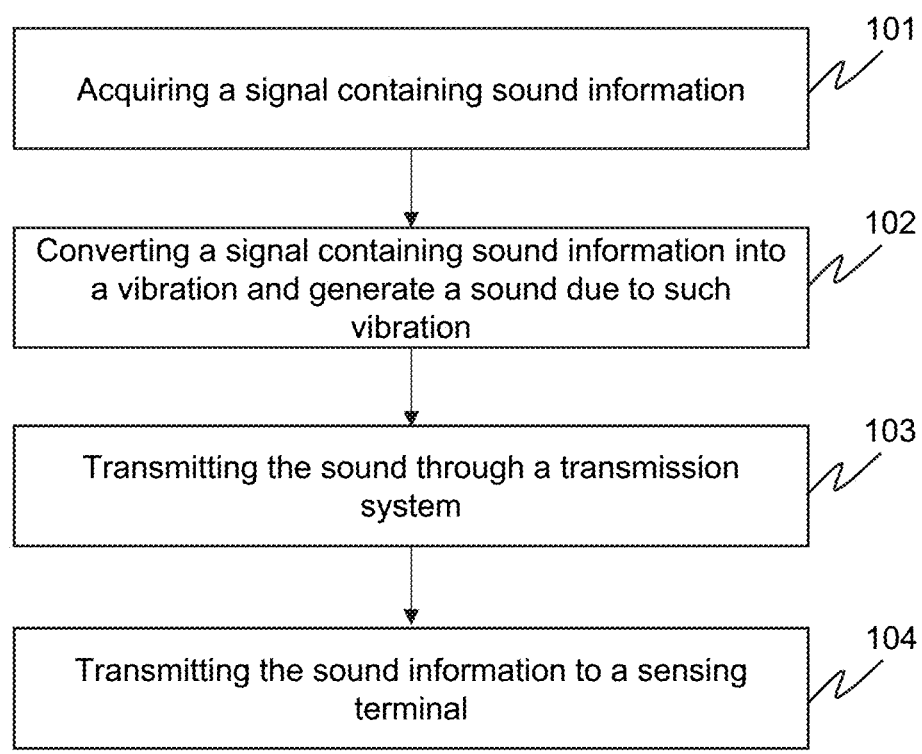
FIG. 1 is a flowchart illustrating an exemplary process that a speaker device generates hearing in a human ear according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

As used in the disclosure and the appended claims, the singular forms "a," "an," and "the" include plural referents unless the content clearly dictates otherwise. In general, the terms "comprise," "comprises," and/or "comprising," "include," "includes," and/or "including," merely prompt to include steps and elements that have been clearly identified, and these steps and elements do not constitute an exclusive listing, and the methods or systems may also include other steps or elements. The term "based on" may refer to "based at least in part on." The term "one embodiment" may refers to "at least one embodiment." The term "another embodiment" may refer to "at least one further embodiment". Related definitions of other terms may be described in the description below.

It should be understood that the terms "data block", "system", "engine", "unit", "component", "module" and/or "block" used herein are one method to distinguish different components, elements, parts, sections, or assemblies of different levels in ascending order. However, the terms may be displaced by other expression if they may achieve the same purpose.

Various terms may be used to describe the spatial and functional relationships between elements (e.g., between layers), including "connected to," "joined with," "interfaced with," and "coupled to." When describing a relationship between a first element and a second element in the present disclosure, the relationship may include a direct relationship in which there are no other intermediate elements between the first and second elements and an indirect relationship in which one or more intermediate elements exist between the first and second elements (in space or function), unless explicitly described as "directly". In contrast, when an element is described as being "directly" connected to, joined with, interfaced with, or coupled to another element, there are no intermediate elements. In addition, the spatial and functional relationships between elements may be implemented in various ways. For example, the mechanical connection between two elements may include a solder connection, a key connection, a pin connection, an interference fit connection, or the like, or any combination thereof. Other words used to describe the relationship between elements should be interpreted in a similar way (e.g., "between", "between . . . and", "adjacent" and "directly adjacent", etc.)

FIG. 1 is a flowchart illustrating an exemplary process that a speaker device generates hearing in a human ear according to some embodiments of the present disclosure. A speaker device may transmit sound to a human hearing system via a bone conduction or an air conduction, thereby generating hearing. As shown in FIG. 1, the process that the speaker causes the human ear to generate the hearing may include following steps.

In 101, the speaker device may acquire or generate a signal containing sound information. In some embodiments, the sound information may refer to a video or audio file with a specific data format. The sound information may also refer to data or files which may be eventually converted into sound in a specific way. In some embodiments, the signal containing sound information may be obtained from a storage unit of the speaker device, an information generation system, a storage system, or a transmission system other than the speaker device. It should be noted that the sound signals described here are not limited to electrical signals but may include forms other than electrical signals, such as optical signals, magnetic signals, mechanical signals, or the like. In principle, as long as a signal contains information that the speaker device can use to generate sound, the signal may be referred to as a sound signal. The sound signal may be generated by a single signal source or a plurality of signal sources. The plurality of signal sources may be related or not related to each other. In some embodiments, the transmission of the sound signals may be in a wired or a wireless manner, in a real-time manner or a delayed manner. For example, to generate a sound signal, the speaker device may receive an electric signal containing sound information in a wired or wireless manner, or obtain data directly from a storage medium. Taking bone conduction technology as an example, a component with a sound collection function may be installed on the bone conduction speaker. By picking up sound in the environment, the mechanical vibrations of the sound may be converted into an electrical signal, which is further processed by an amplifier to generate an electrical signal that meets specific requirements. The wired connection may include but not limited to a metal cable, an optical cable, or a metal and optical hybrid cable, such as a coaxial cable, a communication cable, a flexible cable, a spiral cable, a non-metallic sheathed cable, a metal sheathed cable, a multi-core cable, a twisted pair cable, a ribbon cable, a shielded cable, a telecommunication cable, a twisted pair cable, a parallel twisted pair conductor, etc. The above descriptions are merely for purposes of illustration. The medium of the wired connection for electronic signals or optical signals may include other types of transmission carriers.

The storage device/storage unit mentioned herein may include a storage device on a storage system. The storage system may include a direct attached storage, a network attached storage, a storage area network, etc. The storage device may include a solid-state storage device (e.g., solid state disk, hybrid hard disk, etc.), a mechanical hard disk, a USB flash memory, a memory stick, a memory card (e.g., CF, SD, etc.), other drivers (e.g., CD, DVD, HD DVD, Blu-ray, etc.), a random access memory (RAM), a read-only memory (ROM), or the like, or any combination thereof. The RAM may include a dekatron, a selectron, a delay line memory, Williams tubes, a dynamic random access memory (DRAM), a static random access memory (SRAM), a thyristor random access memory (T-RAM), a zero capacitor random access memory (Z-RAM), etc. The ROM may include a bubble memory, a twistor memory, a film memory, a plated wire memory, a magnetic-core memory, a drum memory, a CD-ROM, a hard disk, a tape, a non-volatile random access memory (NVRAM), a phase-change memory, a magneto-resistive random access memory, a ferroelectric random access memory, a non-volatile SRAM, a flash memory, an electrically erasable programmable read-only memory, an erasable programmable read-only memory, a programmable read-only memory, a mask ROM, a floating gate random access memory, a Nano random access memory, a racetrack memory, a resistive random access memory, a programmable metallization unit, etc. The storage device/storage unit may not be limited to those mentioned above.

In 102, the speaker device may convert a signal containing sound information into a vibration and generate a sound due to such vibration. The generation of vibration may be accompanied by a conversion of energy. The speaker device may use a specific transducer to convert the signal to the mechanical vibration. The conversion process may include coexistence and/or conversion of many different types of energy. For example, an electrical signal may be directly converted into a mechanical vibration through a transducer to generate a sound. As another example, sound information may be contained in an optical signal, and a specific transducer may convert the optical signal into a vibration signal. Other types of energy that may coexist and be converted during the operation of the transducer may include thermal energy, magnetic field energy, etc. In some embodiments, according to the energy conversion of the transducer, the transducer may be classified into a moving coil type, an electrostatic type, a piezoelectric type, a moving iron type, a pneumatic type, an electromagnetic type, or the like. A frequency response range and a sound quality of the speaker device may be affected by different transduction type and performances of various physical components in the transducer. For example, in a dynamic coil type transducer, a weld cylindrical coil may be connected to a vibration plate, and a coil driven by a signal current may drive the vibration plate to generate sound in a magnetic field. The stretching and shrinking of the material, the deformation, size, shape and degree of fixation of the folds, the magnetic density of permanent magnets, etc. of the vibration plate may greatly affect the final sound quality of the speaker device.

The term "sound quality" as used herein may be understood to reflect the quality of the sound, and may refer to a fidelity of an audio after processing, transmission and other processes. In a sound device, the sound quality usually includes several aspects, including an intensity and amplitude of the audio, a frequency of the audio, overtone or harmonic components of the audio, etc. When assessing sound quality, there are not only measurement methods and evaluation criteria for objectively evaluating sound quality, but also methods that evaluate various attributes of sound quality by combining different elements of the sound and subjective feelings. Therefore, the processes of sound generation, transmission and reception may affect the sound quality of the sound to a certain extent.

In 103, the sound may be transmitted through a transmission system. In some embodiments, the transmission system may refer to a substance that transmits vibration signals containing sound information, such as a skull, a bone labyrinth, an inner ear lymph fluid, and a spiral organ of a human and/or an animal with a hearing system. As another example, the substance may include a medium that transmits the sound (e.g., the air, a liquid). Taking a bone conduction speaker as an example, the bone conduction speaker may directly transmit sound waves (vibration signals) converted from electrical signals through the bone to an auditory center. Taking an air conduction speaker as an example, the air conduction speaker may include one or more groups of sound sources. Each group of sound sources may include two sound sources for generating sound waves with opposite phases. The air conduction speaker may transmit two sound waves with opposite phases to the auditory center through the air.

In 104, the sound information may be transmitted to a sensing terminal. Specifically, the sound information may be transmitted to the sensing terminal through the transmission system. Without loss of generality, a subject of a sensing terminal, a hearing system, a sensory organ, etc. described above may be a human or an animal with a hearing system. It should be noted that the following description of the use of the speaker device by humans may not constitute a limitation on the scenarios of the use of the speaker device. Similar descriptions may also be appliable to other animals.

The above description of the general process of the speaker device is only a specific example, and should not be considered as the only feasible implementation. In the following, without loss of generality, "speaker device" or "speaker" may be used in the present disclosure regarding conduction related technologies. This description may be only a form of conduction application. For those of ordinary skill in the art, "speaker device" may also be replaced by other similar terms, such as "vocal device", "hearing aid", or "speaking device" and other devices that have a speaker function. In fact, the various implementations in the present disclosure may be easily applied to other and non-speaker hearing devices. For example, for those skilled in the art, after understanding the basic principles of the speaker device, it may be possible to make various modifications and changes in the form and details of the specific way and steps of implementing the speaker device without departing from the principle. In particular, an environmental sound picking up and processing function may be added to the speaker device, such that the speaker device may implement the function of a hearing aid. For example, a microphone may pick up a sound around a user/wearer. The microphone may send a processed sound (or a generated electrical signal) to the speaker using a certain algorithm. That is, the speaker device may be modified to include the function of picking up the sound around the user/wearer, and after a certain signal processing, the sound may be transmitted to the user/wearer through a speaker module. As an example, the algorithm mentioned here may include noise cancellation, automatic gain control, acoustic feedback suppression, wide dynamic range compression, active environment recognition, active anti-noise, directional processing, tinnitus processing, multi-channel wide dynamic range compression, active howling suppression, volume control or the like, or any combination thereof.

The speaker device in the present disclosure may include a headphone, an MP3 player, a hearing aid, or other device with a speaker function. When a user wears the speaker device, the speaker device may be located on at least one side of the user's head and close to but not block the user's ear canal. Such speaker device may also be referred to as an open (binaural/uniaural) speaker device. In some embodiments, the shape of the speaker device may be set according to the type it is worn (e.g., an ear hook type or a headband type) and specific requirements of use, and is not specifically limited herein. For example, a speaker device of the ear hook type may match with the user's auricle, such that it may not fall easily when hung on the user's ear. As another example, a speaker device of the headband type may straddle the user's head and be fixed on the head of the user in a manner similar to a headband. Two ends of the speaker device may be at certain distances from the user's ears. In the following specific embodiments of the present disclosure, an earphone may be taken as an example to specifically describe the speaker device.

Figure 2:
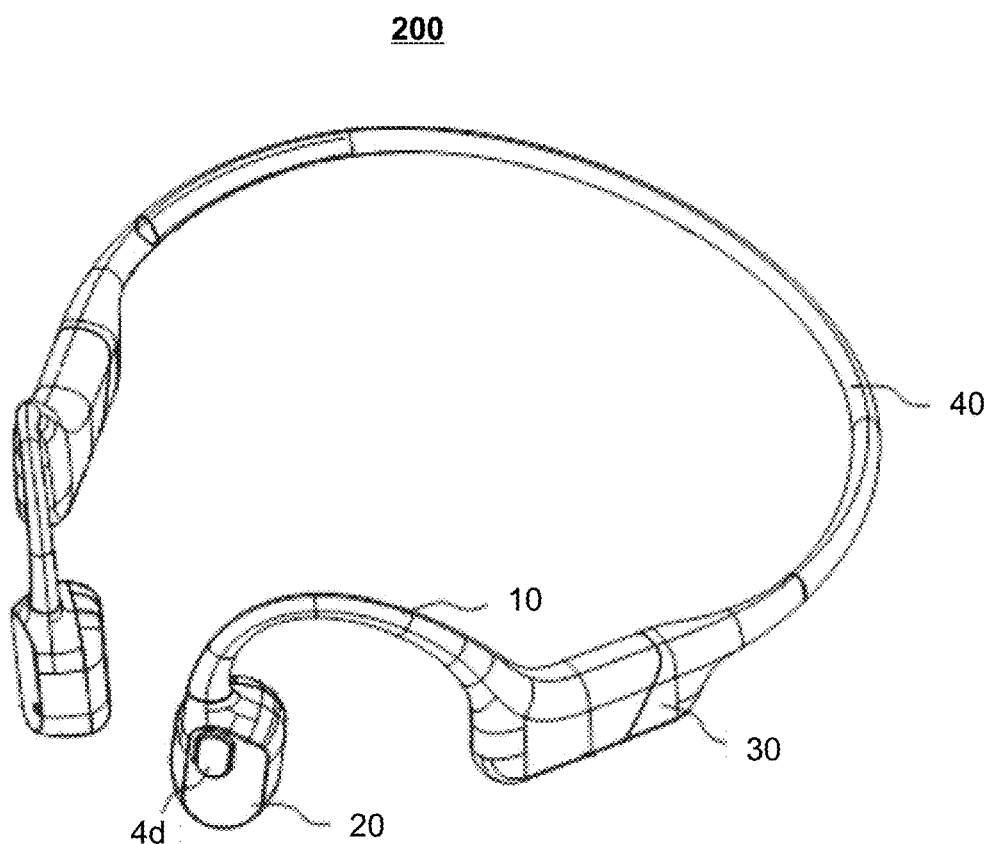
FIG. 2 is a schematic diagram illustrating an open exemplary earphone according to some embodiments of the present disclosure.
Figure 3:
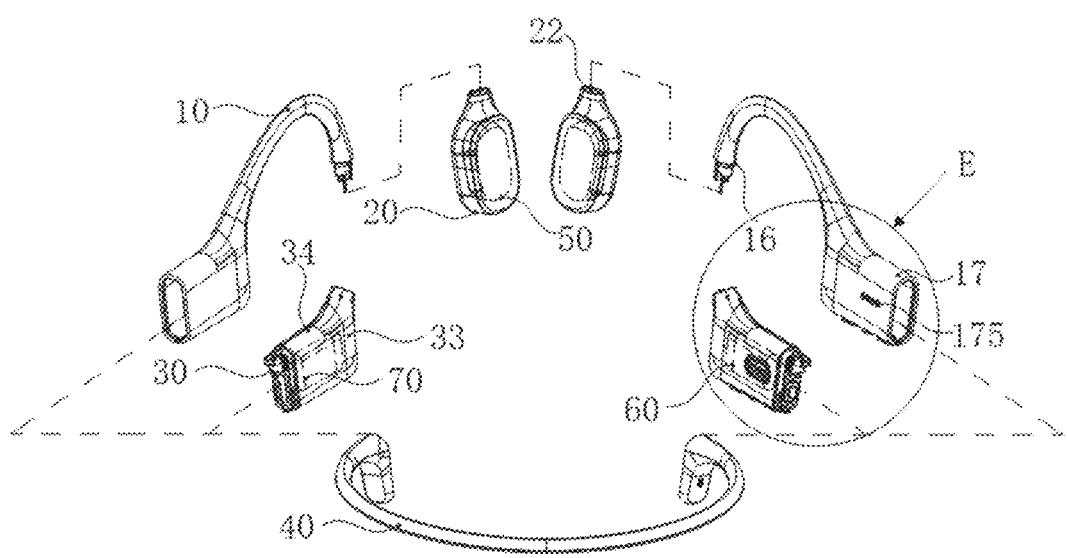
FIG. 3 is a schematic diagram illustrating an exemplary exploded structure of the open earphone shown in FIG. 2 according to some embodiments of the present disclosure.

FIG. 2 is a schematic diagram illustrating an exemplary open earphone according to some embodiments of the present disclosure. FIG. 3 is a schematic diagram illustrating an exemplary exploded structure of the open earphone shown in FIG. 2 according to some embodiments of the present disclosure. As shown in FIGS. 2 and 3, the structure of the open earphone 200 may be designed such that both ear canals are not blocked, which may also be referred to as a binaural open earphone 200. The open earphone 200 may include primary components such as two ear hooks 10, two chip housings 20, two circuit housings 30, a rear hook 40, two earphone chips (also referred to as vocal structures) 50, a control circuit (also referred to as a circuit board) 60, a battery (also referred to as a power module) 70, etc. Each of the ear hooks 10 may include a protective casing 16 and a housing casing 17 on which one or more exposed holes 175 are set. Each of the chip housings 20 may include a socket 22. Each of the circuit housings 30 may include two main sidewalls 33 and two auxiliary sidewalls 34. A chip housing 20 and a circuit housing 30 may be disposed at two ends of an ear hook 10, respectively. Two ends of the rear hook 40 may be connected to the two circuit housings 30, respectively. The two chip housings 20 may be used to accommodate the two earphone chips 50, respectively. The two circuit housings 30 may be used to accommodate the control circuit 60 and the battery 70, respectively. When the open earphone 200 is worn, the two ear hooks 10 may correspond to the left and right ears of the user, respectively. The rear hook 40 may correspond to the back of the user's head. The open earphone 200 may transmit sound to a human hearing system through a bone conduction or an air conduction to cause the user to generate a hearing. In some embodiments, the shape of the open earphone 200 may be designed as a shape of an open earphone 4100 shown in FIG. 41 or an open earphone 4600 as shown in FIG. 46, and is not limited herein. In some embodiments, the open earphone 200 may also include one or more additional components or one or more components shown in FIGS. 1 and 2 may be omitted. Merely by way of example, the open earphone 200 may include one or more buttons 4d, a Bluetooth module, a microphone, etc., which may be described elsewhere in the present disclosure (e.g., FIGS. 41-65 and the descriptions thereof).

In some embodiments, the open earphone 200 may have an improved sound leakage prevention capability. The open earphone 200 may include an acoustic output component. The acoustic output component may include at least two sets of acoustic drivers, e.g., a set of high-frequency acoustic drivers and a set of low-frequency acoustic drivers. Each set of acoustic drivers may be used to generate a sound in a certain frequency range. The sound may propagate outward through at least two sound guiding holes that are acoustically coupled to the set of acoustic drivers. A frequency division process may be performed on an audio signal (e.g., decomposing the audio signal into a high-frequency signal and a low-frequency signal). For frequency division signals in different frequency bands, different distances between the sound guiding holes may be set. For example, the distance between two sound guiding holes corresponding to the low-frequency acoustic drivers may be set to be greater than that between two sound guiding holes corresponding to the high-frequency acoustic drivers, which may improve the ability of the open earphone 200 for reducing sound leakage.

In some embodiments, a baffle may be set on the acoustic output component of the open earphone 200, such that the at least two sound guiding holes may be distributed on two sides of the baffle, respectively. In some embodiments, the at least two sound guiding holes may be distributed on two sides of the user's auricle, respectively. In this situation, the auricle may serve as a baffle to separate the at least two sound guiding holes, such that propagation paths of sounds transmitted from the at least two sound guiding holes to the user's ear canal are different. By setting the baffle to make the propagation paths of the sounds transmitted from different sound guiding holes to the user's ear canal different, the ability of the open earphone 200 for reducing sound leakage may be improved. More descriptions regarding improving the sound leakage prevention capability of the earphone 200 may be found elsewhere in the present disclosure (e.g., FIGS. 4-45 and the descriptions thereof).

In some embodiments, the open earphone 200 may show a good waterproof performance. Merely by way of example, one or more buttons may be set on the open earphone 200. An elastic pad may be set between the one or more buttons and corresponding button holes to prevent liquid from entering the open earphone 200 through the button holes. More descriptions regarding improving the waterproof performance of the open earphone 200 may be found elsewhere in the present disclosure (e.g., FIGS. 46-65 and the descriptions thereof).

Figure 4:
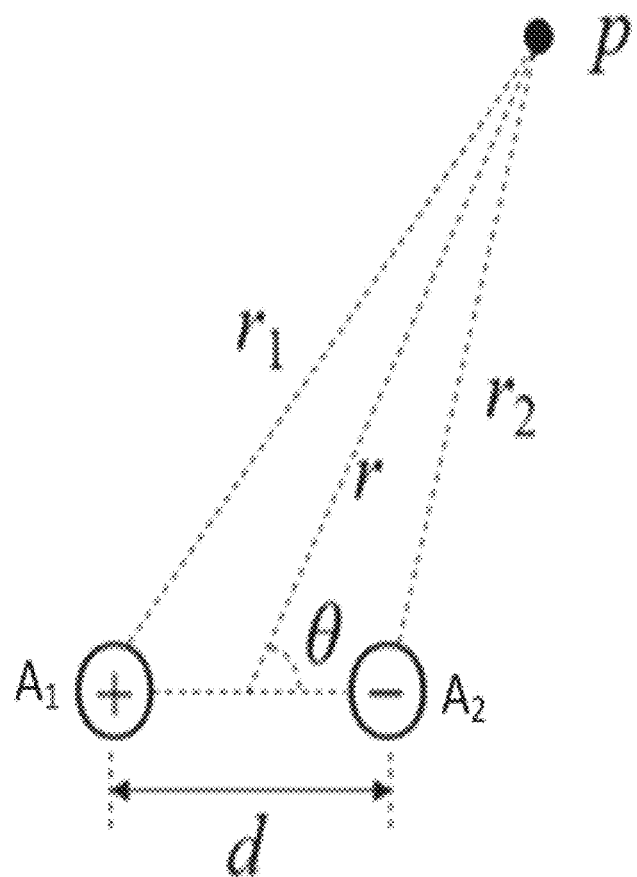
FIG. 4 is a schematic diagram illustrating exemplary two point sources according to some embodiments of the present disclosure.

FIG. 4 is a schematic diagram illustrating exemplary two point sources according to some embodiments of the present disclosure. In order to further explain the effect of the setting of the sound guiding holes on the acoustic output apparatus, and considering that the sound may be considered as propagating outwards from the sound guiding holes, the present disclosure describes sound guiding holes on an acoustic output apparatus as sound sources that output sound to outside.

Just for the convenience of description and for the purpose of illustration, when sizes of the sound guiding holes on the acoustic output apparatus are small, each sound guiding hole may be approximated as a point source (or referred to as a point source or a sound source). In some embodiments, any sound guiding hole provided on the acoustic output apparatus for outputting sound may be approximated as a single point (sound) source on the acoustic output apparatus. The sound field pressure p generated by the single point source may satisfy Equation (1):

$$p = \frac{j\omega\rho_0}{4\pi r} Q_0 \exp j(\omega t - kr), \quad (1)$$

where $\omega$ denotes an angular frequency, $\rho_0$ denotes an air density, r denotes a distance between a target point and the point source, $Q_0$ denotes a volume velocity of the point source, and k denotes the wave number. It may be concluded that the magnitude of the sound field pressure of the point source at the target point is inversely proportional to the distance from the target point to the point source.

It should be noted that the sound guiding holes for outputting sound as point sources may only serve as an explanation of the principle and effect of the present disclosure, and may not limit the shapes and sizes of the sound guiding holes on practical applications. In some embodiments, if an area of a sound guiding hole is large enough, the sound guiding hole may also be equivalent to a planar sound source. In some embodiments, the point source may also be realized by other structures, such as a vibration surface and a sound radiation surface. For those skilled in the art, without creative activities, it may be known that sounds produced by structures such as a sound guiding hole, a vibration surface, and an acoustic radiation surface may be similar to a point source at the spatial scale discussed in the present disclosure, and may have similar sound propagation characteristics and the similar mathematical description method. Further, for those skilled in the art, without creative activities, it may be known that the acoustic effect achieved by "an acoustic driver outputting sound from at least two first sound guiding holes" described in the present disclosure may also achieve the same effect by other acoustic structures, for example, "at least two acoustic drivers each may output sound from at least one acoustic radiation surface." According to actual situations, other acoustic structures may be selected for adjustment and combination, and the same acoustic output effect may also be achieved. The principle of spreading sound outward with structures such as planar sound sources may be similar to that of point sources, and is not repeated here.

As mentioned above, at least two sound guiding holes corresponding to a same acoustic driver may be set on the acoustic output apparatus provided in the specification. In this case, two point sources may be formed, which may reduce sound transmitted to the surrounding environment. For brevity, sound output from the acoustic output apparatus to the surrounding environment may be referred to as a far-field leakage since it can be heard by others in the environment. The sound output from the acoustic output apparatus to the ears of the user wearing the acoustic output apparatus may be referred to as a near-field sound since a distance between the acoustic output apparatus and the user is relatively short. In some embodiments, the sound output from two sound guiding holes (i.e., two point sources) may have a certain phase difference. When the distance between the two point sources and the phase difference of the two point sources meet a certain condition, the acoustic output apparatus may output sounds with different sound effects in the near field (for example, the position of the user's ear) and the far field. For example, if the phases of the point sources corresponding to the two sound guiding holes are opposite, that is, an absolute value of the phase difference between the two point sources is 180 degrees, the far-field leakage may be reduced according to the principle of reversed phase cancellation. More details regarding an enhancement of the acoustic output apparatus by adjusting the amplitude and/or phase of each point source may be found in International application No. PCT/CN2019/130884, filed on Dec. 31, 2019, the entire content of which may be hereby incorporated by reference.

Figure 5:
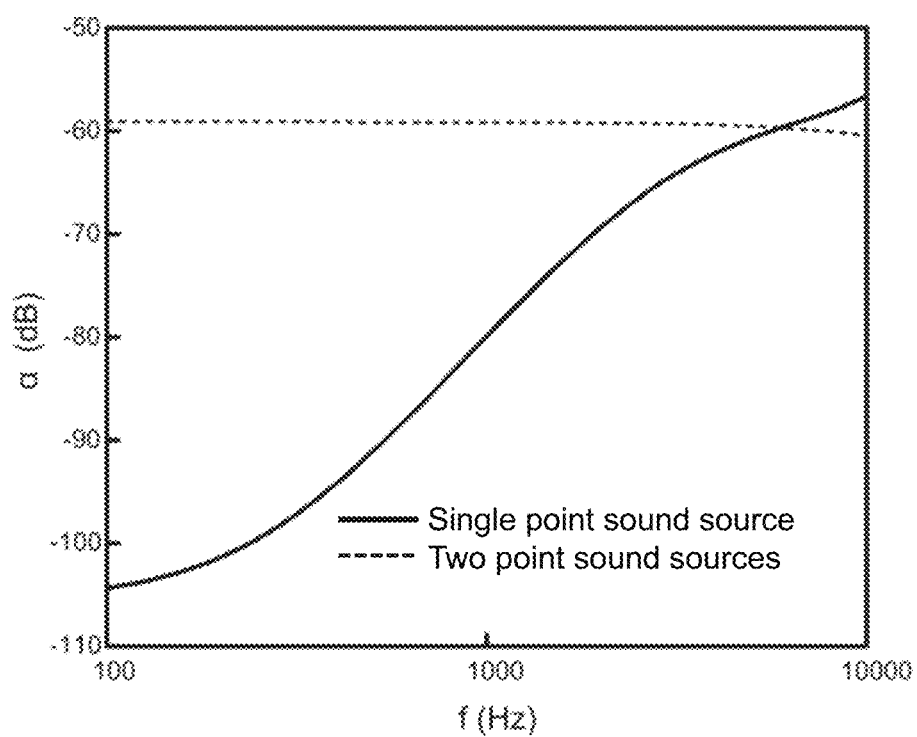
FIG. 5 is a schematic diagram illustrating a variation of a sound leakage of two point sources and a single point source as a function of frequency according to some embodiments of the present disclosure.

As shown in FIG. 5, a sound field pressure p generated by two point sources may satisfy Equation (2):

$$p = \frac{A_1}{r_1} \exp j(\omega t - kr_1 + \varphi_1) + \frac{A_2}{r_2} \exp j(\omega t - kr_2 + \varphi_2), \quad (2)$$

where $A_1$ and $A_2$ denote intensities of the two point sources, and $\varphi_1$ and $\varphi_2$ denote phases of the two point sources, respectively, d denotes a distance between the two point sources, and $r_1$ and $r_2$ may satisfy Equation (3):

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases}, \quad (3)$$

where r denotes a distance between a target point and the center of the two point sources in the space, and θ indicates an angle between a line connecting the target point and the center of the two point sources and the line on which the two point sources are located.

It may be concluded from Equation (3) that a magnitude of the sound pressure p at the target point in the sound field may relate to the intensity of each point source, the distance d, the phase of each point source, and the distance r.

Two point sources with different output effects may be achieved by different settings of sound guiding holes, such that the volume of the near-field sound may be improved, and the far-field leakage may be reduced. For example, an acoustic driver may include a vibration diaphragm. When the vibration diaphragm vibrates, sounds may be transmitted from the front and rear sides of the vibration diaphragm, respectively. The front side of the vibration diaphragm in the acoustic output apparatus may be provided with a front chamber for transmitting sound. The front chamber may be acoustically coupled with a sound guiding hole. The sound on the front side of the vibration diaphragm may be transmitted to the sound guiding hole through the front chamber and further transmitted outwards. The rear side of the vibration diaphragm in the acoustic output apparatus may be provided with a rear chamber for transmitting sound. The rear chamber may be acoustically coupled with another sound guiding hole. The sound on the rear side of the vibration diaphragm may be transmitted to the sound guiding hole through the rear chamber and propagate further outwards. It should be noted that, when the vibration diaphragm is vibrating, the front side and the rear side of the vibration diaphragm may generate sounds with opposite phases. In some embodiments, the structures of the front chamber and rear chamber may be specially set so that the sound output by the acoustic driver at different sound guiding holes may meet a specific condition. For example, lengths of the front chamber and rear chamber may be specially designed such that sounds with a specific phase relationship (e.g., opposite phases) may be output at the two sound guiding holes. As a result, a problem that the acoustic output apparatus has a low volume in the near-field and a sound leakage in the far-field may be effectively resolved.

Under certain conditions, compared to the volume of a far-field leakage of a single point source, the volume of a far-field leakage of two point sources may increase with the frequency. In other words, the leakage reduction capability of the two point sources in the far field may decrease when the frequency increases. For further description, a curve illustrating a relationship between a far-field leakage and a frequency may be described in connection with FIG. 5.

FIG. 5 is a schematic diagram illustrating a variation of a sound leakage of two point sources and a single point source as a function of frequency according to some embodiments of the present disclosure. The distance between the two point sources in FIG. 5 may be fixed, and the two point sources may have a substantially same amplitude and opposite phases. The dotted line may indicate a variation curve of a volume of a leaked sound of the single point source at different frequencies. The solid line may indicate a variation curve of a volume of a leaked sound of the two point sources at different frequencies. The abscissa of the diagram may represent the sound frequency (f), and the unit may be Hertz (Hz). The ordinate of the diagram may use a normalization parameter α to evaluate the volume of a leaked sound. The parameter α may be determined according to Equation (4):

$$\alpha = \frac{|P_{far}|^2}{|P_{ear}|^2}, \quad (4)$$

where $P_{far}$ represents the sound pressure of the acoustic output apparatus in the far-field (i.e., the sound pressure of the far-field sound leakage). $P_{ear}$ represents the sound pressure around the user's ears (i.e., the sound pressure of the near-field sound). The larger the value of α is, the larger the far-field leakage relative to the near-field sound heard will be, indicating that a worse capability of the acoustic output apparatus for reducing the far-field leakage.

As shown in FIG. 5, when the frequency is below 6000 Hz, the far-field leakage produced by the two point sources may be less than the far-field leakage produced by the single point source, and may increase as the frequency increases. When the frequency is close to 10000 Hz (for example, about 8000 Hz or above), the far-field leakage produced by the two point sources may be greater than the far-field leakage produced by the single point source. In some embodiments, a frequency corresponding to an intersection of the variation curves of the two point sources and the single point source may be determined as an upper limit frequency that the two point sources are capable of reducing a sound leakage.

For illustrative purposes, when the frequency is relatively small (for example, in a range of 100 Hz~1000 Hz), the capability of reducing a sound leakage of the two point sources may be strong (e.g., the value of a is small, such as below −80 dB). In such a frequency band, an increase of the volume of the sound heard by the user may be determined as an optimization goal. When the frequency is larger (for example, in a range of 1000 Hz~8000 Hz), the capability of reducing a sound leakage of the two point sources may be weak (e.g., above −80 dB). In such a frequency band, a decrease of the sound leakage may be determined as the optimization goal.

According to FIG. 5, it may be possible to determine a frequency division point based on the variation tendency of the two point sources' capability of reducing a sound leakage. Parameters of the two point sources may be adjusted according to the frequency division point so as to reduce the sound leakage of the acoustic output apparatus. For example, the frequency corresponding to a of a specific value (for example, −60 dB, −70 dB, −80 dB, −90 dB, etc.) may be used as the frequency division point. Parameters of the two point sources may be determined to improve the near-field sound in a frequency band below the frequency division point, and/or to reduce the far-field sound leakage in a frequency band above the frequency division point. In some embodiments, a high-frequency band with a high frequency (for example, a sound output from a high-frequency acoustic driver) and a low-frequency band with a low frequency (for example, a sound output from a low-frequency acoustic driver) may be determined based on the frequency division point. More details of the frequency division point may be disclosed elsewhere in the present disclosure, for example, FIG. 7 and the descriptions thereof.

In some embodiments, the method for measuring and determining the sound leakage may be adjusted according to the actual conditions. For example, a plurality of points on a spherical surface centered by s center point of the two point sources with a radius of r (for example, 40 centimeter) may be identified, and an average value of amplitudes of the sound pressure at the plurality of points may be determined as the value of the sound leakage. The distance between the near-field listening position and the point sources may be far less than the distance between the point sources and the spherical surface for measuring the far-field leakage. Optionally, the ratio of the distance from the near-field listening position to the center of the two point sources to the radius r may be less than 0.3, 0.2, 0.15, or 0.1. As another example, one or more points of the far-field may be taken as the position for measuring the sound leakage, and the sound volume of the position may be taken as the value of the sound leakage. As another example, a center of the two point sources may be used as a center of a circle at the far field, and sound pressure amplitudes of two or more points evenly distributed at the circle according to a certain spatial angle may be averaged as the value of the sound leakage. These methods may be adjusted by those skilled in the art according to actual conditions, and are not intended to be limiting.

According to FIG. 5, it may be concluded that in the high-frequency band (a higher frequency band determined according to the frequency division point), the two point sources may have a weak capability to reduce a sound leakage. In the low-frequency band (a lower frequency band determined according to the frequency division point), the two point sources may have a strong capability to reduce a sound leakage. At a certain sound frequency, if the distance between the two point sources changes, its capability to reduce a sound leakage may be changed, and the difference between volume of the sound heard by the user (also referred to as "heard sound") and volume of the leaked sound may also be changed. For a better description, the curve of a far-field leakage as a function of the distance between the two point sources may be described with reference to FIGS. 6A and 6B.

Figure 6A:
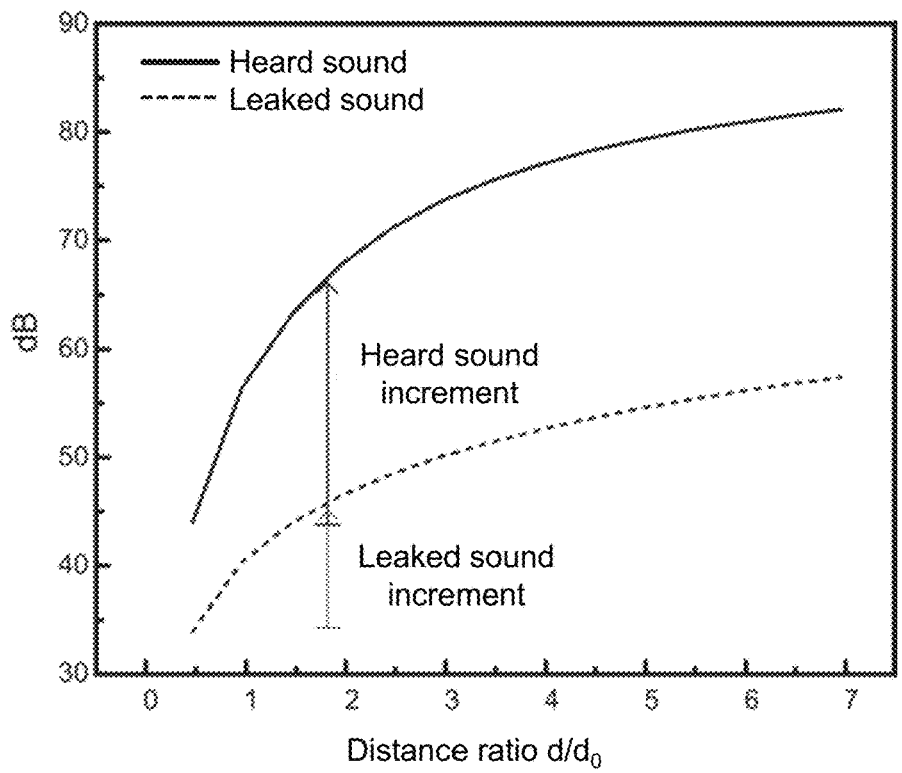
FIGS. 6A-6B are exemplary graphs illustrating a volume of a near-field sound and a volume of a far-field leakage as a function of a distance between two point sources according to some embodiments of the present disclosure.
Figure 6B:
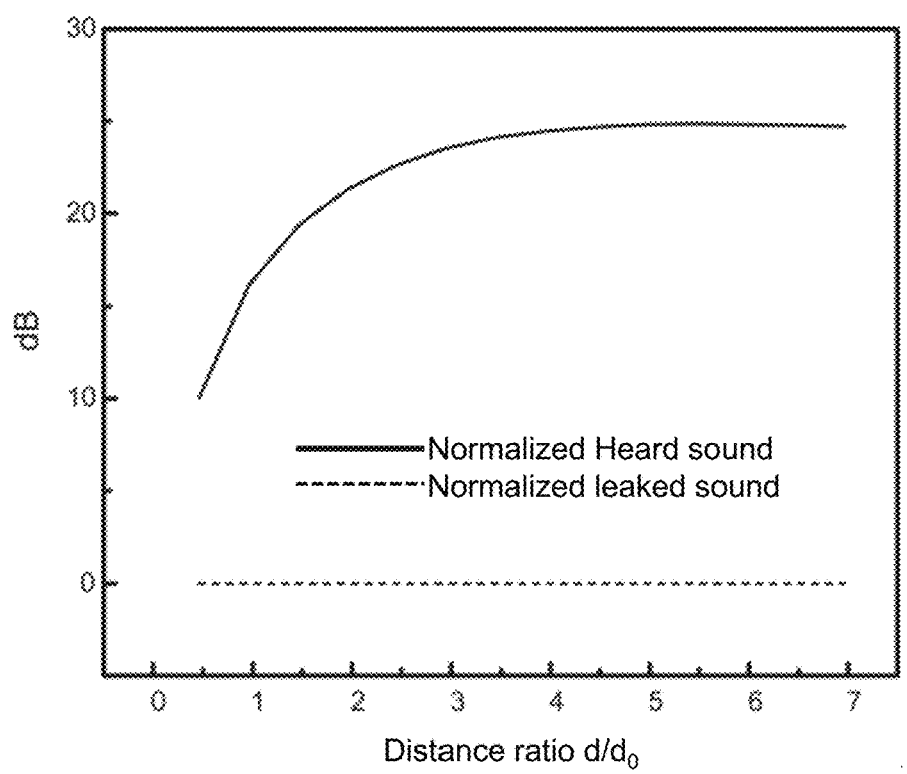

FIGS. 6A and 6B are exemplary graphs illustrating a volume of a near-field sound and a volume of a far-field leakage as a function of a distance between two point sources according to some embodiments of the present disclosure. FIG. 6B may be generated by performing a normalization on the graph in FIG. 6A.

In FIG. 6A, a solid line may represent a variation curve of the volume of the two point sources as a function of the distance between the two point sources, and the dotted line may represent a variation curve of the volume of the leaked sound of the two point sources as a function of the distance between the two point sources. The abscissa may represent a distance ratio d/d0 of the distance d of the two point sources to a reference distance d0. The ordinate may represent a sound volume (the unit is decibel dB). The distance ratio d/d0 may reflect a variation of the distance between the two point sources. In some embodiments, the reference distance d0 may be selected within a specific range. For example, d0 may be a specific value in the range of 2.5 mm-10 mm, e.g., d0 may be 5 mm. In some embodiments, the reference distance d0 may be determined based on a listening position. For example, the distance between the listening position to the nearest point source may be taken as the reference distance d0. It should be known that the reference distance d0 may be flexibly selected from any other suitable values according to the actual conditions, which is not limited here. Merely by way of example, in FIG. 6A, d0 may be 5 mm.

When the sound frequency is a constant, the volume of the sound heard by the user and volume of the leaked sound of the two point sources may increase as the distance between the two point sources increases. When the distance ratio d/d0 of is less than a threshold ratio, an increase (or increment) in the volume of the sound heard by the user may be larger than an increase (or increment) in the volume of the leaked sound as the distance between two point sources increases. That is to say, the increase in volume of the sound heard by the user may be more significant than the increase in volume of the leaked sound. For example, as shown in FIG. 6A, when the distance ratio d/d0 is 2, the difference between the volume of the sound heard by the user and the volume of the leaked sound may be about 20 dB. When the distance ratio d/d0 is 4, the difference between the volume of the sound heard by the user and the volume of the leaked sound may be about 25 dB. In some embodiments, when the distance ratio d/d0 reaches the threshold ratio, the ratio of the volume of the sound heard by the user to the volume of the leaked sound of the two point sources may reach a maximum value. At this time, as the distance of the two point sources further increases, the curve of the volume of the sound heard by the user and the curve of the volume of the leaked sound may gradually go parallel, that is, the increase in volume of the sound heard by the user and the increase in volume of the leaked sound may remain substantially the same. For example, as shown in FIG. 6B, when the distance ratio d/d0 is 5, 6, or 7, the difference between the volume of the sound heard by the user and the volume of the leaked sound may remain substantially the same, both of which may be about 25 dB. That is, the increase in volume of the sound heard by the user may be the same as the increase in volume of the leaked sound. In some embodiments, the threshold ratio of the distance ratio d/d0 of the two point sources may be in the range of 0~7. For example, the threshold ratio of d/d0 may be set in the range of 0.5~4.5. As another example, the threshold ratio of d/d0 may be set in the range of 1~4.

In some embodiments, the threshold ratio value may be determined based on the variation of the difference between the volume of the sound heard by the user and the volume of the leaked sound of the two point sources of FIG. 6A. For example, the ratio corresponding to the maximum difference between the volume of the sound heard by the user and the volume of the leaked sound may be determined as the threshold ratio. As shown in FIG. 6B, when the distance ratio d/d0 is less than the threshold ratio (e.g., 4), a curve of a normalized sound heard by the user (also referred to as "normalized heard sound") may show an upward trend (the slope of the curve being larger than 0) as the distance between the two point sources increases. That is, the increase in sound heard by the user volume may be greater than the increase in volume of the leaked sound. When the distance ratio d/d0 is greater than the threshold ratio, the slope of the curve of the normalized sound heard by the user may gradually approach 0 as the distance between the two point sources increases. That is to say, the increase in volume of the sound heard by the user may be no longer greater than the increase in volume of the leaked sound as the distance between the two point sources increases.

According to the descriptions above, if the listening position is fixed, the parameters of the two point sources may be adjusted by certain means. It may be possible to achieve an effect that the volume of the near-field sound has a significant increase while the volume of the far-field leakage only increases slightly (i.e., the increase in the volume of the near-field sound being greater than the volume of the far-field leakage). For example, two or more sets of two point sources (such as a set of high-frequency two point sources and a set of low-frequency two point sources) may be used. For each set, the distance between the point sources in the set is adjusted by a certain means, so that the distance between the high-frequency two point sources may be less than the distance between the low-frequency two point sources. The low-frequency two point sources may have a small sound leakage (the capability to reduce the sound leakage is strong), and the high-frequency two point sources have a large sound leakage (the capability to reduce the sound leakage is weak). The volume of the sound heard by the user may be significantly larger than the volume of the leaked sound if a smaller distance between the two point sources is set in the high-frequency band, thereby reducing the sound leakage.

In some embodiments, each acoustic driver may have a corresponding pair of sound guiding holes. The distance between the sound guiding holes corresponding to each acoustic driver may affect the volume of the near-field sound transmitted to the user's ears and the volume of the far-field leakage transmitted to the environment. In some embodiments, if the distance between the sound guiding holes corresponding to a high-frequency acoustic driver is less than that between the sound guiding holes corresponding to a low-frequency acoustic driver, the volume of the sound heard by the user may be increased and the sound leakage may be reduced, thereby preventing the sound from being heard by others near the user of the acoustic output apparatus. According to the above descriptions, the acoustic output apparatus may be effectively used as an open earphone even in a relatively quiet environment.

Figure 7:
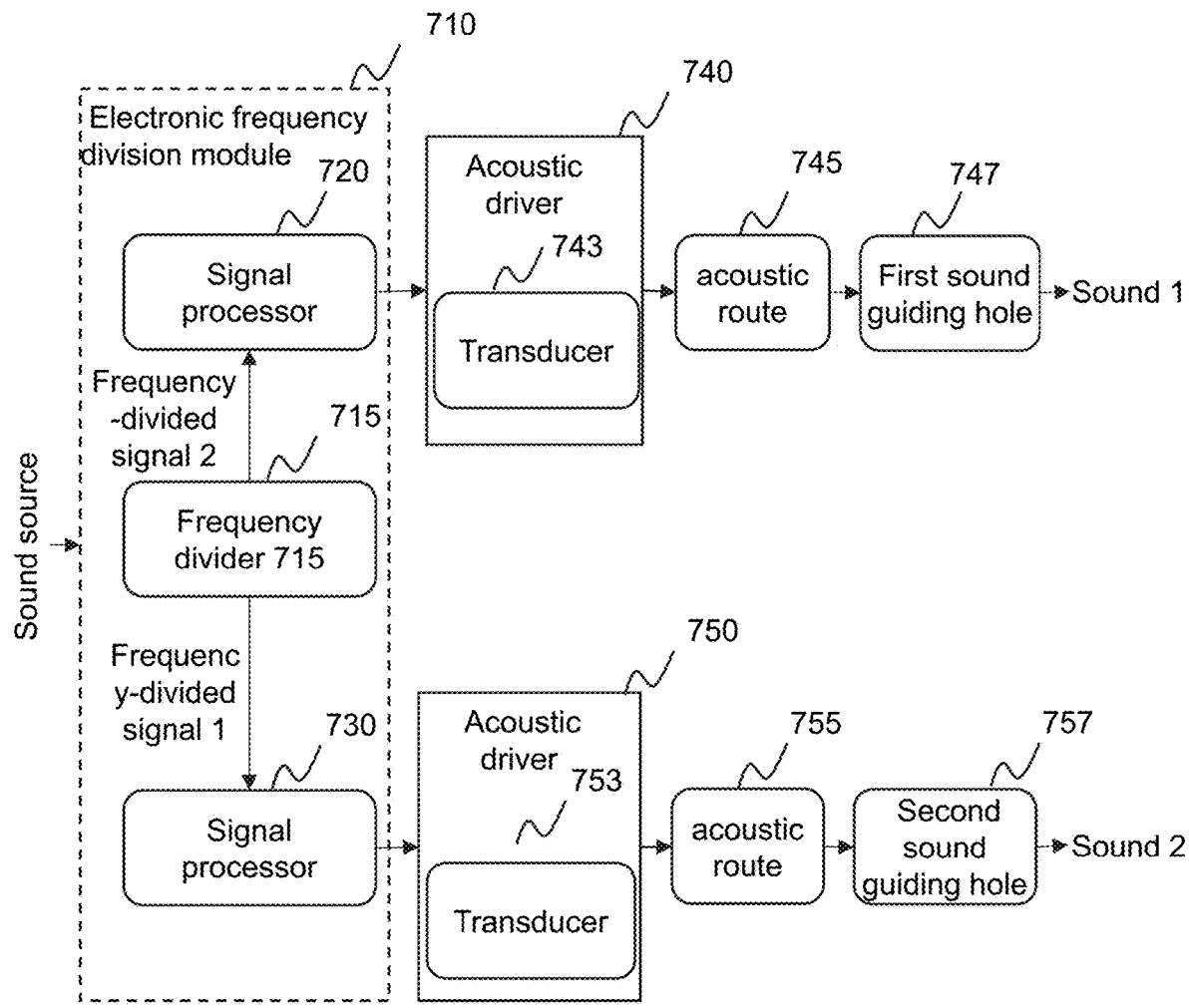
FIG. 7 is a schematic diagram illustrating an exemplary acoustic output apparatus according to some embodiments of the present disclosure.

FIG. 7 is a schematic diagram illustrating an exemplary acoustic output apparatus according to some embodiments of the present disclosure. As shown in FIG. 7, the acoustic output apparatus 700 may include an electronic frequency division module 710, an acoustic driver 740, an acoustic driver 750, an acoustic route 745, an acoustic route 755, at least two first sound guiding holes 747, and at least two second sound guiding holes 757. In some embodiments, the acoustic output apparatus 700 may further include a controller. The electronic frequency division module 710 may be part of the controller and configured to generate electrical signals that are input into different acoustic drivers. The connection between different components in the acoustic output apparatus 700 may be wired and/or wireless. For example, the electronic frequency division module 710 may send signals to the acoustic driver 740 and/or the acoustic driver 750 through a wired transmission or a wireless transmission.

The electronic frequency division module 710 may divide the frequency of a source signal. The source signal may come from one or more sound source apparatus (for example, a memory storing audio data). The sound source apparatus may be part of the acoustic output apparatus 700 or an independent device. The source signal may be an audio signal that is received by the acoustic output apparatus 700 via a wired or wireless means. In some embodiments, the electronic frequency division module 710 may decompose the source signal into two or more frequency-divided signals having different frequencies. For example, the electronic frequency division module 710 may decompose the source signal into a first frequency-divided signal (or frequency-divided signal 1) having a high-frequency sound and a second frequency-divided signal (or frequency-divided signal 2) having a low-frequency sound. For brevity, a frequency-divided signal having the high-frequency sound may be referred to as a high-frequency signal, and a frequency-divided signal having the low-frequency sound may be referred to as a low-frequency signal.

For the purposes of description, a low-frequency signal described in the present disclosure may refer to a sound signal with a frequency in a first frequency range (or referred to as a low-frequency range). A high-frequency signal may refer to a sound signal with a frequency in a second frequency range (or referred to as a high-frequency range). The first frequency range and the second frequency range may or may not include overlapping frequency ranges. The second frequency range may include frequencies higher than the first frequency range. Merely by way of example, the first frequency range may include frequencies below a first threshold frequency. The second frequency range may include frequencies above a second threshold frequency. The first threshold frequency may be lower than the second threshold frequency, or equal to the second threshold frequency, or higher than the second threshold frequency. For example, the first threshold frequency may be lower than the second threshold frequency (for example, the first threshold frequency may be 600 Hz and the second threshold frequency may be 700 Hz), which means that there is no overlap between the first frequency range and the second frequency range. As another example, the first threshold frequency may be equal to the second frequency (for example, both the first threshold frequency and the second threshold frequency may be 650 Hz or any other frequency values). As another example, the first threshold frequency may be higher than the second threshold frequency, which indicates that there is an overlap between the first frequency range and the second frequency range. In such cases, in some embodiments, the difference between the first threshold frequency and the second threshold frequency may not exceed a third threshold frequency. The third threshold frequency may be a fixed value, for example, 20 Hz, 50 Hz, 100 Hz, 150 Hz, or 200 Hz. Optionally, the third threshold frequency may be a value related to the first threshold frequency and/or the second threshold frequency (for example, 5%, 10%, 15%, etc., of the first threshold frequency). Alternatively, the third threshold frequency may be a value flexibly set by the user according to the actual needs, which may be not limited herein. It should be noted that the first threshold frequency and the second threshold frequency may be flexibly set according to different situations, and are not limited herein.

In some embodiments, the electronic frequency division module 710 may include a frequency divider 715, a signal processor 720, and a signal processor 730. The frequency divider 715 may be used to decompose the source signal into two or more frequency-divided signals containing different frequency components, for example, a frequency-divided signal 1 having a high-frequency sound component and a frequency-divided signal 2 having a low-frequency sound component. In some embodiments, the frequency divider 715 may be any electronic device that may implement the signal decomposition function, including but not limited to one of a passive filter, an active filter, an analog filter, a digital filter, or any combination thereof. In some embodiments, the frequency divider 715 may divide the source signal based on one or more frequency division points. A frequency division point may refer to a specific frequency distinguishing the first frequency range and the second frequency range. For example, when there is an overlapping frequency range between the first frequency range and the second frequency range, the frequency division point may be a feature point within the overlapping frequency range (for example, a low-frequency boundary point, a high-frequency boundary point, a center frequency point, etc., of the overlapping frequency range). In some embodiments, the frequency division point may be determined according to a relationship between the frequency and the sound leakage of the acoustic output apparatus (for example, the curves shown in FIGS. 5, 6A, and 6B). For example, considering that the sound leakage of the acoustic output apparatus changes with the frequency, a frequency point corresponding to the volume of the leaked sound satisfying a certain condition may be selected as the frequency division point, for example, 1000 Hz shown in FIG. 5. In some alternative embodiments, the user may specify a specific frequency as the frequency division point directly. For example, considering that the frequency range of sounds that the human ear may hear is 20 Hz-20 kHz, the user may select a frequency point in this range as the frequency division point. For example, the frequency division point may be 600 Hz, 800 Hz, 1000 Hz, 1200 Hz, or the like. In some embodiments, the frequency division point may be determined based on the performance of the acoustic drivers 740 and 750. For example, considering that a low-frequency acoustic driver and a high-frequency acoustic driver have different frequency response curves, the frequency division point may be selected within a frequency range. The frequency range may be above ½ of the upper limiting frequency of the low-frequency acoustic driver and below 2 times of the lower limiting frequency of the high-frequency acoustic driver. In some embodiments, the frequency division point may be selected in a frequency range above ⅓ of the upper limiting frequency of the low-frequency acoustic driver and below 1.5 times of the lower limiting frequency of the high-frequency acoustic driver. In some embodiments, in the overlapping frequency range, the positional relationship between point sources may also affect the volume of the sound produced by the acoustic output apparatus in the near field and the far field. More details may be found in International application No. PCT/CN2019/130886, filed on Dec. 31, 2019, the entire contents of which are hereby incorporated by reference.

The signal processor 720 and the signal processor 730 may further process a frequency-divided signal to meet the requirements of sound output. In some embodiments, the signal processor 720 and/or the signal processor 730 may include one or more signal processing components. For example, the signal processing components(s) may include, but not limited to, an amplifier, an amplitude modulator, a phase modulator, a delayer, a dynamic gain controller, or the like, or any combination thereof. Merely by way of example, the processing of a sound signal by the signal processor 720 and/or the signal processor 730 may include adjusting the amplitude of a portion of the sound signal that has a specific frequency. In some embodiments, if the first frequency range and the second frequency range overlap, the signal processors 720 and 730 may adjust the intensity of a portion of a sound signal that has the frequency in the overlapping frequency range (for example, reduce the amplitude of the portion that has the frequency in the overlapping frequency range). This may avoid that in a final sound outputted by acoustic output apparatus, the portion that corresponds to the overlapping frequency range may have an excessive volume caused by the superposition of multiple sound signals.

After being processed by the signal processors 720 or 730, the frequency-divided signals 1 and 2 may be transmitted to the acoustic drivers 740 and 750, respectively. In some embodiments, the processed frequency-divided signal transmitted into the acoustic driver 740 may be a sound signal having a lower frequency range (e.g., the first frequency range). Therefore, the acoustic driver 740 may also be referred to as a low-frequency acoustic driver. The processed frequency-divided transmitted into the acoustic driver 750 may be a sound signal having a higher frequency range (e.g., the second frequency range). Therefore, the acoustic driver 750 may also be referred to as a high-frequency acoustic driver. The acoustic driver 740 and the acoustic driver 850 may convert sound signals into a low-frequency sound and a high-frequency sound, respectively, then propagate the converted signals outwards.

In some embodiments, the acoustic driver 740 may be acoustically coupled to at least two first sound guiding holes. For example, the acoustic driver 740 may be acoustically coupled to the two first sound guiding holes 747 via two acoustic routes 745. The acoustic driver 740 may propagate sound through the at least two first sound guiding holes 747. The acoustic driver 750 may be acoustically coupled to at least two second sound guiding holes. For example, the acoustic driver 750 may be acoustically coupled to the two second sound guiding holes 757 via two acoustic routes 755. The acoustic driver 750 may propagate sound through the at least two second sound guiding holes 757. A sound guiding hole may be a small hole formed on the acoustic output apparatus with a specific opening and allows sound to pass. The shape of a sound guiding hole may include but not limited to a circle shape, an oval shape, a square shape, a trapezoid shape, a rounded quadrangle shape, a triangle shape, an irregular shape, or the like, or any combination thereof. In addition, the number of the sound guiding holes connected to the acoustic driver 840 or 850 may not be limited to two, which may be an arbitrary value instead, for example, three, four, six, or the like.

In some embodiments, in order to reduce the far-field leakage of the acoustic output apparatus 700, the acoustic driver 740 may be used to output low-frequency sounds with the same (or approximately the same) amplitude and opposite (or approximately opposite) phases via the at least two first sound guiding holes. The acoustic driver 750 may be used to output high-frequency sounds with the same (or approximately the same) amplitude and opposite (or approximately opposite) phases via the at least two second sound guiding holes. In this way, the far-field leakage of low-frequency sounds (or high-frequency sounds) may be reduced according to the principle of acoustic interference cancellation.

According to FIGS. 5, 6A and 6B, considering that the wavelength of a low-frequency sound is longer than that of a high-frequency sound, and in order to reduce the interference cancellation of the sound in the near field (for example, near the user's ear), the distance between the first sound guiding holes and the distance between the second sound guiding holes may have different values. For example, assuming that there is a first distance between the two first sound guiding holes and a second distance between the two second sound guiding holes, the first distance may be longer than the second distance. In some embodiments, the first distance and the second distance may be arbitrary values. Merely by way of example, the first distance may not be longer than 40 mm, for example, in the range of 20 mm-40 mm. The second distance may not be longer than 12 mm, and the first distance may be longer than the second distance. In some embodiments, the first distance may not be shorter than 12 mm. The second distance may be shorter than 7 mm, for example, in the range of 3 mm-7 mm. In some embodiments, the first distance may be 30 mm, and the second distance may be 5 mm. As another example, the first distance may be at least twice longer than the second distance. In some embodiments, the first distance may be at least three times longer than the second distance. In some embodiments, the first distance may be at least 5 times longer than the second distance.

As shown in FIG. 7, the acoustic driver 740 may include a transducer 743. The transducer 743 may transmit a sound to the first sound guiding hole(s) 747 through the acoustic route 745. The acoustic driver 750 may include a transducer 753. The transducer 753 may transmit a sound to the second sound guiding hole(s) 757 through the acoustic route 755. In some embodiments, the transducer may include, but not limited to, a transducer of a gas-conducting acoustic output apparatus, a transducer of a bone-conducted acoustic output apparatus, a hydroacoustic transducer, an ultrasonic transducer, or the like, or any combination thereof. In some embodiments, the transducer may be of a moving coil type, a moving iron type, a piezoelectric type, an electrostatic type, or a magneto strictive type, or the like, or any combination thereof.

In some embodiments, the acoustic drivers (such as the low-frequency acoustic driver 740, the high-frequency acoustic driver 750) may include transducers with different properties or different counts of transducers. For example, each of the low-frequency acoustic driver 740 and the high-frequency acoustic driver 750 may include a transducer, and the transducers of the frequency acoustic driver 740 and the high-frequency acoustic driver 750 may have different frequency response characteristics (such as a low-frequency speaker unit and a high-frequency speaker unit). As another example, the low-frequency acoustic driver 740 may include two transducers 743 (such as two low-frequency speaker units), and the high-frequency acoustic driver 750 may include two transducers 853 (such as two high-frequency speaker units).

In some embodiments, the acoustic output apparatus 700 may generate sounds with different frequency ranges by other means, for example, a transducer frequency division, an acoustic route frequency division, or the like. When the acoustic output apparatus 700 uses a transducer or an acoustic route to divide a sound, the electronic frequency division module 810 (e.g., the part inside the dotted frame in FIG. 7) may be omitted. The source signal may be input to the acoustic driver 740 and the acoustic driver 750, respectively.

In some embodiments, the acoustic output apparatus 700 may use a plurality of transducers to achieve signal frequency division. For example, the acoustic driver 740 and the acoustic driver 750 may convert the inputted source signal into a low-frequency signal and a high-frequency signal, respectively. Specifically, through the transducer 743 (such as a low-frequency speaker), the low-frequency acoustic driver 740 may convert the source signal into the low-frequency sound having a low-frequency component. The low-frequency sound may be transmitted to at least two first sound guiding holes 747 along at least two different acoustic routes 745. Then the low-frequency sound may be propagated outwards through the first sound guiding holes 747. Through the transducer 753 (such as a high-frequency speaker), the high-frequency acoustic driver 750 may convert the source signal into the high-frequency sound having a high-frequency component. The high-frequency sound may be transmitted to at least two second sound guiding holes 757 along at least two different acoustic routes 755. Then the high-frequency sound may be propagated outwards through the second sound guiding holes 757.

In some alternative embodiments, an acoustic route (e.g., the acoustic routes 745 and the acoustic routes 755) connecting a transducer and a sound guiding hole may affect the nature of the transmitted sound. For example, an acoustic route may attenuate or change the phase of the transmitted sound to some extent. In some embodiments, the acoustic route may include a sound tube, a sound cavity, a resonance cavity, a sound hole, a sound slit, a tuning net, or the like, or any combination thereof. In some embodiments, the acoustic route may include an acoustic resistance material, which may have a specific acoustic impedance. For example, the acoustic impedance may be in the range of 5MKS Rayleigh to 500MKS Rayleigh. Exemplary acoustic resistance materials may include but not limited to plastic, textile, metal, permeable material, woven material, screen material or mesh material, porous material, particulate material, polymer material, or the like, or any combination thereof. By setting acoustic routes of different acoustic impedances, the sounds output of different transducers may be acoustically filtered. In this case, the sounds output through different acoustic routes have different frequency components.

In some embodiments, the acoustic output apparatus 700 may utilize a plurality of acoustic routes to achieve signal frequency division. Specifically, the source signal may be inputted into a specific acoustic driver and converted into a sound including high and low-frequency components. The sound may be propagated along an acoustic route having a specific frequency selection characteristic. For example, the sound may be propagated along an acoustic route with a low-pass characteristic to a corresponding sound guiding hole to output a low-frequency sound. In this process, the high-frequency component of the sound may be absorbed or attenuated by the acoustic route with a low-pass characteristic. Similarly, the sound signal may propagate along an acoustic route with a high-pass characteristic to the corresponding sound guiding hole to output a high-frequency sound. In this process, the low-frequency component of the sound may be absorbed or attenuated by the acoustic route with the high-pass characteristic.

In some embodiments, the controller in the acoustic output apparatus 700 may cause the low-frequency acoustic driver 740 to output a sound in the first frequency range (i.e., a low-frequency sound), and cause the high-frequency acoustic driver 750 to output a sound in the second frequency range (i.e., a high-frequency sound). In some embodiments, the acoustic output apparatus 700 may also include a supporting structure. The supporting structure may be used to carry an acoustic driver (such as the high-frequency acoustic driver 750, the low-frequency acoustic driver 740), so that the acoustic driver may be positioned away from the user's ear. In some embodiments, the sound guiding hole(s) acoustically coupled with the high-frequency acoustic driver 850 may be located closer to an expected position of the user's ears (for example, the entrance of an ear canal), while the sound guiding hole(s) acoustically coupled with the low-frequency acoustic driver 740 may be located further away from the expected position. In some embodiments, the supporting structure may be used to package the acoustic driver. For example, the supporting structure may include a housing made of various materials such as plastic, metal, and cloth. The housing may encapsulate the acoustic driver and form a front chamber and a rear chamber corresponding to the acoustic driver. The front chamber may be acoustically coupled to one of the at least two sound guiding holes corresponding to the acoustic driver. The rear chamber may be acoustically coupled to the other of the at least two sound guiding holes corresponding to the acoustic driver. For example, the front chamber of the low-frequency acoustic driver 740 may be acoustically coupled to one of the at least two first sound guiding holes 747. The rear chamber of the low-frequency acoustic driver 740 may be acoustically coupled to the other of the at least two first sound guiding holes 747. The front chamber of the high-frequency acoustic driver 750 may be acoustically coupled to one of the at least two second sound guiding holes 757. The rear chamber of the high-frequency acoustic driver 750 may be acoustically coupled to the other of the at least two second sound guiding holes 757. In some embodiments, a sound guiding hole (such as the first sound guiding hole(s) 747 and the second sound guiding hole(s) 757) may be disposed on the housing.

The above description of the acoustic output apparatus 700 may be merely provided by way of example. Those skilled in the art may make adjustments and changes to the structure, quantity, etc., of the acoustic driver, which is not limiting in the present disclosure. In some embodiments, the acoustic output apparatus 700 may include any number of the acoustic drivers. For example, the acoustic output apparatus 700 may include two groups of the high-frequency acoustic drivers 750 and two groups of the low-frequency acoustic drivers 740, or one group of the high-frequency acoustic drives 750 and two groups of the low-frequency acoustic drivers 740, and these high-frequency/low-frequency drivers may be used to generate a sound in a specific frequency range, respectively. As another example, the acoustic driver 740 and/or the acoustic driver 750 may include an additional signal processor. The signal processor may have the same structural component as or different structural component from the signal processor 720 or 730.

It should be noted that the acoustic output apparatus and its modules shown in FIG. 7 may be implemented in various ways. For example, in some embodiments, the system and the modules may be implemented by hardware, software, or a combination of both. The hardware may be implemented by a dedicated logic. The software may be stored in a storage which may be executed by a suitable instruction execution system, for example, a microprocessor or a dedicated design hardware. It will be appreciated by those skilled in the art that the above methods and systems may be implemented by computer-executable instructions and/or embedded in control codes of a processor. For example, the control codes may be provided by a medium such as a disk, a CD or a DVD-ROM, a programmable memory device, such as read-only memory (e.g., firmware), or a data carrier such as an optical or electric signal carrier. The system and the modules in the present disclosure may be implemented not only by a hardware circuit in a programmable hardware device in an ultra large scale integrated circuit, a gate array chip, a semiconductor such a logic chip or a transistor, a field programmable gate array, or a programmable logic device. The system and the modules in the present disclosure may also be implemented by a software to be performed by various processors, and further also by a combination of hardware and software (e.g., firmware).

It should be noted that the above description of the acoustic output apparatus 700 and its components is only for convenience of description, and not intended to limit the scope of the present disclosure. It may be understood that, for those skilled in the art, after understanding the principle of the apparatus, it is possible to combine each unit or form a substructure to connect with other units arbitrarily without departing from this principle. For example, the electronic frequency division module 710 may be omitted, and the frequency division of the source signal may be implemented by the internal structure of the low-frequency acoustic driver 740 and/or the high-frequency acoustic driver 750. As another example, the signal processor 720 or 730 may be a part independent of the electronic frequency division module 710. Those modifications may fall within the scope of the present disclosure.

Figure 8A:
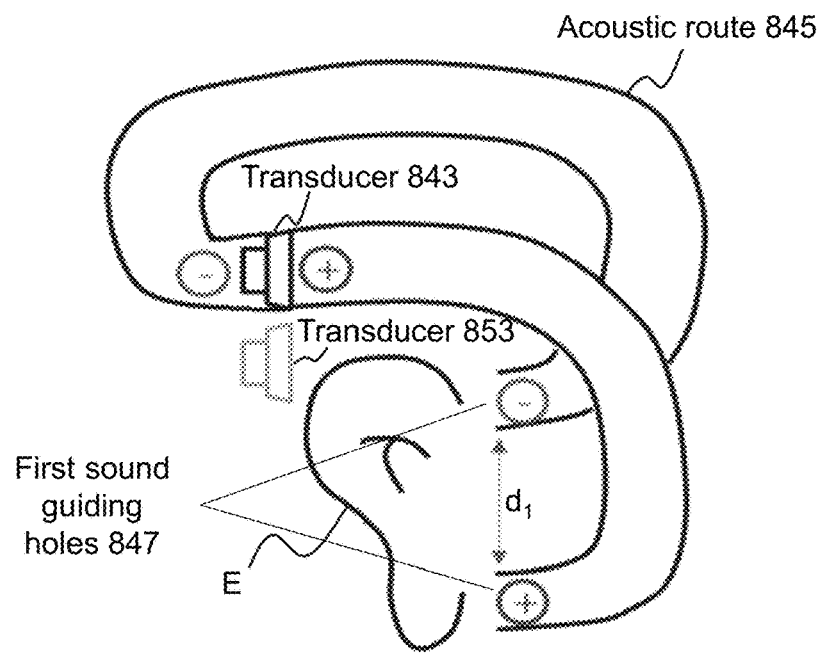
FIGS. 8A-8B are schematic diagrams illustrating exemplary acoustic output apparatuses according to some embodiments of the present disclosure.
Figure 8B:
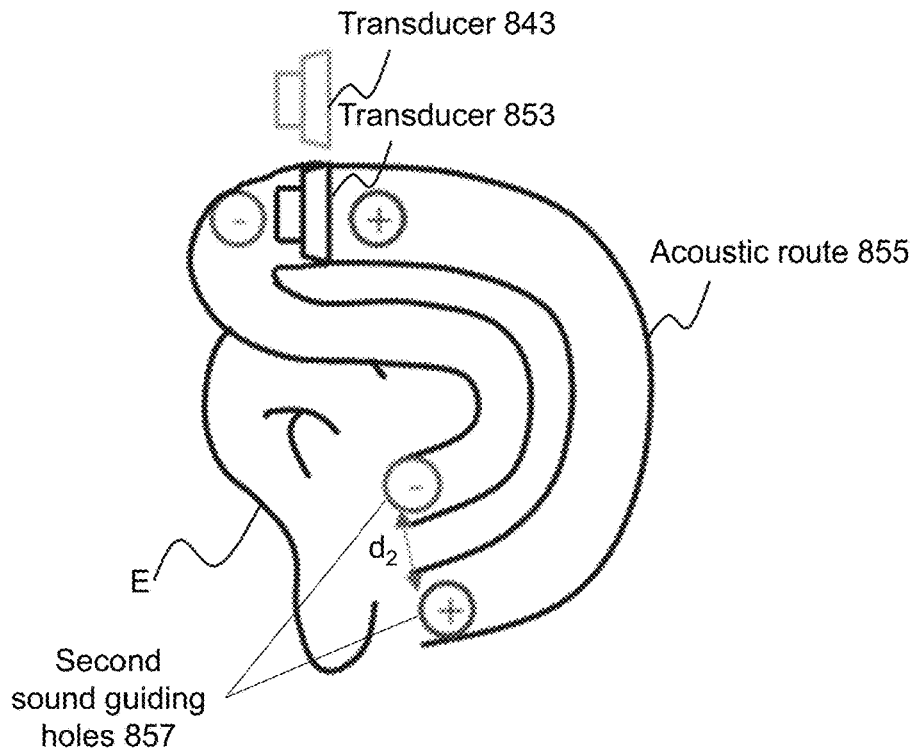

FIGS. 8A and 8B are schematic diagrams illustrating exemplary acoustic output apparatuses according to some embodiments of the present disclosure. For the purpose of illustration, sounds outputted by different sound guiding holes coupled with a same transducer may be described as an example. In FIGS. 8A and 8B, each transducer may have a front side and a rear side, and a front chamber and a rear chamber may exist on the front and rear side of the transducer, respectively. In some embodiments, these structures may have the same or approximately the same equivalent acoustic impedance, such that the transducer may be loaded symmetrically. The symmetrical load of the transducer may form sound sources satisfying an amplitude and phase relationship at different sound guiding holes (such as the "two point sources" having a same amplitude and opposite phases as described above), such that a specific sound field may be formed in the high-frequency range and/or the low-frequency range (for example, the near-field sound may be enhanced and the far-field leakage may be suppressed).

As shown in FIGS. 8A and 8B, an acoustic driver (for example, the acoustic driver 810 or 820) may include transducers, and acoustic routes and sound guiding holes connected to the transducers. In order to describe an actual application scenario of the acoustic output apparatus more clearly, a position of a user's ear E is shown in FIGS. 8A and 8B for explanation. FIG. 8A illustrates an application scenario of the acoustic driver 810. The acoustic driver 810 may include a transducer 843 (or referred to as a low-frequency acoustic driver), and the transducer 843 may be coupled with two first sound guiding holes 847 through an acoustic route 845. FIG. 8B illustrates an application scenario of the acoustic driver 820. The acoustic driver 920 may include a transducer 853 (or referred to as a high-frequency acoustic driver), and the transducer 853 may be coupled with two second sound guiding holes 857 through an acoustic route 855.

The transducer 843 or 853 may vibrate under the driving of an electric signal, and the vibration may generate sounds with equal amplitudes and opposite phases (180 degrees inversion). The type of the transducer may include, but not limited to, an air conduction speaker, a bone conduction speaker, a hydroacoustic transducer, an ultrasonic transducer, or the like, or any combination thereof. The transducer may be of a moving coil type, a moving iron type, a piezoelectric type, an electrostatic type, a magneto strictive type, or the like, or any combination thereof. In some embodiments, the transducer 843 or 853 may include a vibration diaphragm, which may vibrate when driven by an electrical signal, and the front and rear sides of the vibration diaphragm may simultaneously output a normal-phase sound and a reverse-phase sound. In FIGS. 8A and 8B, "+" and "−" may be used to represent sounds with different phases, wherein "+" may represent a normal-phase sound, and "−" may represent a reverse-phase sound.

In some embodiments, a transducer may be encapsulated by a casing of a supporting structure, and the interior of the housing may be provided with sound channels connected to the front and rear sides of the transducer, respectively, thereby forming an acoustic route. For example, a front cavity of the transducer 843 may be coupled to one of the two first sound guiding holes 847 through a first acoustic route (i.e., a half of the acoustic route 845), and a rear cavity of the transducer 843 may acoustically be coupled to the other sound guiding hole of the two first sound guiding holes 847 through a second acoustic route (i.e., the other half of the acoustic route 845). A normal-phase sound and a reverse-phase sound output from the transducer 843 may be output from the two first sound guiding holes 847, respectively. As another example, a front cavity of the transducer 853 may be coupled to one of the two sound guiding holes 857 through a third acoustic route (i.e., half of the acoustic route 855), and a rear cavity of the transducer 853 may be coupled to another sound guiding hole of the two second sound guiding holes 857 through a fourth acoustic route (i.e., the other half of the acoustic route 855). A normal-phase sound and a reverse-phase sound output from the transducer 853 may be output from the two second sound guiding holes 857, respectively.

In some embodiments, an acoustic route may affect the nature of the transmitted sound. For example, an acoustic route may attenuate or change the phase of the transmitted sound to some extent. In some embodiments, the acoustic route may include one or more of a sound tube, a sound cavity, a resonance cavity, a sound hole, a sound slit, a tuning net, or the like, or any combination thereof. In some embodiments, the acoustic route may include an acoustic resistance material, which may have a specific acoustic impedance. For example, the acoustic impedance may be in the range of 5MKS Rayleigh to 50MKS Rayleigh. In some embodiments, the acoustic resistance material may include but not limited to plastics, textiles, metals, permeable materials, woven materials, screen materials, and mesh materials, or the like, or any combination thereof. In some embodiments, in order to prevent the sound transmitted by the acoustic driver's front chamber and rear chamber from being differently disturbed, the front chamber and rear chamber corresponding to the acoustic driver may have the approximately same equivalent acoustic impedance. Additionally, sound guiding holes with the same acoustic resistance material, the same size and/or shape, etc., may be used.

The distance between the two first sound guiding holes 847 of the low-frequency acoustic driver may be expressed as d1 (i.e., the first distance). The distance between the two second sound guiding holes 857 of the high-frequency acoustic driver may be expressed as d2 (i.e., the second distance). By setting the distances d1 and d2, a higher sound volume output in the low-frequency band and a stronger ability to reduce the sound leakage in the high-frequency band may be achieved. For example, the distance between the two first sound guiding holes 847 is greater than the distance between the two second sound guiding holes 857 (i.e., d1>d2).

In some embodiments, the transducer 843 and the transducer 853 may be housed together in a housing of an acoustic output apparatus, and be placed in isolation in a structure of the housing.

In some embodiments, the acoustic output apparatus may include multiple sets of high-frequency acoustic drivers and low-frequency acoustic drivers. For example, the acoustic output apparatus may include a set of high-frequency acoustic drivers and a set of low-frequency acoustic drivers for simultaneously outputting sound to the left and/or right ears. As another example, the acoustic output apparatus may include two sets of high-frequency acoustic drivers and two sets of low-frequency acoustic drivers, wherein one set of high-frequency acoustic drivers and one set of low-frequency acoustic drivers may be used to output sound to a user's left ear, and the other set of high-frequency acoustic drivers and the other set of low-frequency acoustic drivers may be used to output sound to a user's right ear.

In some embodiments, the high-frequency acoustic driver and the low-frequency acoustic driver may have different powers. In some embodiments, the low-frequency acoustic driver may have a first power, the high-frequency acoustic driver may have a second power, and the first power may be greater than the second power. In some embodiments, the first power and the second power may be arbitrary values.

Figure 9A:
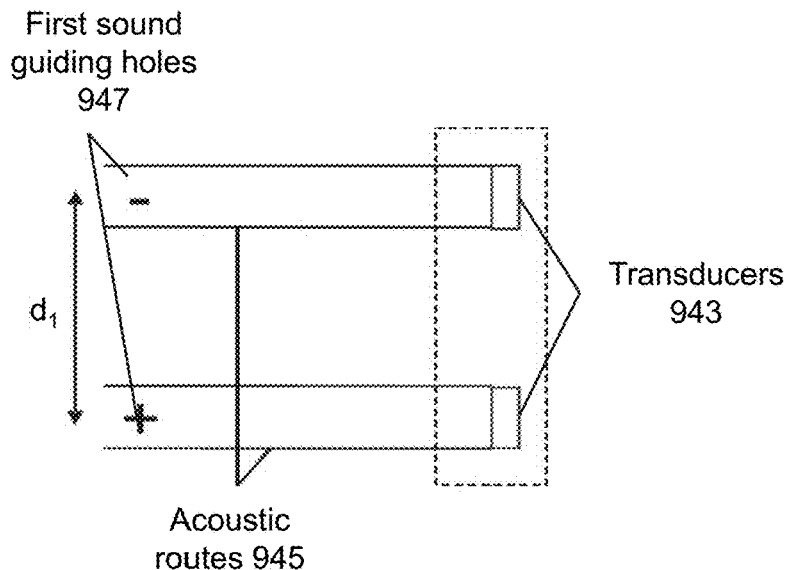
FIGS. 9A-9C are schematic diagrams illustrating sound output scenarios according to some embodiments of the present disclosure.
Figure 9B:
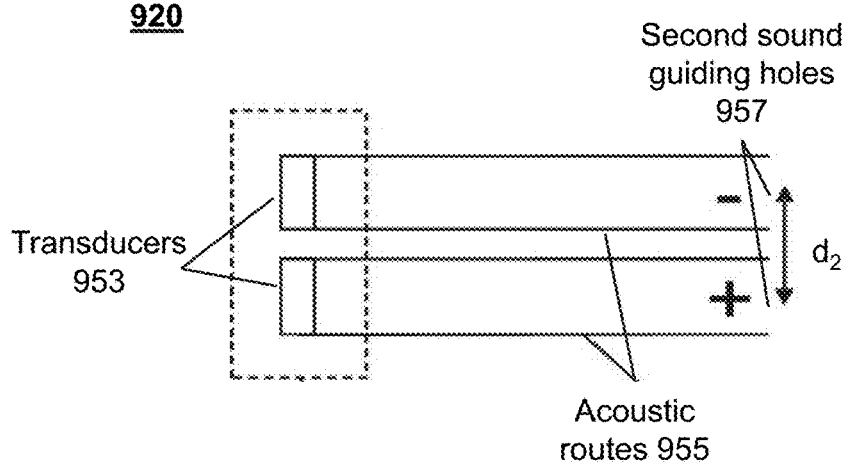
Figure 9C:
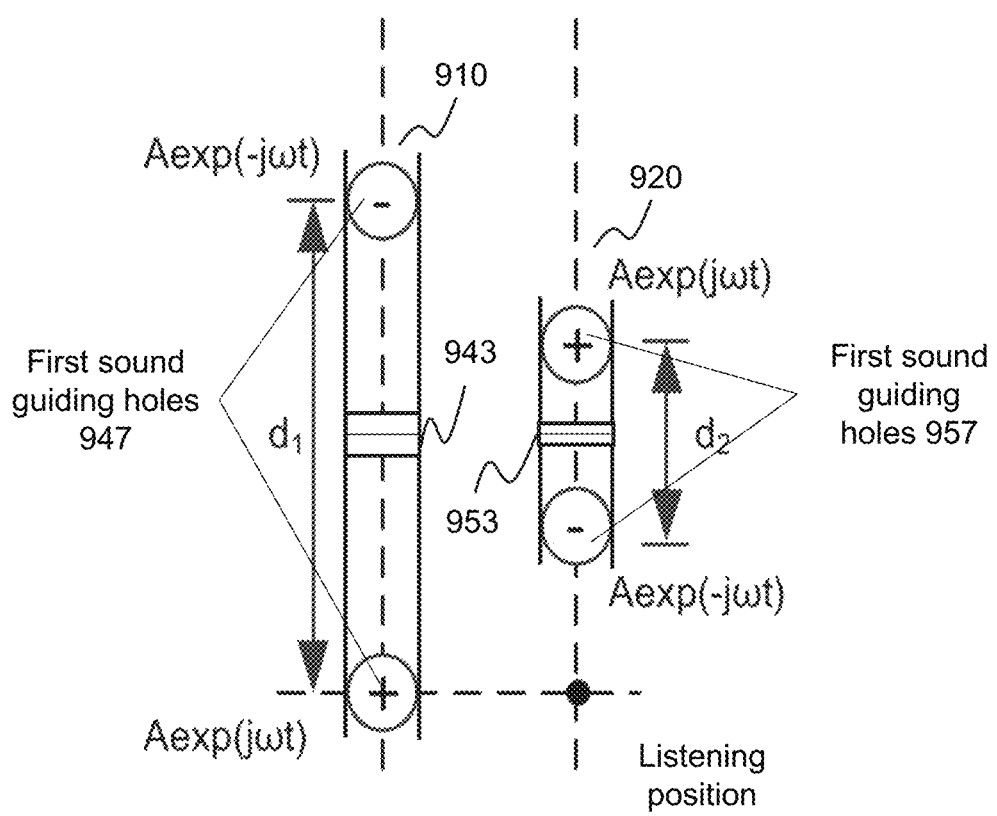

FIGS. 9A, 9B, and 9C are schematic diagrams illustrating sound output scenarios according to some embodiments of the present disclosure.

In some embodiments, the acoustic output apparatus may generate sounds in the same frequency range through two or more transducers, and the sounds may propagate outwards through different sound guiding holes. In some embodiments, different transducers may be controlled by the same controller or different controllers, and may produce sounds that satisfy a certain phase and amplitude condition (for example, sounds with the same amplitude but opposite phases, sounds with different amplitudes and opposite phases, etc.). For example, a controller may make the electrical signals input into two low-frequency transducers of an acoustic driver have the same amplitude and opposite phases. In this way, the two low-frequency transducers may output low-frequency sounds with the same amplitude but opposite phases.

Specifically, the two transducers in an acoustic driver (such as a low-frequency acoustic driver 910 or a high-frequency acoustic driver 920) may be arranged side by side in an acoustic output apparatus, one of which may be used to output a normal-phase sound, and the other may be used to output a reverse-phase sound. As shown in FIG. 9A, the acoustic driver 910 may include two transducers 943, two acoustic routes 945, and two first sound guiding holes 947.

As shown in FIG. 9B, the acoustic driver 950 may include two transducers 953, two acoustic routes 955, and two second sound guiding holes 957. Driven by electrical signals with opposite phases, the two transducers 943 may generate a set of low-frequency sounds with opposite phases (180 degrees inversion). One of the two transducers 943 (such as the transducer located below) may output a normal-phase sound, and the other (such as the transducer located above) may output a reverse-phase sound. The two low-frequency sounds with opposite phases may be transmitted to the two first sound guiding holes 947 along the two acoustic routes 945, respectively, and propagate outwards through the two first sound guiding holes 947. Similarly, driven by electrical signals with opposite phases, the two transducers 953 may generate a set of high-frequency sounds with opposite phases (180 degrees inversion). One of the two transducers 953 (such as the transducer located below) may output a normal-phase high-frequency sound, and the other (such as the transducer located above) may output a reverse-phase high-frequency sound. The high-frequency sounds with opposite phases may be transmitted to the two second sound guiding holes 957 along the two acoustic routes 955, respectively, and propagate outwards through the two second sound guiding holes 957.

In some embodiments, the two transducers in an acoustic driver (for example, the low-frequency acoustic driver 943 and the high-frequency acoustic driver 953) may be arranged relatively close to each other along a straight line, and one of them may be used to output a normal-phase sound and the other may be used to output a reverse-phase sound.

As shown in FIG. 9C, the left side may be the acoustic driver 910, and the right side may be the acoustic driver 920. The two transducers 943 of the acoustic driver 910 may generate a set of low-frequency sounds of equal amplitude and opposite phases under the control of the controller. One of the transducers 943 may output a normal-phase low-frequency sound, and transmit the normal-phase low-frequency sound along a first acoustic route to a first sound guiding hole 947. The other transducer 943 may output a reverse-phase low-frequency sound, and transmit the reverse-phase low-frequency sound along a second acoustic route to another first sound guiding hole 947. The two transducers 953 of the acoustic driver 920 may generate high-frequency sounds of equal amplitude and opposite phases under the control of the controller, respectively. One of the transducers 953 may output a normal-phase high-frequency sound, and transmit the normal-phase high-frequency sound along a third acoustic route to a second sound guiding hole 957. The other transducer 953 may output a reverse-phase high-frequency sound, and transmit the reverse-phase high-frequency sound along a fourth acoustic route to another second sound guiding hole 957.

In some embodiments, the transducer 943 and/or the transducer 953 may be of various suitable types. For example, the transducer 943 and the transducer 953 may be dynamic coil speakers, which may have the characteristics of a high sensitivity in low-frequency, a deep low frequency depth, and a small distortion. As another example, the transducer 943 and the transducer 953 may be moving iron speakers, which may have the characteristics of a small size, a high sensitivity, and a large high-frequency range. As another example, the transducers 943 and 953 may be air-conducted speakers or bone-conducted speakers. As yet another example, the transducer 943 and the transducer 953 may be balanced armature speakers. In some embodiments, the transducer 943 and the transducer 953 may be of different types. For example, the transducer 1043 may be a moving iron speaker, and the transducer 953 may be a moving coil speaker. As another example, the transducer 943 may be a dynamic coil speaker, and the transducer 953 may be a moving iron speaker.

In FIGS. 9A-9C, the distance between the two point sources of the acoustic driver 910 may be d1, the distance between the two point sources of the acoustic driver 920 may be d2, and d1 may be greater than d2. As shown in FIG. 9C, the listening position (that is, the position of the ear canal when the user wears an acoustic output apparatus) may be approximately located at a line of a set of two point sources. In some embodiments, the listening position may be located at any suitable position. For example, the listening position may be located on a circle centered at the center point of the two point sources. As another example, the listening position may be on the same side of the two lines of the two sets of point sources.

It may be understood that the simplified structure of the acoustic output apparatus shown in FIGS. 9A-9C may be merely by way of example, which may be not a limitation for the present disclosure. In some embodiments, the acoustic output apparatus may include a supporting structure, a controller, a signal processor, or the like, or any combination thereof.

Figure 10A:
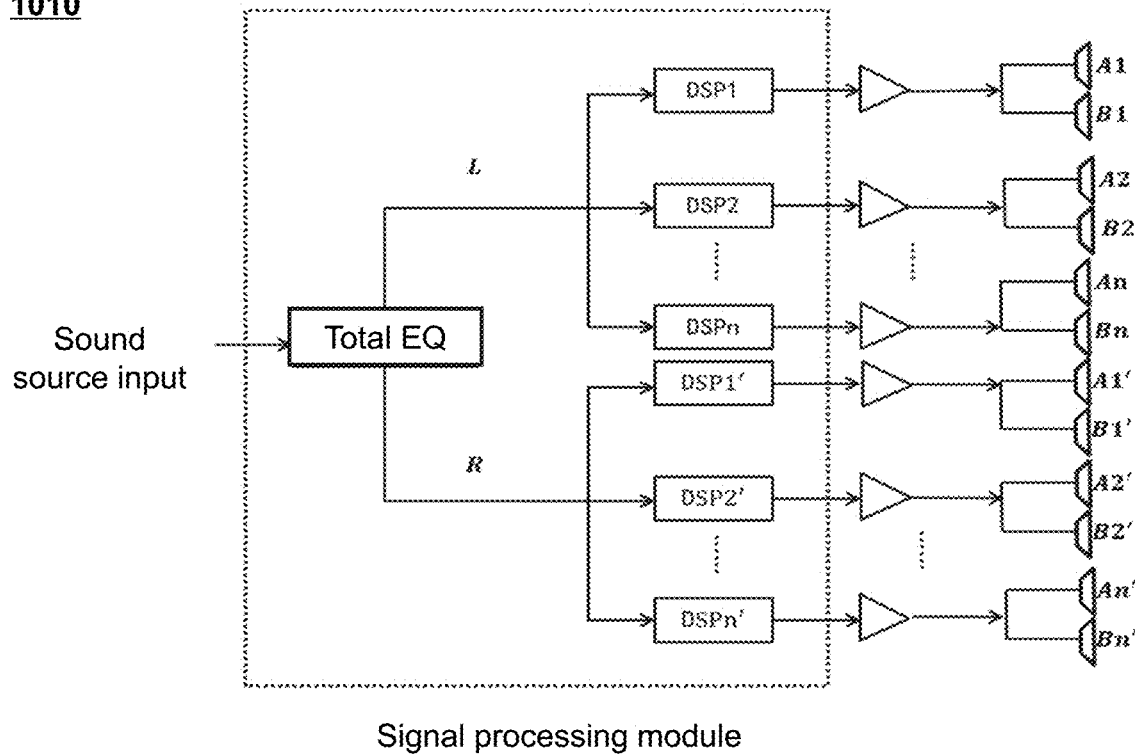
FIGS. 10A-10B are schematic diagrams illustrating acoustic output apparatuses according to some embodiments of the present disclosure.
Figure 10B:
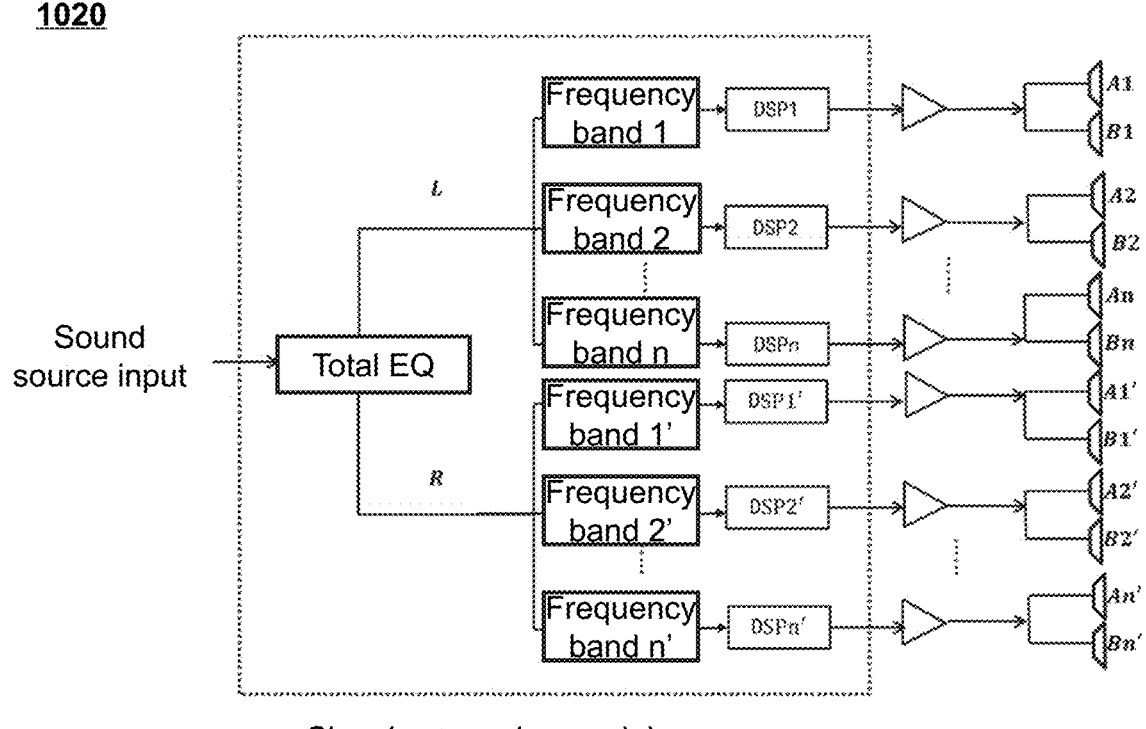

FIGS. 10A and 10B are schematic diagrams illustrating an acoustic output apparatus according to some embodiments of the present disclosure.

In some embodiments, acoustic drivers (e.g., acoustic drivers 943 or 953) may include multiple narrow-band speakers. As shown in FIG. 10A, the acoustic output apparatus may include a plurality of narrow-band speaker units and a signal processing module. On the left or right side of the user, the acoustic output apparatus may include n groups of narrow-band speaker units, respectively. Each group of narrow-band speaker units may have different frequency response curves, and the frequency response of each group may be complementary and collectively cover the audible sound frequency band. A narrow-band speaker unit used herein may be an acoustic driver with a narrower frequency response range than a low-frequency acoustic driver and/or a high-frequency acoustic driver. Taking the speaker units located at the left side of the user as shown in FIG. 10A as an example: A1~An and B1~Bn form n groups of two point sources. When a same electrical signal is input, each two point sources may generate sounds with different frequency ranges. By setting the distance dn between each group of two point sources, the near-field and far-field sound of each frequency band may be adjusted. For example, in order to enhance the volume of near-field sound and reduce the volume of far-field leakage, the distance between a pair of two point sources corresponding to a high frequency may be less than the distance between a pair of two point sources corresponding to a low frequency.

In some embodiments, the signal processing module may include an Equalizer (EQ) processing module and a Digital Signal Processor (DSP) processing module. The signal processing module may be used to implement signal equalization and other digital signal processing algorithms (such as amplitude modulation and phase modulation). The processed signal may be connected to a corresponding acoustic driver (for example, a narrow-band speaker unit) to output a sound. Preferably, a narrow-band speaker unit may be a dynamic coil speaker or a moving iron speaker. In some embodiments, the narrow-band speaker unit may be a balanced armature speaker. Two point sources may be constructed using two balanced armature speakers, and the sound output from the two speakers may be in opposite phases.

In some embodiments, an acoustic driver (such as acoustic drivers 740, 750) may include multiple sets of full-band speakers. As shown in FIG. 10B, the acoustic output apparatus may include a plurality of sets of full-band speaker units and a signal processing module. On the left or right side of the user, the acoustic output apparatus may include n groups of full-band speaker units, respectively. Each full-band speaker unit may have the same or similar frequency response curve, and may cover a wide frequency range.

Taking the speaker units located at the left side of the user as shown in FIG. 10B as an example: A1~An and B1~Bn form n groups of two point sources. The difference between FIGS. 10A and 10B may be that the signal processing module in FIG. 10B may include at least one set of filters for performing frequency division on the sound source signal to generate electric signals corresponding to different frequency ranges, and the electric signals corresponding to different frequency ranges may be input into each group of full-band speaker units. In this way, each group of speaker units (similar to the two point sources) may produce sounds with different frequency ranges separately.

Figure 11A:
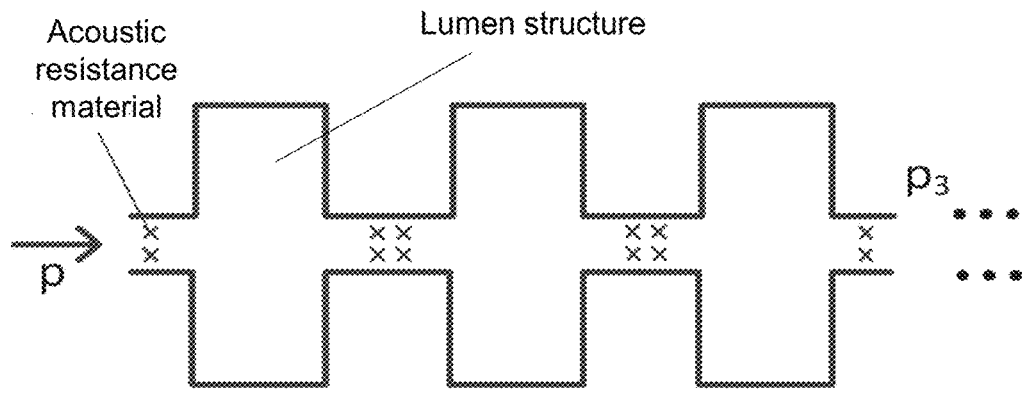
FIGS. 11A-11C are schematic diagrams illustrating acoustic routes according to some embodiments of the present disclosure.
Figure 11B:
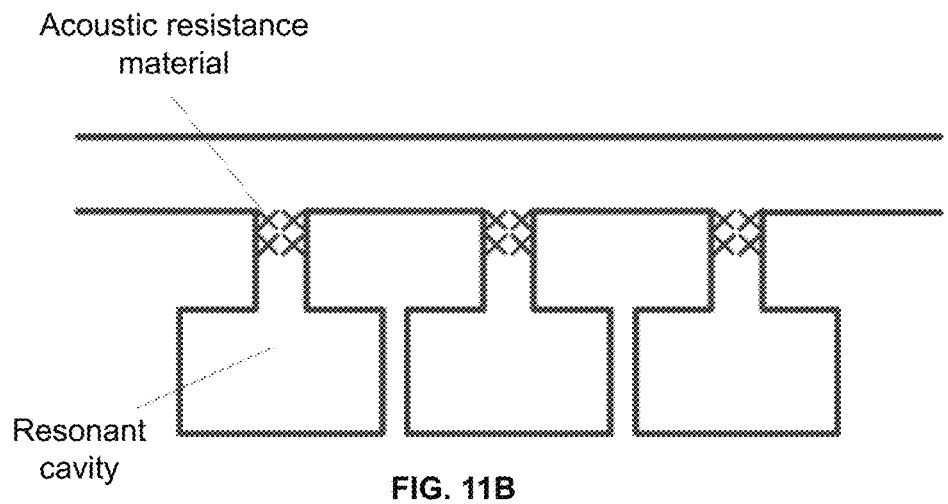
Figure 11C:
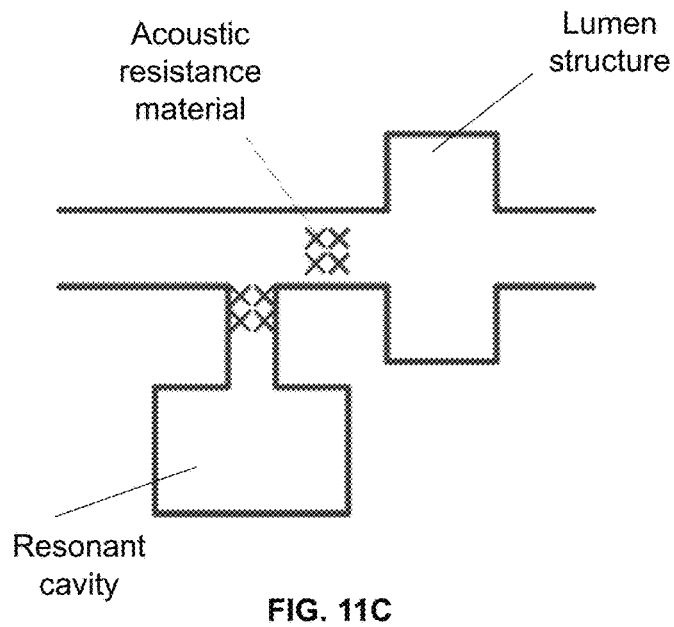

FIGS. 11A-11C are schematic diagrams illustrating an acoustic route according to some embodiments of the present disclosure.

As described above, an acoustic filtering structure may be constructed by setting structures such as a sound tube, a sound cavity, and a sound resistance in an acoustic route to achieve frequency division of sound. FIGS. 11A-11C show schematic structural diagrams of frequency division of a sound signal using an acoustic route. It should be noted that FIGS. 11A-11C may be examples of setting the acoustic route when using the acoustic route to perform frequency division on the sound signal, and may not be a limitation on the present disclosure.

As shown in FIG. 11A, an acoustic route may include one or more groups of lumen structures connected in series, and an acoustic resistance material may be provided in the lumen structures to adjust the acoustic impedance of the entire structure to achieve a filtering effect. In some embodiments, a band-pass filtering or a low-pass filtering may be performed on the sound by adjusting the size of the lumen structures and/or the acoustic resistance material to achieve frequency division of the sound. As shown in FIG. 11B, a structure with one or more sets of resonant cavities (for example, Helmholtz cavity) may be constructed on a branch of the acoustic route, and the filtering effect may be achieved by adjusting the size of each resonant cavity and the acoustic resistance material. As shown in FIG. 11C, a combination of a lumen structure and a resonant cavity (for example, a Helmholtz cavity) may be constructed in an acoustic route, and a filtering effect may be achieved by adjusting the size of the lumen structure and/or a resonant cavity, and/or the acoustic resistance material.

Figure 12:
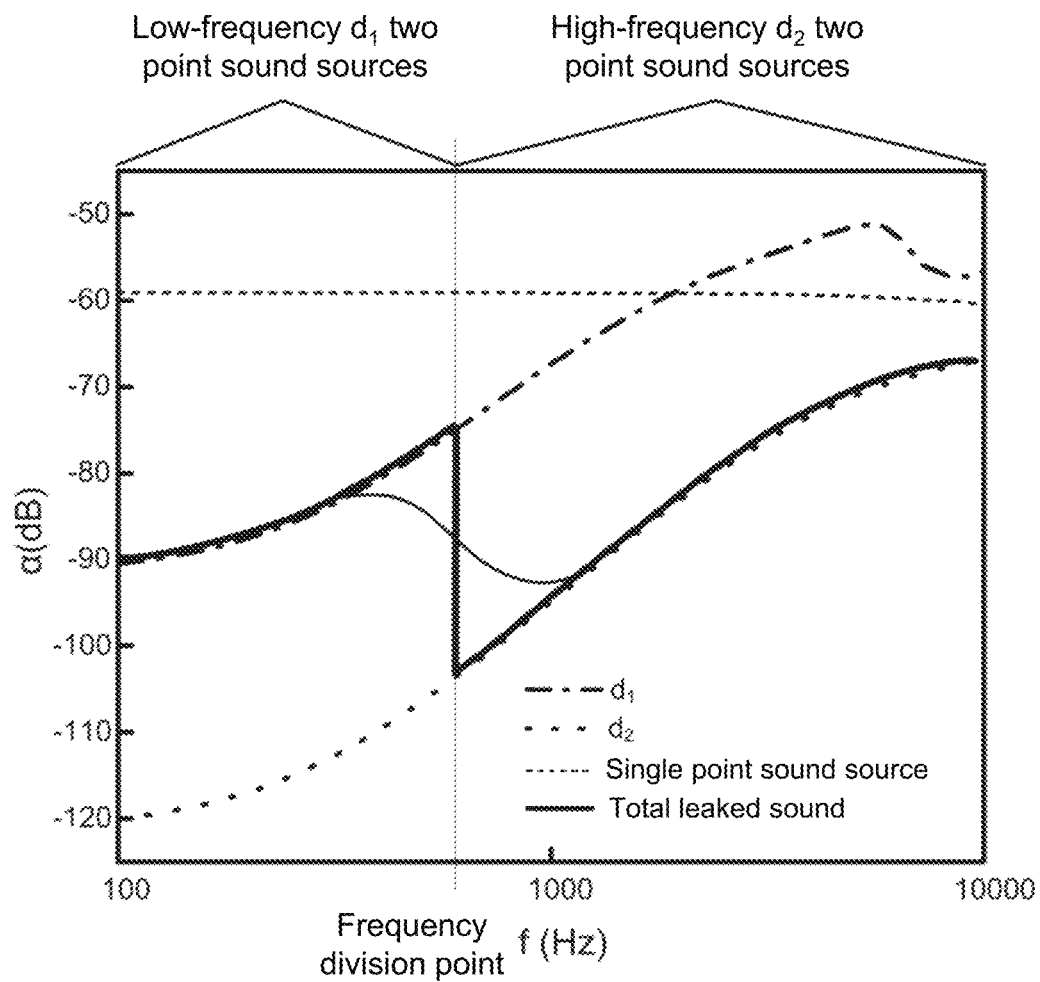
FIG. 12 shows a curve of a sound leakage of an acoustic output apparatus under the action of two sets of two point sources (a set of high-frequency two point sources and a set of low-frequency two point sources) according to some embodiments of the present disclosure.

FIG. 12 shows a curve of a sound leakage of an acoustic output apparatus (for example, the acoustic output apparatus 700) under the action of two sets of two point sources (a set of high-frequency two point sources and a set of low-frequency two point sources). The frequency division points of the two sets of two point sources may be around 700 Hz.

A normalization parameter a may be used to evaluate the volume of the leaked sound (descriptions of a may be found in Equation (4)). As shown in FIG. 12, compared with a single point source, the two sets of two point sources may have a stronger ability to reduce sound leakage. In addition, compared with the acoustic output apparatus provided with only one set of two point sources, the two sets of two point sources may output high-frequency sounds and low-frequency sounds, separately. The distance between the low-frequency two point sources may be greater than that of the high-frequency two point sources. In the low-frequency range, by setting a larger distance (d1) between the low frequency two point sources, the increase in the volume of the near-field sound may be greater than the increase in the volume of the far-field leakage, which may achieve a higher volume of the near-field sound output in the low-frequency band. At the same time, in the low-frequency range, because that the sound leakage of the low frequency two point sources is very small, increasing the distance d1 may slightly increase the sound leakage. In the high-frequency range, by setting a small distance (d2) between the high frequency two point sources, the problem that the cutoff frequency of high-frequency sound leakage reduction is too low and the audio band of the sound leakage reduction is too narrow may be overcame. Therefore, by setting the distance d1 and/or the distance d2, the acoustic output apparatus provided in the embodiments of the present disclosure may obtain a stronger sound leakage suppressing capability than an acoustic output apparatus having a single point source or a single set of two point sources.

In some embodiments, affected by factors such as the filter characteristic of a circuit, the frequency characteristic of a transducer, and the frequency characteristic of an acoustic route, the actual low-frequency and high-frequency sounds of the acoustic output apparatus may differ from those shown in FIG. 12. In addition, low-frequency and high-frequency sounds may have a certain overlap (aliasing) in the frequency band near the frequency division point, causing the total sound leakage reduction of the acoustic output apparatus not have a rapid change at the frequency division point as shown in FIG. 12. Instead, there may be a gradient and/or a transition in the frequency band near the frequency division point, as shown by a thin solid line in FIG. 12. It may be understood that these differences may not affect the overall leakage reduction effect of the acoustic output apparatus provided by the embodiments of the present disclosure.

According to FIGS. 7 to 12 and the related descriptions, the acoustic output apparatus provided by the present disclosure may be used to output sounds in different frequency bands by setting high-frequency two point sources and low-frequency two point sources, thereby achieving a better acoustic output effect. In addition, by setting different sets of two point sources with different distances, the acoustic output apparatus may have a stronger capability to reduce the sound leakage in a high frequency band, and meet the requirements of an open acoustic output apparatus.

In some alternative embodiments, an acoustic output apparatus may include at least one acoustic driver, and the sound generated by the at least one acoustic driver may propagate outwards through at least two sound guiding holes coupled with the at least one acoustic driver. In some embodiments, the acoustic output apparatus may be provided with a baffle structure, so that the at least two sound guiding holes may be distributed on two sides of the baffle. In some embodiments, the at least two sound guiding holes may be distributed on both sides of the user's auricle. At this time, the auricle may serve as a baffle that separates the at least two sound guiding holes, so that the at least two sound guiding holes may have different acoustic routes to the user's ear canal. More descriptions of two point sources and a baffle may be found in International applications No. PCT/CN2019/130921 and No. PCT/CN2019/130942, both filed on Dec. 31, 2019, the entire contents of each of which are hereby incorporated by reference in the present disclosure.

Figure 13:
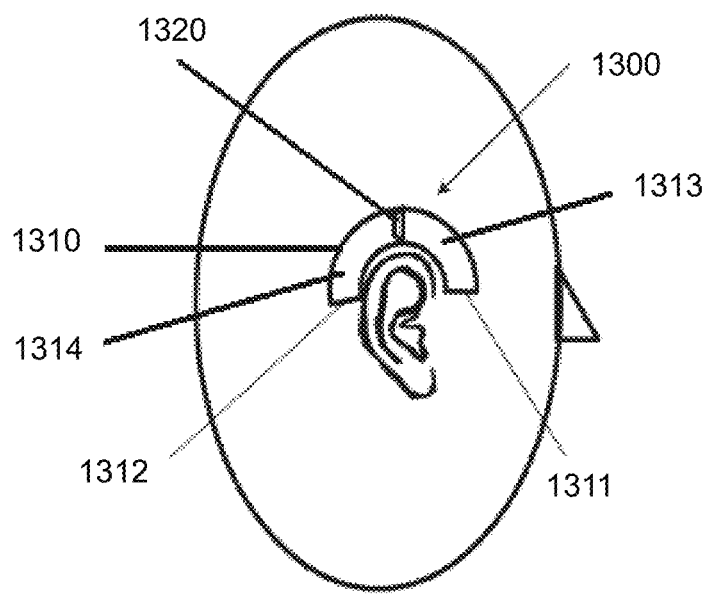
FIG. 13 is a schematic diagram illustrating another exemplary acoustic output apparatus according to some embodiments of the present disclosure.

FIG. 13 is a schematic diagram illustrating another exemplary acoustic output apparatus according to some embodiments of the present disclosure. As shown in FIG. 13, the acoustic output apparatus 1300 may include a supporting structure 1310 and an acoustic driver 1320 mounted within the supporting structure 1310. In some embodiments, the acoustic output apparatus 1300 may be worn on the user's body (for example, the human body's head, neck, or upper torso) through the supporting structure 1310. At the same time, the supporting structure 1310 and the acoustic driver 1320 may approach but not block the ear canal, so that the user's ear may remain open, thus the user may hear both the sound output from the acoustic output apparatus 1300 and the sound of the external environment. For example, the acoustic output apparatus 1300 may be arranged around or partially around the user's ear, and transmit sounds by means of air conduction or bone conduction.

The supporting structure 1310 may be used to be worn on the user's body and include one or more acoustic drivers 1320. In some embodiments, the supporting structure 1310 may have an enclosed shell structure with a hollow interior, and the one or more acoustic drivers 1320 may be located inside the supporting structure 1310. In some embodiments, the acoustic output apparatus 1300 may be combined with a product, such as glasses, a headset, a display apparatus, an AR/VR helmet, etc. In this case, the supporting structure 1310 may be fixed near the user's ear in a hanging or clamping manner. In some alternative embodiments, a hook may be provided on the supporting structure 1310, and the shape of the hook may match the shape of the user's auricle, so that the acoustic output apparatus 1300 may be independently worn on the user's ear through the hook. The acoustic output apparatus 1300 may communicate with a signal source (for example, a computer, a mobile phone, or other mobile devices) in a wired or wireless manner (for example, Bluetooth). For example, the acoustic output apparatus 1300 at the left and right ears may be directly in communication connection with the signal source in a wireless manner. As another example, the acoustic output apparatus 1300 at the left and right ears may include a first output apparatus and a second output apparatus. The first output apparatus may be in communication connection with the signal source, and the second output apparatus may be wirelessly connected with the first output apparatus in a wireless manner. The audio output of the first output apparatus and the second output apparatus may be synchronized through one or more synchronization signals. A wireless connection disclosed herein may include but not limited to a Bluetooth, a local area network, a wide area network, a wireless personal area network, a near field communication, or the like, or any combination thereof.

In some embodiments, the supporting structure 1310 may have a shell structure with a shape suitable for human ears, for example, a circular ring, an oval, a polygonal (regular or irregular), a U-shape, a V-shape, a semi-circle, so that the supporting structure 1310 may be directly hooked at the user's ear. In some embodiments, the supporting structure 1310 may include one or more fixed structures. The fixed structure(s) may include an ear hook, a head strip, or an elastic band, so that the acoustic output apparatus 1300 may be better fixed on the user, preventing the acoustic output apparatus 1300 from falling down. Merely by way of example, the elastic band may be a headband to be worn around the head region. As another example, the elastic band may be a neckband to be worn around the neck/shoulder region. In some embodiments, the elastic band may be a continuous band and be elastically stretched to be worn on the user's head. In the meanwhile, the elastic band may also exert pressure on the user's head so that the acoustic output apparatus 1300 may be fixed to a specific position on the user's head. In some embodiments, the elastic band may be a discontinuous band. For example, the elastic band may include a rigid portion and a flexible portion. The rigid portion may be made of a rigid material (for example, plastic or metal), and the rigid portion may be fixed to the supporting structure 1310 of the acoustic output apparatus 1300 by a physical connection. The flexible portion may be made of an elastic material (for example, cloth, composite, or/and neoprene).

In some embodiments, when the user wears the acoustic output apparatus 1300, the supporting structure 1310 may be located above or below the auricle. The supporting structure 1310 may be provided with a sound guiding hole 1311 and a sound guiding hole 1312 for transmitting sound. In some embodiments, the sound guiding hole 1311 and the sound guiding hole 1312 may be located at both sides of the user's auricle, respectively, and the acoustic driver 1320 may output sounds through the sound guiding hole 1311 and the sound guiding hole 1312.

The acoustic driver 1320 may be a component that may receive an electrical signal, and convert the electrical signal into a sound signal for output. In some embodiments, in terms of frequency, the type of the acoustic driver 1320 may include a low-frequency acoustic driver, a high-frequency acoustic driver, or a full-frequency acoustic driver, or any combination thereof. In some embodiments, the acoustic driver 1320 may include a moving coil, a moving iron, a piezoelectric, an electrostatic, a magnetostrictive driver, or the like, or a combination thereof.

In some embodiments, the acoustic driver 1320 may include a vibration diaphragm. When the vibration diaphragm vibrates, sounds may be transmitted from the front and rear sides of the vibration diaphragm, respectively. In some embodiments, the front side of the vibration diaphragm in the supporting structure 1310 may be provided with a front chamber 1313 for transmitting sound. The front chamber 1313 may be acoustically coupled with the sound guiding hole 1311. The sound on the front side of the vibration diaphragm may be outputted from the sound guiding hole 1311 through the front chamber 1313. The rear side of the vibration diaphragm in the supporting structure 1310 may be provided with a rear chamber 1314 for transmitting sound. The rear chamber 1314 may be acoustically coupled with the sound guiding hole 1312. The sound on the rear side of the vibration diaphragm may be outputted from the sound guiding hole 1312 through the rear chamber 1314. It should be noted that, when the vibration diaphragm is vibrating, the front side and the rear side of the vibration diaphragm may simultaneously generate sounds with opposite phases. After passing through the front chamber 1313 and rear chamber 1314, respectively, the sounds may propagate outward from the sound guiding hole 1311 and the sound guiding hole 1312, respectively. In some embodiments, by adjusting the structure of the front chamber 1313 and the rear chamber 1314, the sounds output by the acoustic driver 1320 at the sound guiding hole 1311 and the sound guiding hole 1312 may meet specific conditions. For example, by designing the lengths of the front chamber 1313 and the rear chamber 1314, the sound guiding hole 1311 and the sound guiding hole 1312 may output sounds with a specific phase relationship (for example, opposite phases). Therefore, the problems including a small volume of the sound heard by the user in the near field of the acoustic output apparatus 1300 and a large sound leakage in the far field of the acoustic output apparatus 1300 may be effectively resolved.

In some alternative embodiments, the acoustic driver 1320 may also include a plurality of vibration diaphragms (e.g., two vibration diaphragms). Each of the plurality of vibration diaphragms may vibrate to generate a sound, which may pass through a cavity connected to the vibration diaphragm in the supporting structure, and output from corresponding sound guiding hole(s). The plurality of vibration diaphragms may be controlled by the same controller or different controllers and generate sounds that satisfy certain phase and amplitude conditions (for example, sounds of the same amplitude but opposite phases, sounds of different amplitudes and opposite phases, etc.).

As mentioned above, with a certain sound frequency, as the distance between two point sources increases, the volume of the sound heard by the user and the volume of the leaked sound corresponding to the two point sources may increase. For a clearer description, the relationship between volume of the sound heard by the user, the volume of sound leakage, and the point source distance d may be further explained in connection with FIGS. 14 through 16.

Figure 14:
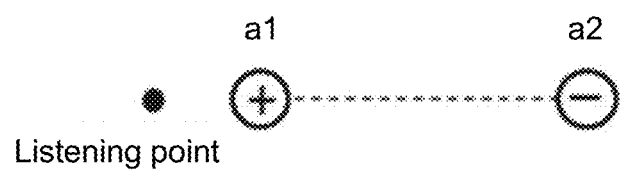
FIG. 14 is a schematic diagram illustrating two point sources and a listening position according to some embodiments of the present disclosure.

FIG. 14 is a schematic diagram illustrating two point sources and a listening position according to some embodiments of the present disclosure. As shown in FIG. 14, a point source a1 and a point source a2 may be on a same side of the listening position. The point source a1 may be closer to the listening position, and the point source a1 and the point source a2 may output sounds with the same amplitude but opposite phases.

Figure 15:
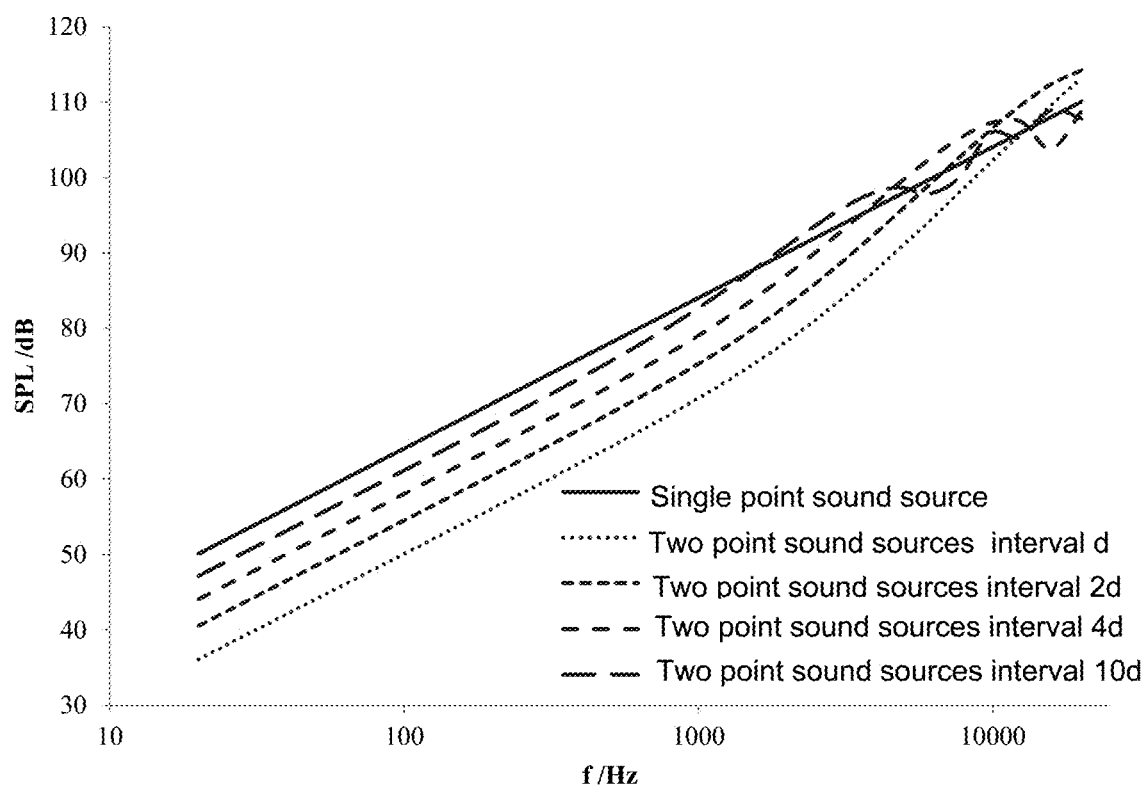
FIG. 15 is a graph illustrating a variation of the volume of the sound heard by the user of two point sources with different distances as a function of a frequency of sound according to some embodiments of the present disclosure.

FIG. 15 is a graph illustrating a variation of the volume of the sound heard by the user of two point sources with different distances as a function of a frequency of sound according to some embodiments of the present disclosure. The abscissa may represent the frequency (f) of the sound output by the two point sources (denoted as a1 and a2), and the unit may be hertz (Hz). The ordinate may represent the volume of the sound, and the unit may be decibel (dB). As shown in FIG. 15, as the distance between the point source a1 and the point source a2 gradually increases (for example, from d to 10$d$), the sound volume at the listening position may gradually increase. That is, as the distance between the point source a1 and the point source a2 increases, the difference in sound pressure amplitude (i.e., sound pressure difference) between the two sounds reaching the listening position may become larger, making the sound cancellation effect weaker, which may increase the sound volume at the listening position. However, due to the existence of sound cancellation, the sound volume at the listening position may still be less than the sound volume generated by a single point source at a same position in the low and middle frequency band (for example, a frequency of less than 1000 Hz). However, in the high-frequency band (for example, a frequency close to 10000 Hz), due to the decrease in the wavelength of the sound, mutual enhancement of the sound may appear, making the sound generated by the two point sources louder than that of the single point source. In some embodiments, a sound pressure may refer to the pressure generated by the sound through the vibration of the air.

Figure 16:
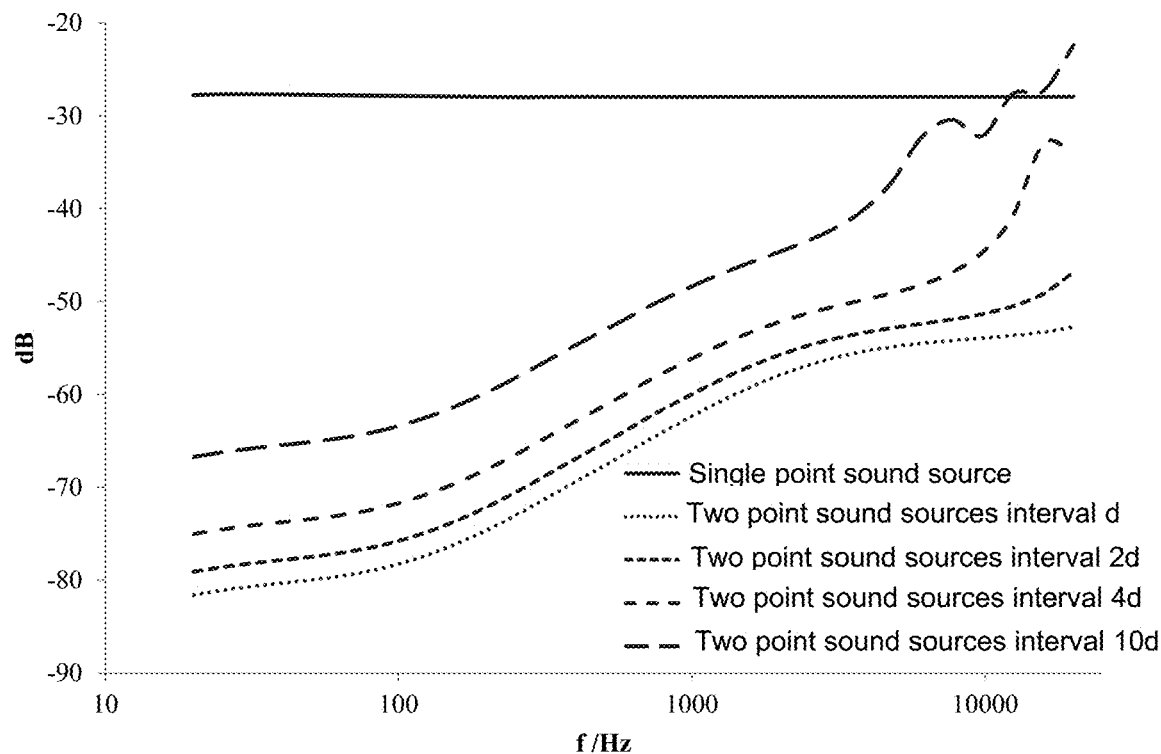
FIG. 16 is a graph illustrating a variation of a normalized parameter of different distances between two point sources in the far field along with a frequency of sound according to some embodiments of the present disclosure.

In some embodiments, by increasing the distance between the two point sources (for example, the point source a1 and the point source a2), the sound volume at the listening position may be increased. But as the distance increases, the sound cancellation of the two point sources may become weaker, which may lead to an increase of the far-field sound leakage. For illustration purposes, FIG. 16 is a graph illustrating a variation of a normalized parameter of different distances between two point sources in the far field along with a frequency of sound according to some embodiments of the present disclosure. The abscissa may represent the frequency (f) of the sound, the unit may be Hertz (Hz). The ordinate may use a normalization parameter a for evaluating the volume of the leaked sound, and the unit may be decibel (dB). As shown in FIG. 16, taking the normalization parameter a of a single point source as a reference, as the distance between the two point sources increases from d to 10$d$, the normalization parameter a may gradually increase, indicating that the sound leakage may gradually increase. More descriptions regarding the normalization parameter a may be found in equation (4) and related descriptions.

Figure 17:
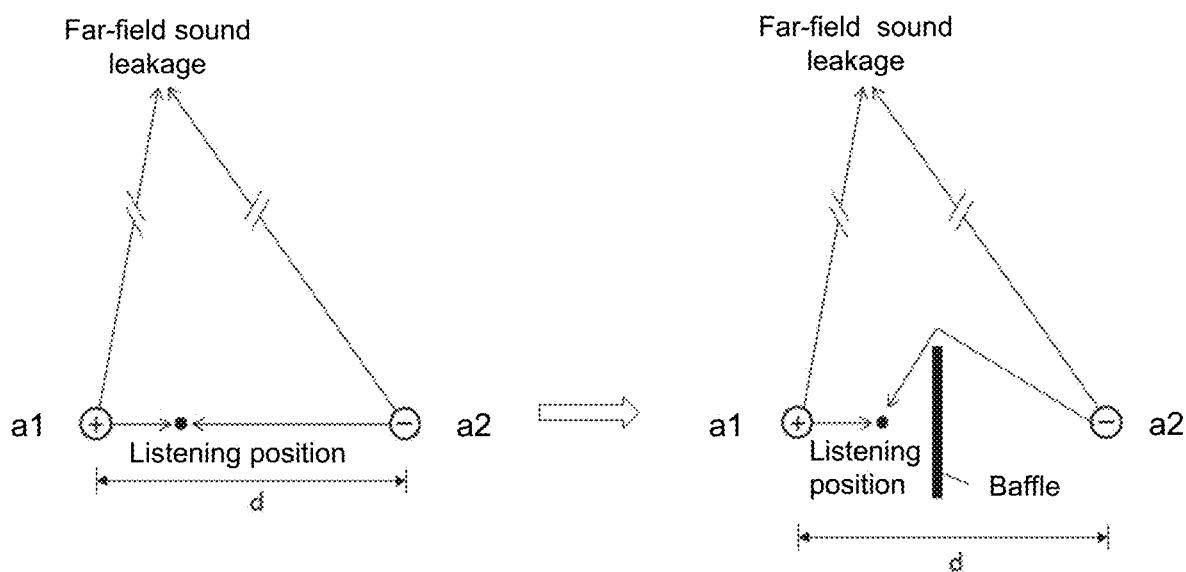
FIG. 17 is a diagram illustrating an exemplary baffle provided between two point sources according to some embodiments of the present disclosure.

In some embodiments, adding a baffle structure to the acoustic output apparatus may be beneficial to improve the output effect of the acoustic output apparatus, that is, to increase the sound intensity at the near-field listening position, while reduce the volume of the far-field sound leakage. For illustration, FIG. 17 is a diagram illustrating an exemplary baffle provided between two point sources according to some embodiments of the present disclosure. As shown in FIG. 17, when a baffle is provided between the point source a1 and the point source a2, in the near field, the sound wave of the point source a2 may need to bypass the baffle to interfere with the sound wave of the point source a1 at the listening position, which may be equivalent to increasing the length of the acoustic route from the point source a2 to the listening position. Therefore, assuming that the point source a1 and the point source a2 have a same amplitude, compared to the case without a baffle, the difference in the amplitude of the sound waves of the point source a1 and the point source a2 at the listening position may increase, so that the degree of cancellation of the two sounds at the listening position may decrease, causing the sound volume at the listening position to increase. In the far field, because the sound waves generated by the point source a1 and the point source a2 do not need to bypass the baffle in a large space, the sound waves may interfere (similar to the case without a baffle). Compared to the case without a baffle, the sound leakage in the far field may not increase significantly. Therefore, a baffle structure being provided between the point source a1 and the point source a2 may increase the sound volume at the near-field listening position significantly while the volume of the far-field leakage does not increase significantly.

Figure 18:
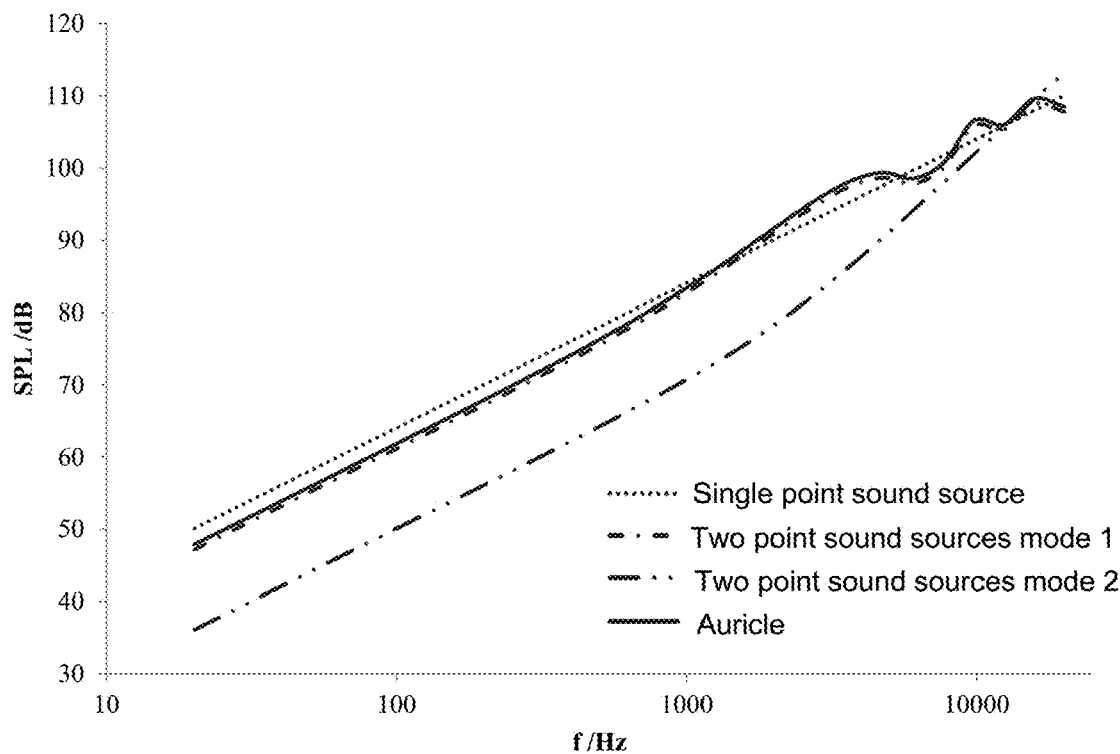
FIG. 18 is a graph illustrating a variation of the volume of a sound heard by a user as a function of the frequency of sound when the auricle is located between two point sources according to some embodiments of the present disclosure.
Figure 19:
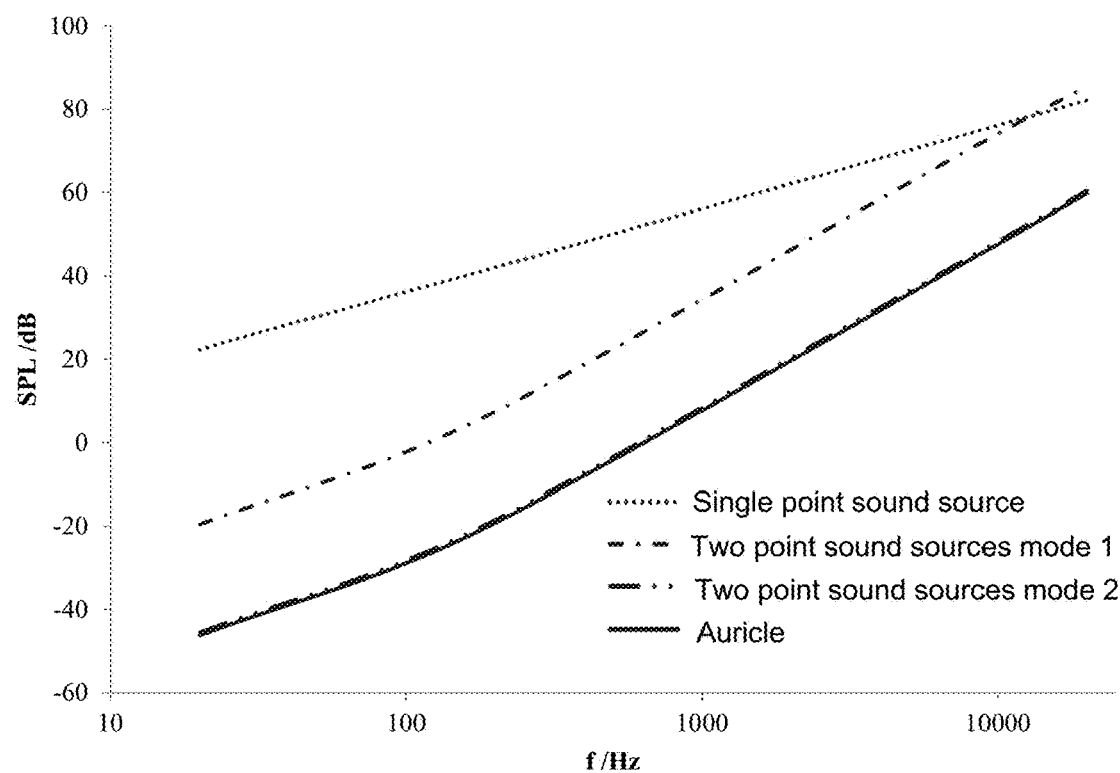
FIG. 19 is a graph illustrating a variation of the volume of a leaked sound as a function of the frequency of sound when the auricle is located between two point sources according to some embodiments of the present disclosure.
Figure 20:
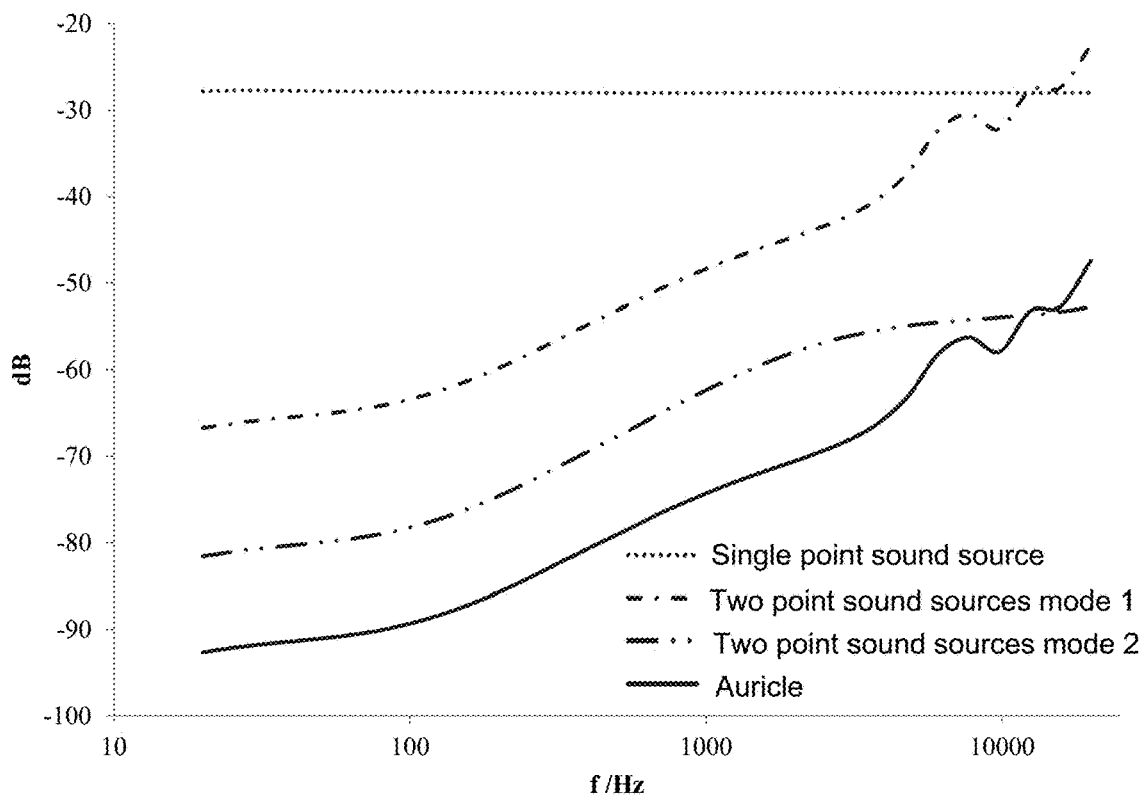
FIG. 20 is a graph illustrating a variation of a normalized parameter as a function of the frequency of sound when two point sources of an acoustic output apparatus is distributed on both sides of the auricle according to some embodiments of the present disclosure.

In the present disclosure, when the two point sources are located at both sides of the auricle, the auricle may serve as a baffle, so the auricle may also be referred to as a baffle for brevity. As an example, due to the existence of the auricle, the result may be equivalent to that the near-field sound may be generated by two point sources with a distance of D1 (also known as mode 1). The far-field sound may be generated by two point sources with a distance of D2 (also known as mode 2), and D1>D2. FIG. 18 is a graph illustrating a variation of the volume of a sound heard by a user as a function of the frequency of sound when the auricle is located between two point sources according to some embodiments of the present disclosure. As shown in FIG. 18, when the frequency is low (for example, when the frequency is less than 1000 Hz), the volume at the near-field sound (that is, the sound heard by the user by the user's ear) may basically be the same as that of the near-field sound in mode 1, be greater than the volume of the near-field sound in mode 2, and be close to the volume of the near-field sound of a single point source. As the frequency increases (for example, when the frequency is between 2000 Hz and 7000 Hz), the volume of the near-field sound in mode 1 and the two point sources being distributed on both sides of the auricle may be greater than that of the one point source. It shows that when the user's auricle is located between the two point sources, the volume of the near-field sound transmitted from the sound source to the user's ear may be effectively enhanced. FIG. 19 is a graph illustrating a variation of the volume of a leaked sound as a function of the frequency of sound when the auricle is located between two point sources according to some embodiments of the present disclosure. As shown in FIG. 19, as the frequency increases, the volume of the far-field leakage may increase. When the two point sources are distributed on both sides of the auricle, the volume of the far-field leakage generated by the two point sources may be basically the same as the volume of the far-field leakage in mode 2, and both of which may be less than the volume of the far-field leakage in mode 1 and the volume of the far-field leakage of a single point source. It shows that when the user's auricle is located between the two point sources, the sound transmitted from the sound source to the far field may be effectively reduced, that is, the sound leakage from the sound source to the surrounding environment may be effectively reduced. FIG. 20 is a graph illustrating a variation of a normalized parameter as a function of the frequency of sound when two point sources of an acoustic output apparatus is distributed on both sides of the auricle according to some embodiments of the present disclosure. As shown in FIG. 20, when the frequency is less than 10000 Hz, the normalized parameter of the two point sources being distributed on both sides of the auricle may be less than the normalized parameter in the case of mode 1 (no baffle structure between the two point sources, and the distance is D1), mode 2 (no baffle structure between the two point sources, and the distance is D2), and the single point source, which may show that when the two point sources are located at both sides of the auricle, the acoustic output apparatus may have a better capability to reduce the sound leakage.

In order to further explain the effect of the acoustic output apparatus with or without a baffle between the two point sources or two sound guiding holes, the volume of the near-field sound at the listening position and/or volume of the far-field leakage under different conditions may specifically be described below.

Figure 21:
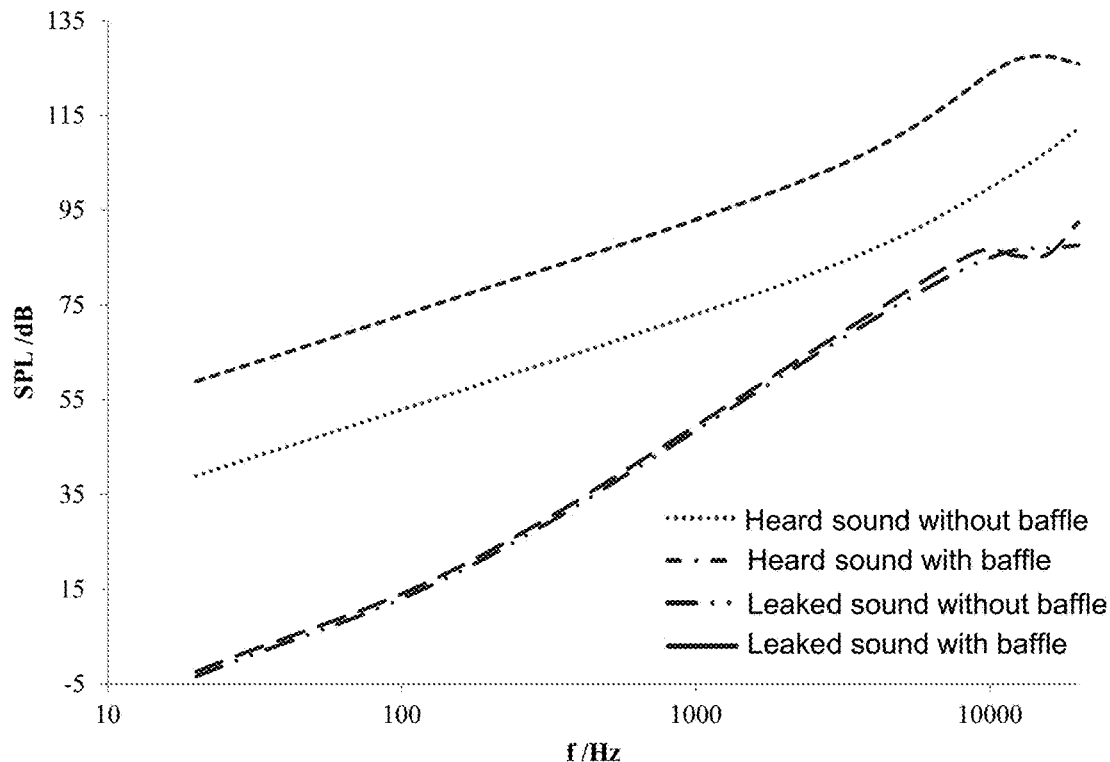
FIG. 21 is a graph illustrating a variation of a volume of sound heard by the user and a volume of leaked sound as a function of frequency with and without a baffle between two point sources according to some embodiments of the present disclosure.

FIG. 21 is a graph illustrating a variation of the volume of a sound heard by the user and volume of a leaked sound as a function of the frequency of sound with and without a baffle between two point sources according to some embodiments of the present disclosure. As shown in FIG. 21, after adding a baffle between the two point sources (i.e., two sound guiding holes) of the acoustic output apparatus, in the near field, it may be equivalent to increasing the distance between the two point sources, and the sound volume at the near-field listening position may be equivalent to being generated by a set of two point sources with a large distance. The volume of the near-field sound may be significantly increased compared to the case without a baffle. In the far field, because the interference of the sound waves generated by the two point sources may be rarely affected by the baffle, the sound leakage may be equivalent to being generated by two point sources with a small distance, therefore the sound leakage may not change significantly with or without the baffle. It may be seen that by setting a baffle between two sound guiding holes (i.e., two point sources), the ability of the sound output apparatus to reduce the sound leakage may be effectively improved, and the volume of the near-field sound of the acoustic output apparatus may be increased significantly. Therefore, the requirements for sound production components of the acoustic output apparatus may be reduced. At the same time, the simple circuit structure may reduce the electrical loss of the acoustic output apparatus, so that the working time of the acoustic output apparatus may be greatly prolonged under a certain amount of electricity.

Figure 22:
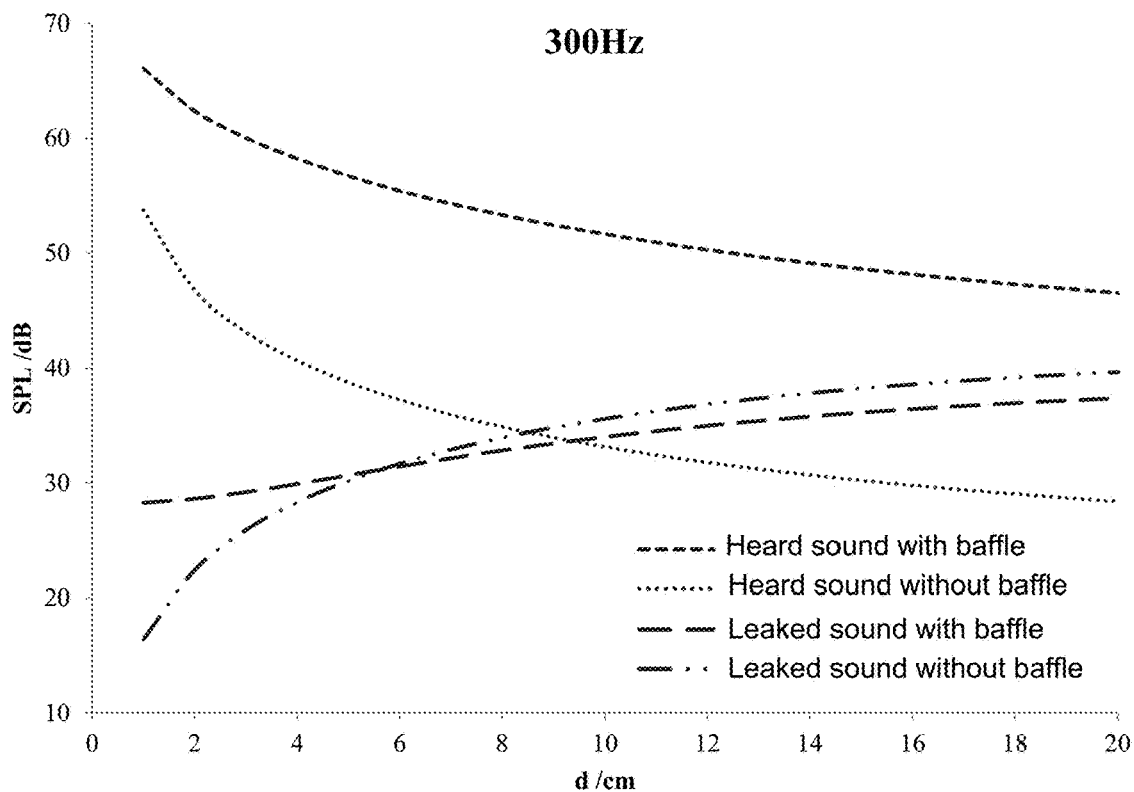
FIG. 22 is a graph illustrating a variation of a volume of sound heard by the user and a volume of leaked sound as a function of distance between two point sources at a frequency of 300 Hz and with or without a baffle according to some embodiments of the present disclosure.
Figure 23:
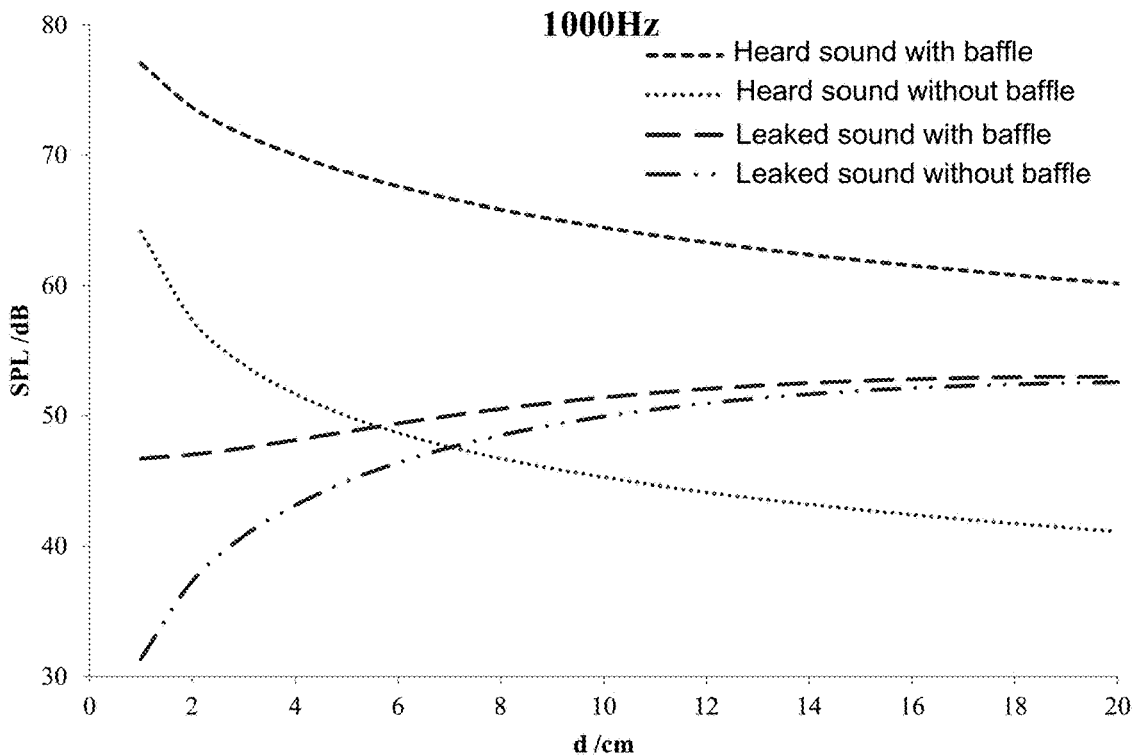
FIG. 23 is a graph illustrating a variation of a volume of sound heard by the user and a volume of leaked sound as a function of distance between two point sources at a frequency of 1000 Hz and with or without a baffle according to some embodiments of the present disclosure.

FIG. 22 is a graph illustrating a variation of the volume of a sound heard by the user and the volume of a leaked sound as a function of the distance between two point sources when the frequency of the two point sources is 300 Hz according to some embodiments of the present disclosure. FIG. 23 is a graph illustrating a variation of the volume of a sound heard by the user and the volume of a leaked sound as a function of the distance between two point sources when the frequency of the two point sources is 1000 Hz according to some embodiments of the present disclosure. As shown in FIGS. 22 and 23, in the near field, when the frequency is 300 Hz or 1000 Hz, as the increase of the distance d of the two point sources, the volume of the sound heard by the user with a baffle between the two point sources may be greater than that without a baffle between the two point sources, which shows that at this frequency, the baffle structure between the two point sources may effectively increase the volume of the sound heard by the user in the near field. In the far field, the volume of the leaked sound with a baffle between the two point sources may be equivalent to that without a baffle between the two point sources, which shows that at this frequency, with or without a baffle structure arranged between the two point sources has little effect on the far-field sound leakage.

Figure 24:
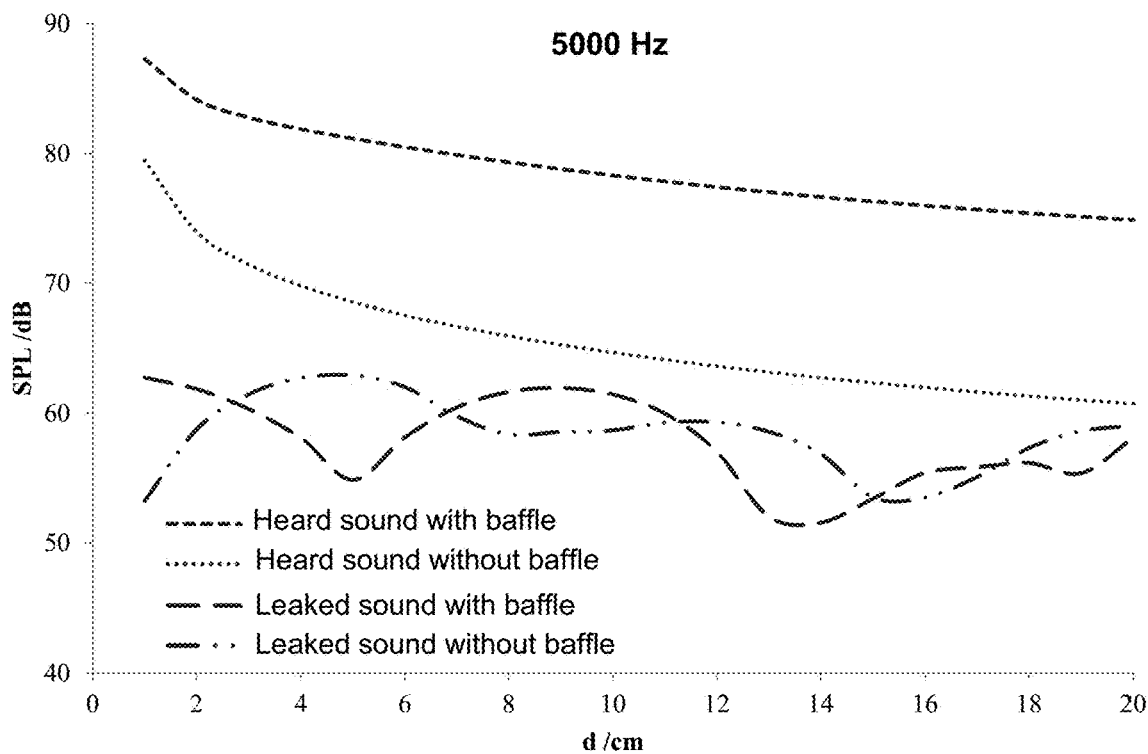
FIG. 24 is a graph illustrating a variation of a volume of sound heard by the user and a volume of leaked sound as a function of distance at a frequency of 5000 Hz and with or without a baffle between the two point sources according to some embodiments of the present disclosure.

FIG. 24 is a graph illustrating a variation of the volume of a sound heard by the user and the volume of a leaked sound as a function of the distance when the frequency of the two point sources is 5000 Hz according to some embodiments of the present disclosure. As shown in FIG. 24, in the near field, when the frequency is 5000 Hz, as the distance d of the two point sources increases, the volume of the sound heard by the user when there is a baffle between the two point sources may be greater than that when there is no baffle. In the far-field, the volume of the leaked sound of the two point sources with and without baffle may be fluctuant as a function of the distance d. Overall, whether the baffle structure is arranged between the two point sources has little effect on the far-field leakage.

Figure 25:
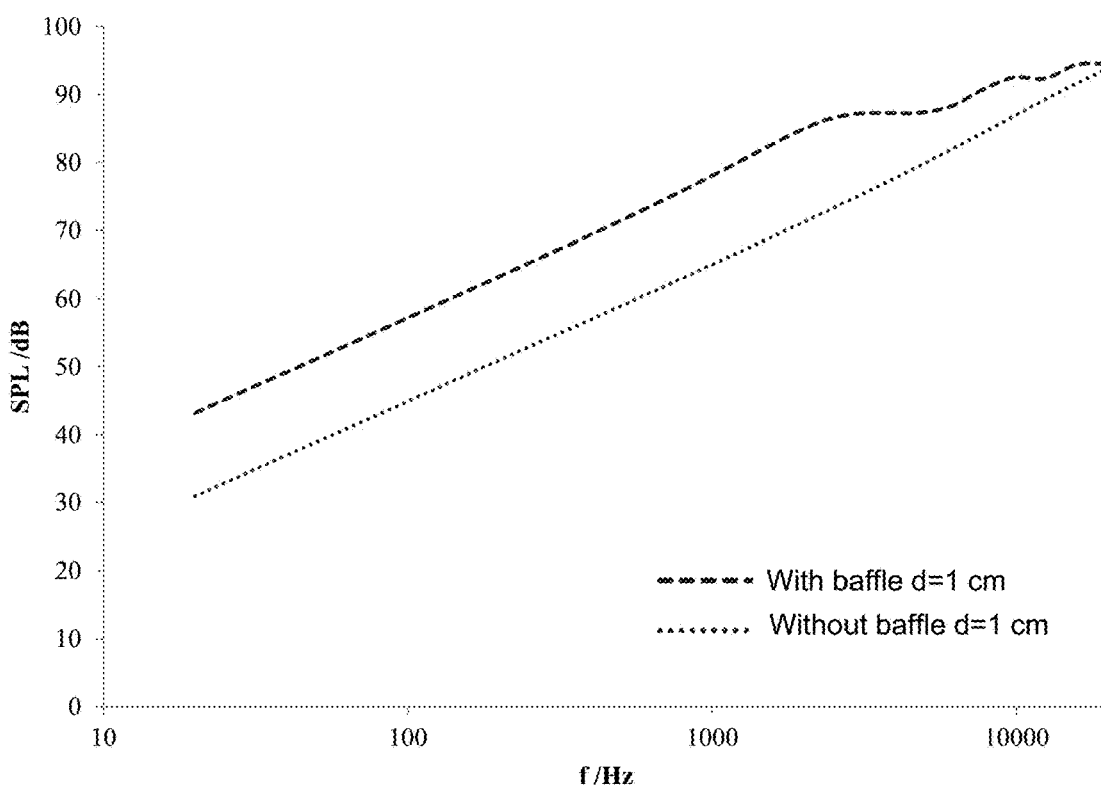
FIGS. 25-27 are graphs illustrating a variation of a volume of sound heard by the user as a function of frequency when a distance d of two point sources is 1 cm, 2 cm, 3 cm, respectively, according to some embodiments of the present disclosure.
Figure 26:
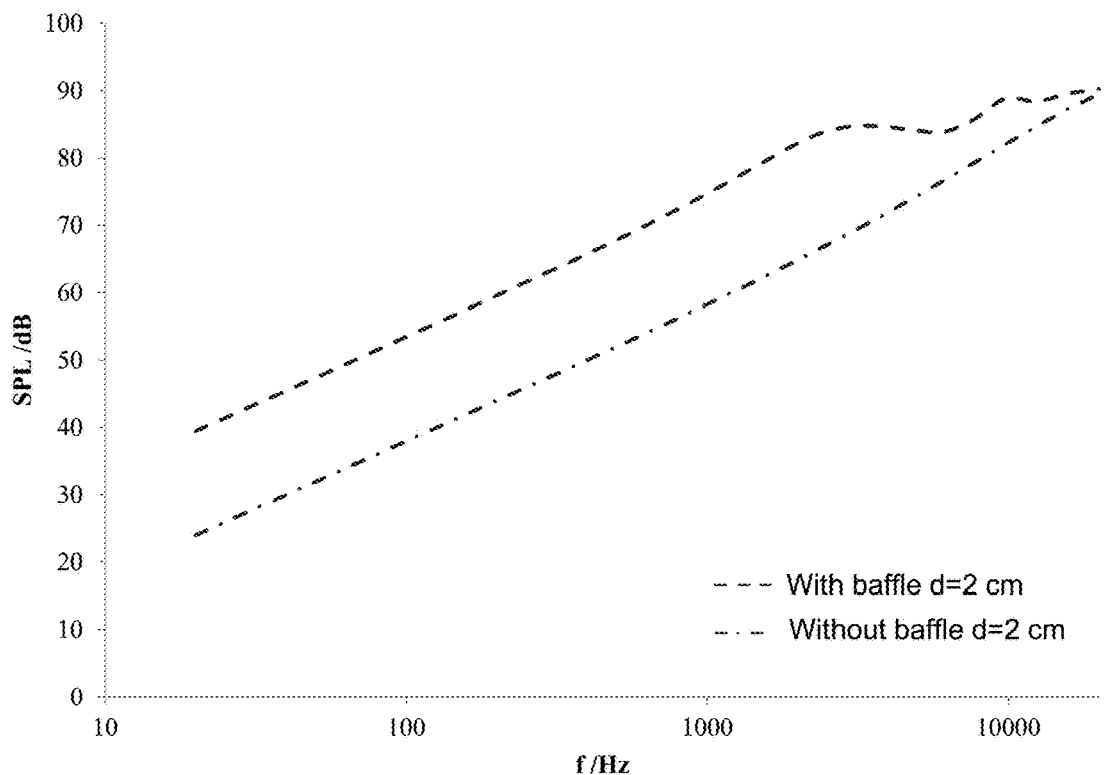
Figure 27:
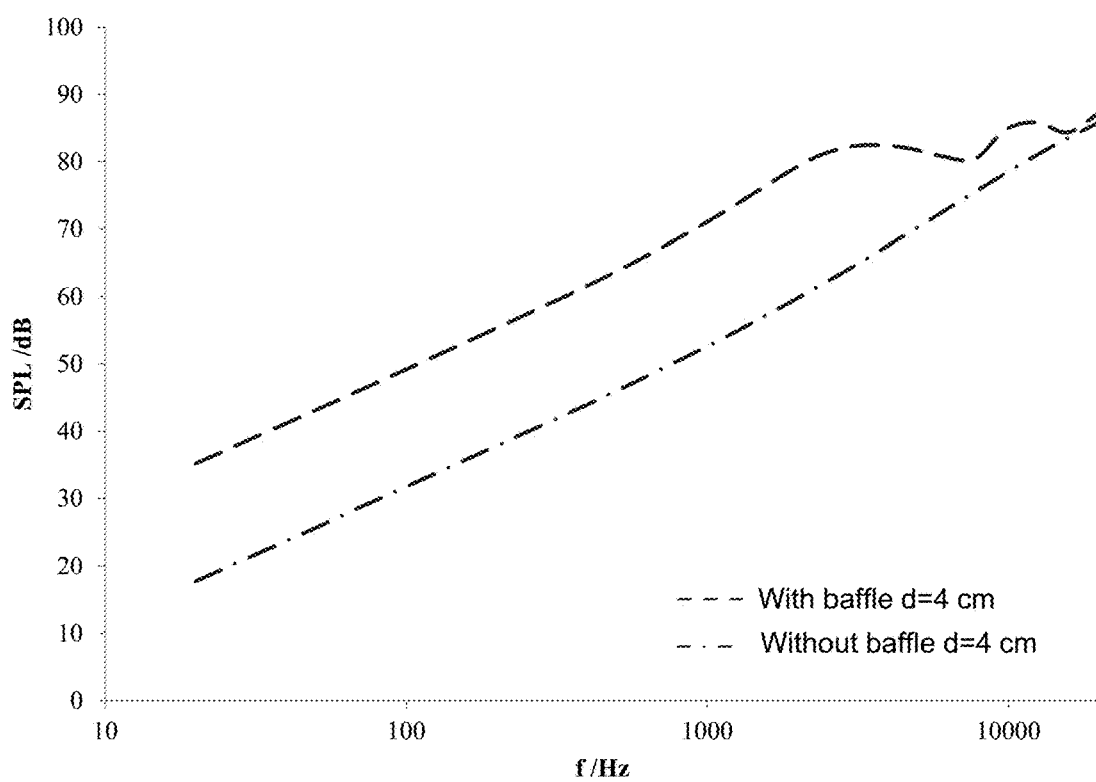
Figure 28:
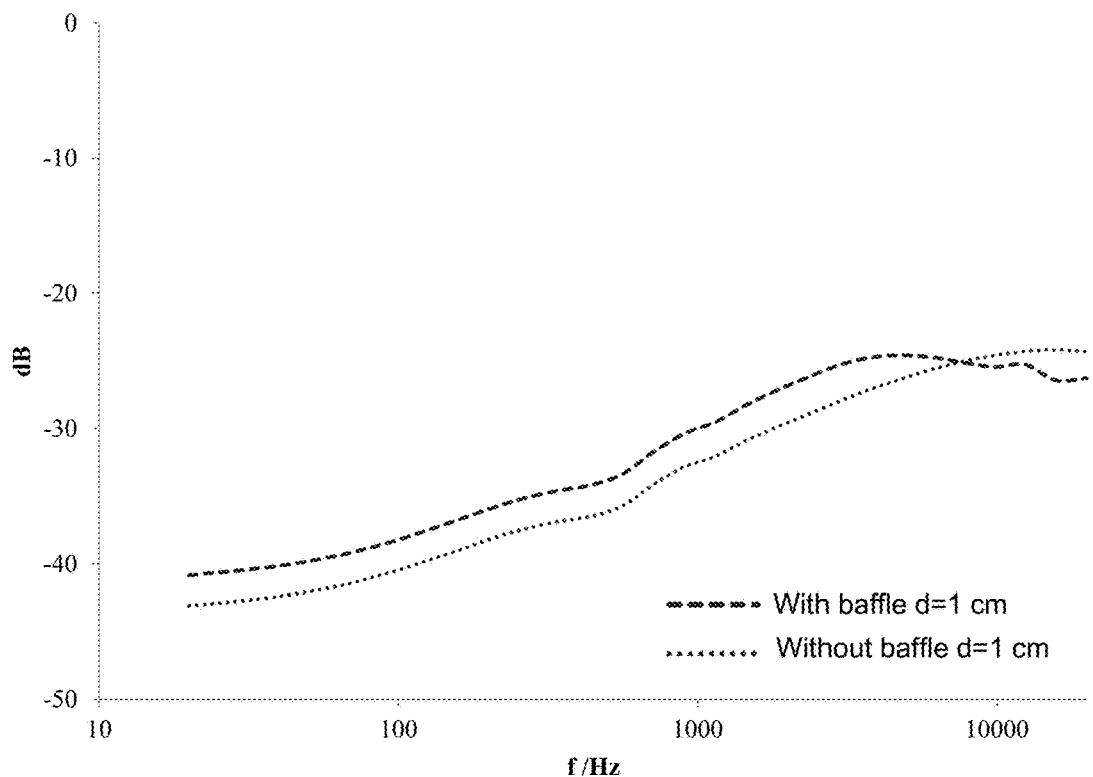
FIG. 28 is a graph illustrating a variation of a normalized parameter as a function of frequency when a distance d of two point sources is 1 cm according to some embodiments of the present disclosure.
Figure 29:
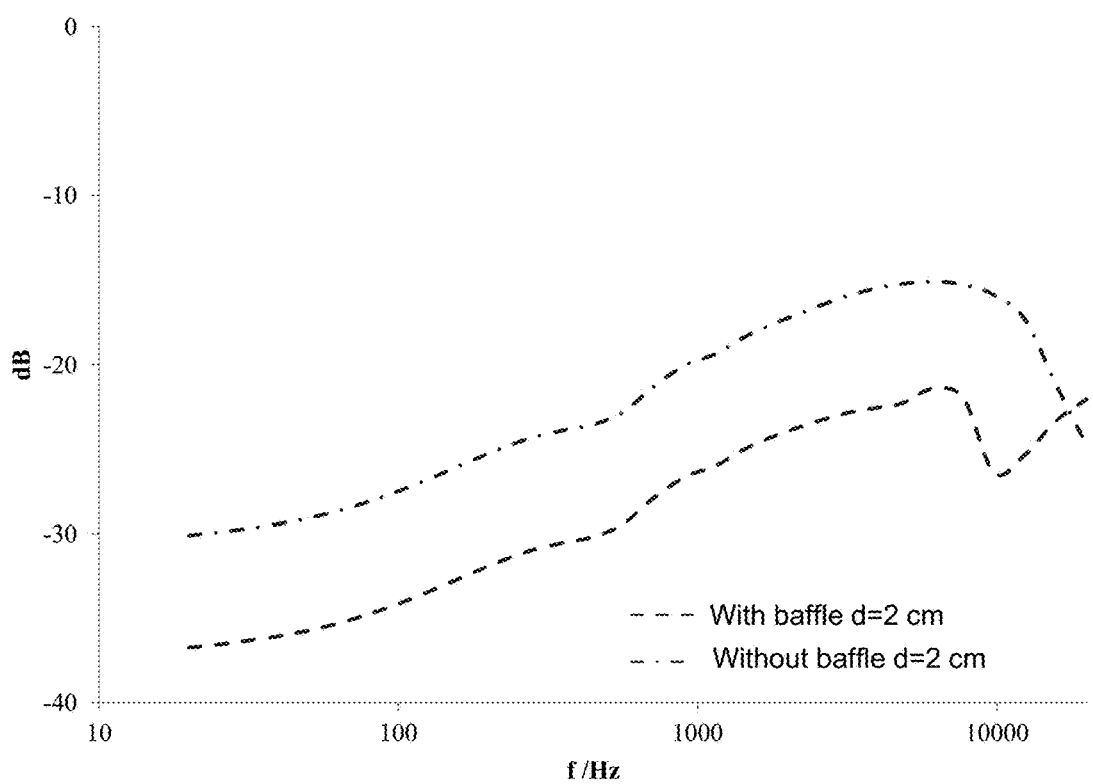
FIG. 29 is a graph illustrating a variation of a normalized parameter as a function of frequency when a distance d of two point sources is 2 cm according to some embodiments of the present disclosure.
Figure 30:
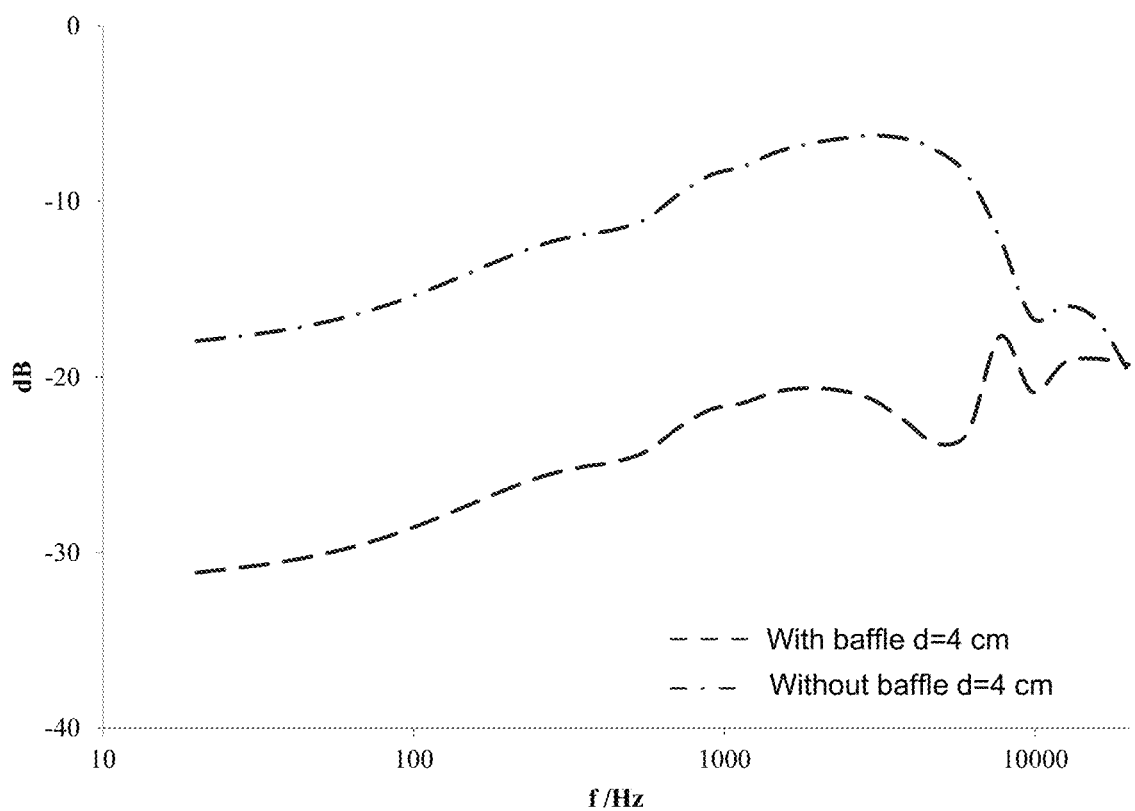
FIG. 30 is a graph illustrating a variation of a normalized parameter as a function of frequency when a distance d of two point sources is 4 cm according to some embodiments of the present disclosure.

FIGS. 25-27 are graphs illustrating a variation of the volume of a sound heard by the user as a function of the frequency of sound when the distance d of two point sources is 1 cm, 2 cm, 3 cm, respectively, according to some embodiments of the present disclosure. FIG. 28 is a graph illustrating a variation of a normalized parameter of a far field as a function of the frequency of sound when the distance d of two point sources is 1 cm according to some embodiments of the present disclosure. FIG. 29 is a graph illustrating a variation of a normalized parameter of a far field as a function of the frequency of sound when the distance d of two point sources is 2 cm according to some embodiments of the present disclosure. FIG. 30 is a graph illustrating a variation of a normalized parameter of a far field as a function of the frequency of sound when the distance d of two point sources is 4 cm according to some embodiments of the present disclosure. As shown in FIGS. 25 through 27, for the different distances d of the sound guiding holes (for example, 1 cm, 2 cm, 4 cm), at a certain frequency, in the near-field listening position (for example, the user's ear), the sound volume of two sound guiding holes located at both sides of the auricle (i.e., the "baffle effect" situation shown in the figure) may be greater than the sound volume of two sound guiding holes located at a same side of the auricle (i.e., the case of "without baffle" as shown in the figures). The certain frequency may be below 10000 Hz, below 5000 Hz, or below 1000 Hz.

As shown in FIGS. 28 to 30, for the different distances d of the sound guiding holes (for example, 1 cm, 2 cm, and 4 cm), at a certain frequency, in the far-field position (for example, the environment position away from the user's ear), the volume of the leaked sound generated when the two sound guiding holes are provided on both sides of the auricle may be smaller than that generated when the two sound guiding holes are not provided on both sides of the auricle. It should be noted that as the distance between two sound guiding holes or two point sources increases, the interference cancellation of sound at the far-field position may weaken, leading to a gradual increase in the far-field leakage and a weaker ability to reduce sound leakage. Therefore, the distance d between two sound guiding holes or the two point sources may not be too large. In some embodiments, in order to keep the output sound as loud as possible in the near-field, and suppress the sound leakage in the far field, the distance d between the two sound guiding holes may be set to be no more than, for example, 20 cm, 12 cm, 10 cm, 6 cm, or the like. In some embodiments, considering the size of the acoustic output apparatus and the structural requirements of the sound guiding holes, the distance d between the two sound guiding holes may be set to be in a range of, for example, 1 cm to 12 cm, 1 cm to 10 cm, 1 cm to 8 cm, 1 cm to 6 cm, 1 cm to 3 cm, or the like.

It should be noted that the above description is merely for the purposes of description, and not intended to limit the scope of the present disclosure. It may be understood that, for those skilled in the art, after understanding the principle of the present disclosure, various modifications and changes in the forms and details of the acoustic output apparatus may be made without departing from this principle. For example, in some embodiments, a plurality of sound guiding holes may be set on both sides of the baffle. The number of the sound guiding holes on both sides of the baffle may be the same or different. For example, the number of sound guiding holes on one side of the baffle may be two, and the number of sound guiding holes on the other side may be two or three. These modifications and changes may still be within the protection scope of the present disclosure.

Figure 31:
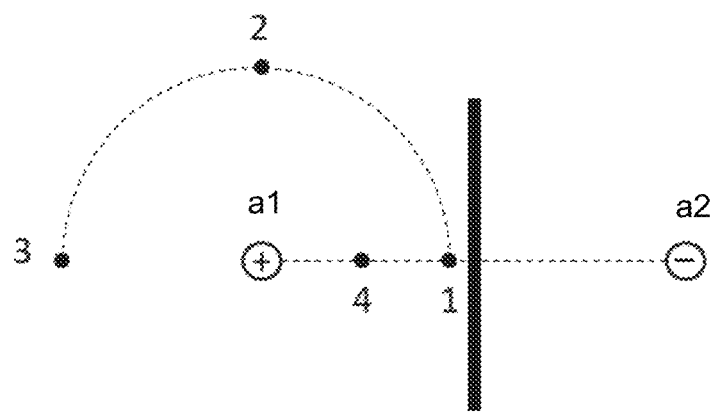
FIG. 31 is a graph illustrating exemplary distributions of different listening positions according to some embodiments of the present disclosure.

In some embodiments, on the premise of maintaining the distance between the two point sources, a relative position of the listening position to the two point sources may have a certain effect on the volume of the near-field sound and the far-field leakage reduction. In order to improve the acoustic output effect of the acoustic output apparatus, in some embodiments, the acoustic output apparatus may be provided with at least two sound guiding holes. The at least two sound guiding holes may include two sound guiding holes located at the front and back sides of the user's auricle, respectively. In some embodiments, considering that the sound propagated from the sound guiding hole located at the rear side of the user's auricle needs to bypass over the auricle to reach the user's ear canal, the acoustic route between the sound guiding hole located at the front side of the auricle and the user's ear canal (i.e., the acoustic distance from the sound guiding hole to the user's ear canal entrance) is shorter than the acoustic route between the sound guiding hole located at the rear side of the auricle and the user's ear. In order to further explain the effect of the listening position on the acoustic output effect, four representative listening positions (listening position 1, listening position 2, listening position 3, listening position 4) may be selected as shown in FIG. 31. The listening position 1, the listening position 2, and the listening position 3 may have equal distance from the point source a1, which may be r1. The distance between the listening position 4 and the point source a1 may be r2, and r2<r1. The point source a1 and the point source a2 may generate sounds with opposite phases, respectively.

Figure 32:
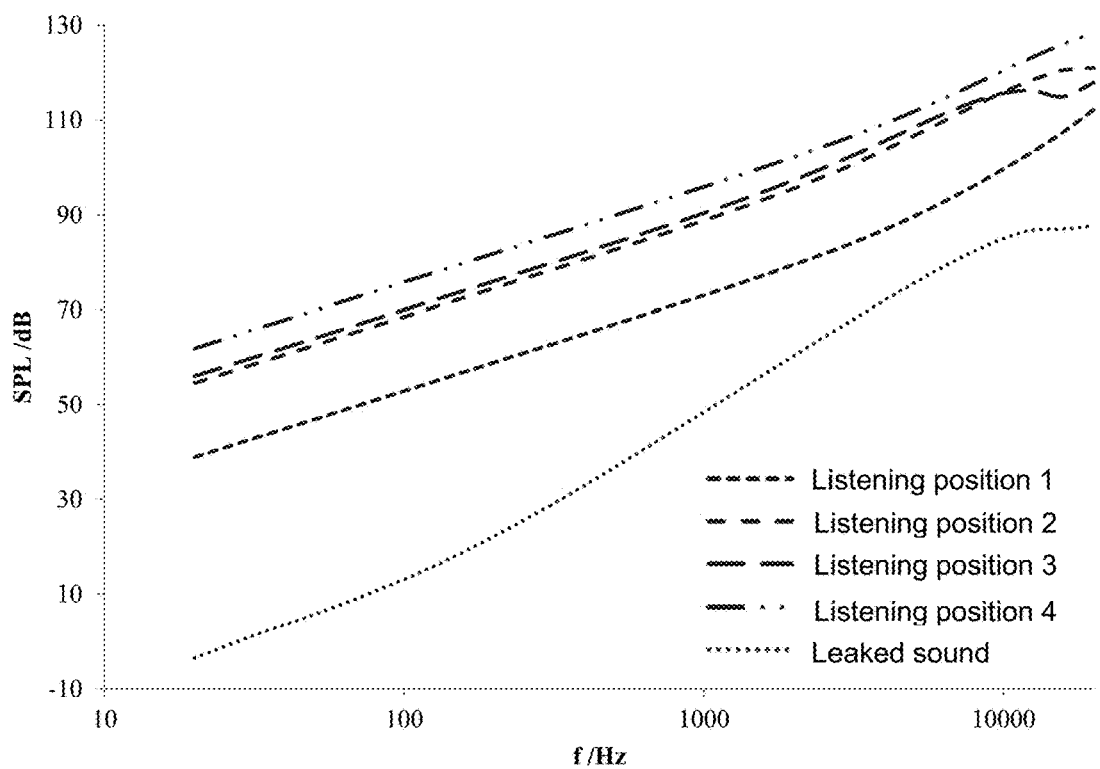
FIG. 32 is a graph illustrating a volume of sound heard by the user from a two point sources without baffle at different listening positions in a near field as a function of frequency according to some embodiments of the present disclosure.
Figure 33:
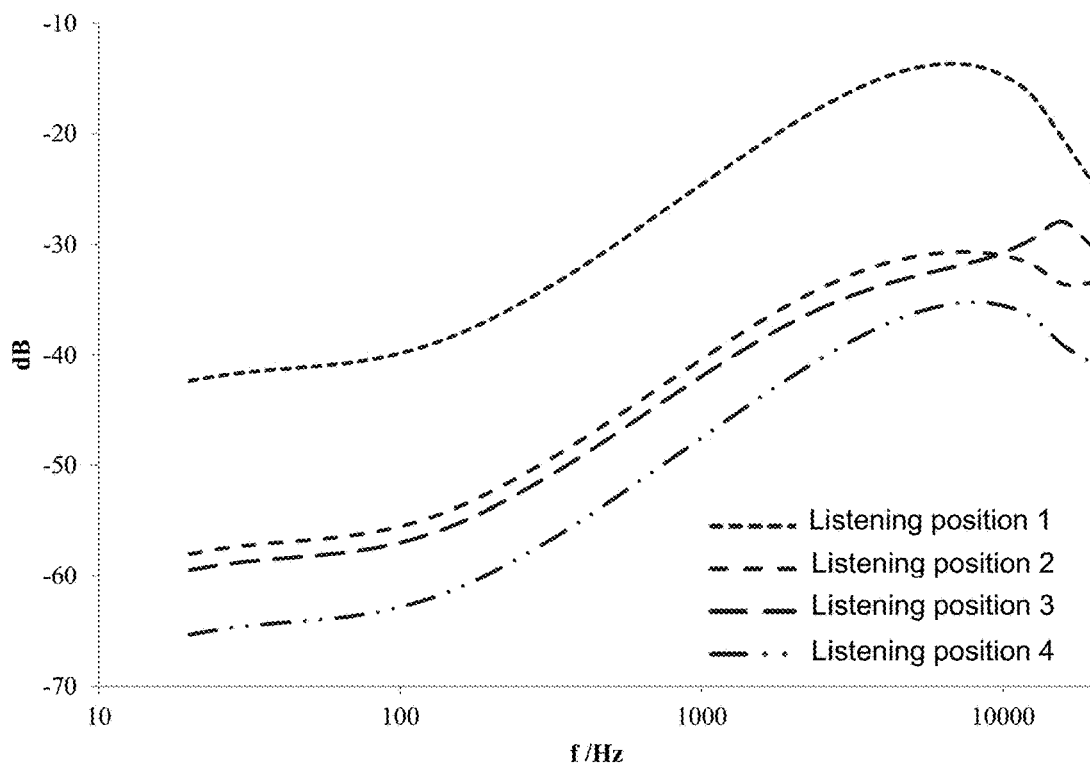
FIG. 33 is a graph illustrating a normalized parameter of two point sources without baffle at different listening positions in a near field according to some embodiments of the present disclosure.

FIG. 32 is a graph illustrating the volume of a sound heard by a user of two point sources without baffle at different listening positions as a function of the frequency of sound according to some embodiments of the present disclosure. FIG. 33 is a graph illustrating a normalized parameter of different listening positions as a function of the frequency of sound. The normalized parameter may be obtained with reference to Equation (4). As shown in FIGS. 32 and 33, for the listening position 1, since the difference between the acoustic routes from the point source a1 and the point source a2 to the listening position 1 is small, the difference in amplitude of the sounds produced by the two point sources at the listening position 1 may be small. Therefore, an interference of the sounds of the two point sources at the listening position 1 may cause the volume of the sound heard by the user to be smaller than that of other listening positions. For the listening position 2, compared with the listening position 1, the distance between the listening position 2 and the point source a1 may remain unchanged, that is, the acoustic route from the point source a1 to the listening position 2 may not change. However, the distance between the listening position 2 and the point source a2 may be longer, and the length of the acoustic route between the point source a2 and the listening position 2 may increase. The amplitude difference between the sound generated by the point source a1 and the sound generated by the point source a2 at the listening position 2 may increase. Therefore, the volume of the sound transmitted from the two point sources after interference at the listening position 2 may be greater than that at the listening position 1. Among all positions on an arc with a radius of r1, a difference between the acoustic route from the point source a1 to the listening position 3 and the acoustic route from the point source a2 to the listening position 3 may be the longest. Therefore, compared with the listening position 1 and the listening position 2, the listening position 3 may have the highest volume of the sound heard by the user. For the listening position 4, the distance between the listening position 4 and the point source a1 may be short. The sound amplitude of the point source a1 at the listening position 4 may be large. Therefore, the volume of the sound heard by the user at the listening position 4 may be large. In summary, the volume of the sound heard by the user at the near-field listening position may change as the listening position and the relative position of the two point sources change. When the listening position is on the line between the two point sources and on the same side of the two point sources (for example, listening position 3), the acoustic route difference between the two point sources at the listening position may be the largest (the acoustic route difference may be the distance d between the two point sources). In this case (i.e., when the auricle is not used as a baffle), the volume of the sound heard by the user at this listening position may be greater than that at other locations. According to Equation (4), when the far-field leakage is constant, the normalization parameter corresponding to this listening position may be the smallest, and the leakage reduction capability may be the strongest. At the same time, reducing the distance r1 between the listening position (for example, listening position 4) and the point source a1 may further increase the volume at the listening position, at the same time reduce the sound leakage, and improve the capability to reduce leakage.

Figure 34:
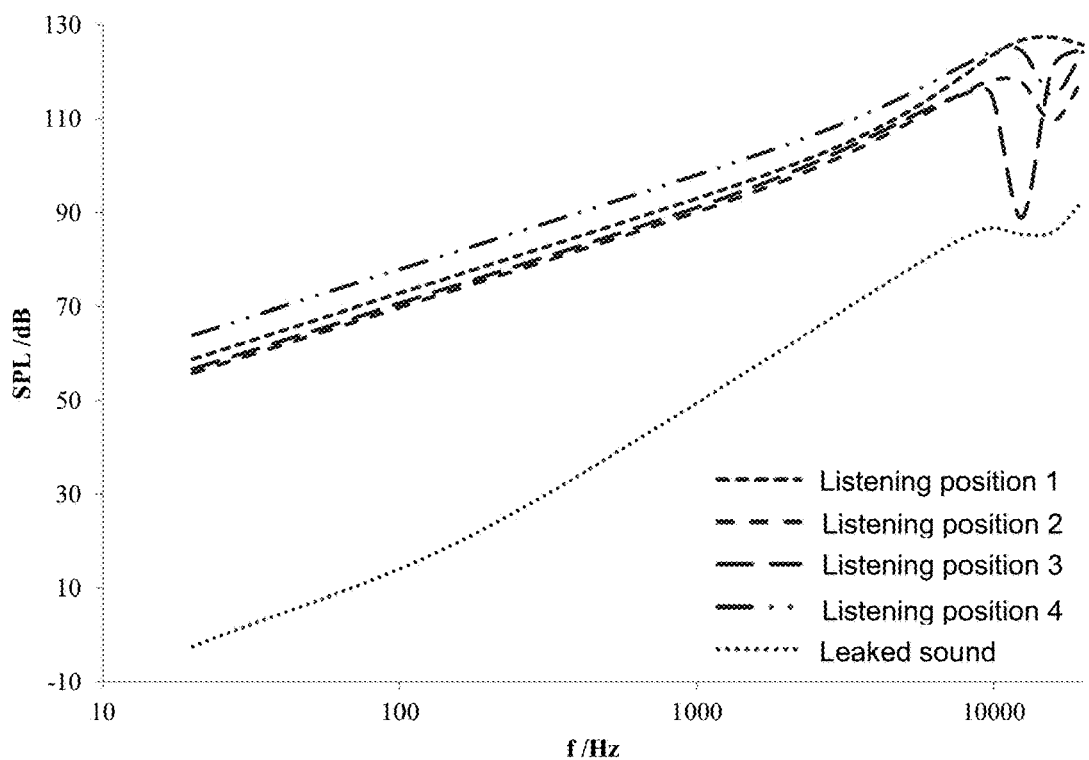
FIG. 34 is a graph illustrating a volume of sound heard by the user from two point sources with a baffle at different listening positions in a near field as a function of frequency according to some embodiments of the present disclosure.
Figure 35:
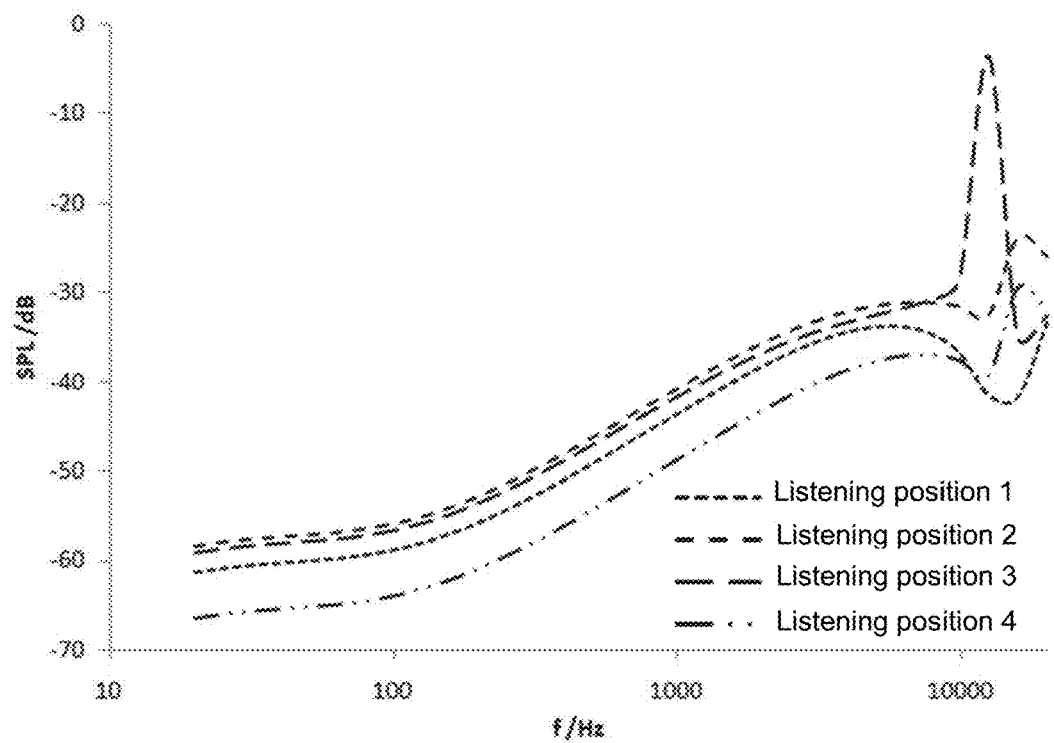
FIG. 35 is a graph illustrating a normalized parameter of two point sources with a baffle at different listening positions in a near field according to some embodiments of the present disclosure.

FIG. 34 is a graph illustrating the volume of the sound heard by the user of two point sources with baffle (as shown in FIG. 31) at different listening positions in the near field as a function of frequency according to some embodiments of the present disclosure. FIG. 35 is a graph of the normalization parameters of different listening positions obtained with reference to Equation (4) based on FIG. 34, as a function of frequency. As shown in FIGS. 34 and 35, compared to the case without a baffle, the volume of the sound heard by the user generated by the two point sources at listening position 1 may increase significantly when there is a baffle. The volume of the sound heard by the user at the listening position 1 may exceed that at the listening position 2 and the listening position 3. The reason may be that the acoustic route from the point source a2 to the listening position 1 may increase after a baffle is set between the two point sources. As a result, the acoustic route difference between the two point sources at the listening position 1 may increase significantly. The amplitude difference between the sounds generated by the two point sources at the listening position 1 may increase, making it difficult to produce sound interference cancellation, thereby increasing the volume of the sound heard by the user generated at the listening position 1 significantly. At the listening position 4, since the distance between the listening position and the point source a1 is further reduced, the sound amplitude of the point source a1 at this position may be larger. The volume of the sound heard by the user at the listening position 4 may still be the largest among the four listening positions. For listening position 2 and listening position 3, since the effect of the baffle on the acoustic route from the point source a2 to the two listening positions is not very obvious, the volume increase effect at the listening position 2 and the listening position 3 may be less than that at the listening position 1 and the listening position 4 which are closer to the baffle.

The volume of the leaked sound in the far field may not change with listening positions, and the volume of the sound heard by the user at the listening position in the near field may change with listening positions. In this case, according to Equation (4), the normalization parameter of the acoustic output apparatus may vary in different listening positions. Specifically, a listening position with a large volume of sound heard by the user (e.g., listening position 1 and listening position 4) may have a small normalization parameter and strong capability to reduce sound leakage. A listening position with a low volume of sound heard by the user (e.g., listening position 2 and listening position 3) may have a large normalization parameter and weak capability to reduce leakage.

Therefore, according to the actual application scenario of the acoustic output apparatus, the user's auricle may serve as a baffle. In this case, the two sound guiding holes on the acoustic output apparatus may be arranged on the front side and the back side of the auricle, respectively, and the ear canal may be located between the two sound guiding holes as a listening position. In some embodiments, by designing the positions of the two sound guiding holes on the acoustic output apparatus, the distance between the sound guiding hole on the front side of the auricle and the ear canal may be smaller than the distance between the sound guiding hole on the back side of the auricle and the ear canal. In this case, the acoustic output apparatus may produce a large sound amplitude at the ear canal since the sound guiding hole on the front side of the auricle is close to the ear canal. The sound amplitude formed by the sound guiding hole on the back of the auricle may be smaller at the ear canal, which may avoid the interference cancellation of the sound at the two sound guiding holes at the ear canal, thereby ensuring that the volume of the sound heard by the user at the ear canal is large. In some embodiments, the acoustic output apparatus may include one or more contact points (e.g., "an inflection point" on a supporting structure to match the shape of the ear) that can contact with the auricle when it is worn. The contact point(s) may be located at a line connecting the two sound guiding holes or on one side of the line connecting the two sound guiding holes. And a ratio of the distance between the front sound guiding hole and the contact point(s) to the distance between the rear sound guiding hole and the contact point(s) may be 0.05-20. In some embodiments, the ratio may be 0.1-10. In some embodiments, the ratio may be 0.2-5. In some embodiments, the ratio may be 0.4-2.5.

Figure 36:
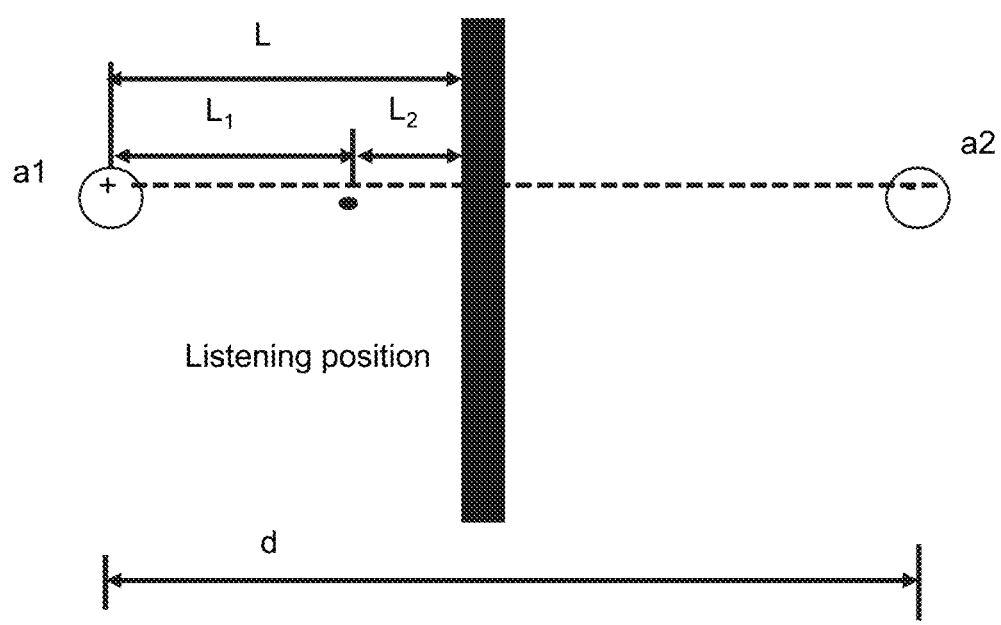
FIG. 36 is a schematic diagram illustrating two point sources and a baffle according to some embodiments of the present disclosure.

FIG. 36 is a schematic diagram illustrating two point sources and a baffle (e.g., an auricle) according to some embodiments of the present disclosure. In some embodiments, a position of the baffle between the two sound guiding holes may have a certain influence on the acoustic output effect. Merely by way of example, as shown in FIG. 36, a baffle may be provided between a point source a1 and a point source a2, a listening position may be located at the line connecting the point source a1 and the point source a2. In addition, the listening position may be located between the point source a1 and the baffle. A distance between the point source a1 and the baffle may be L. A distance between the point source a1 and the point source a2 may be d. A distance between the point source a1 and the sound heard by the user may be L1. A distance between the listening position and the baffle may be L2. When the distance L1 is constant, a movement of the baffle may cause different ratios of L to d, thereby obtaining different volumes of the sound heard by the user at the listening position and/or the volumes of the far-field leakage.

Figure 37:
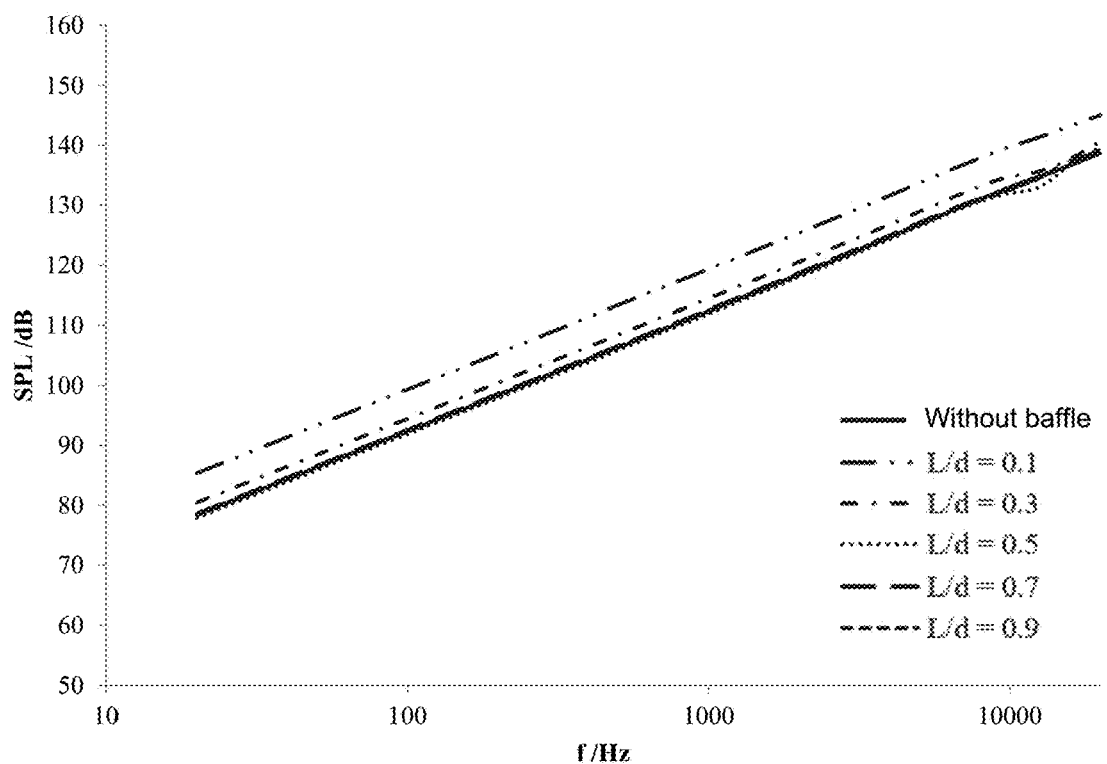
FIG. 37 is a graph illustrating a variation of a volume of the near-field sound as a function of frequency when a baffle is at different positions according to some embodiments of the present disclosure.
Figure 38:
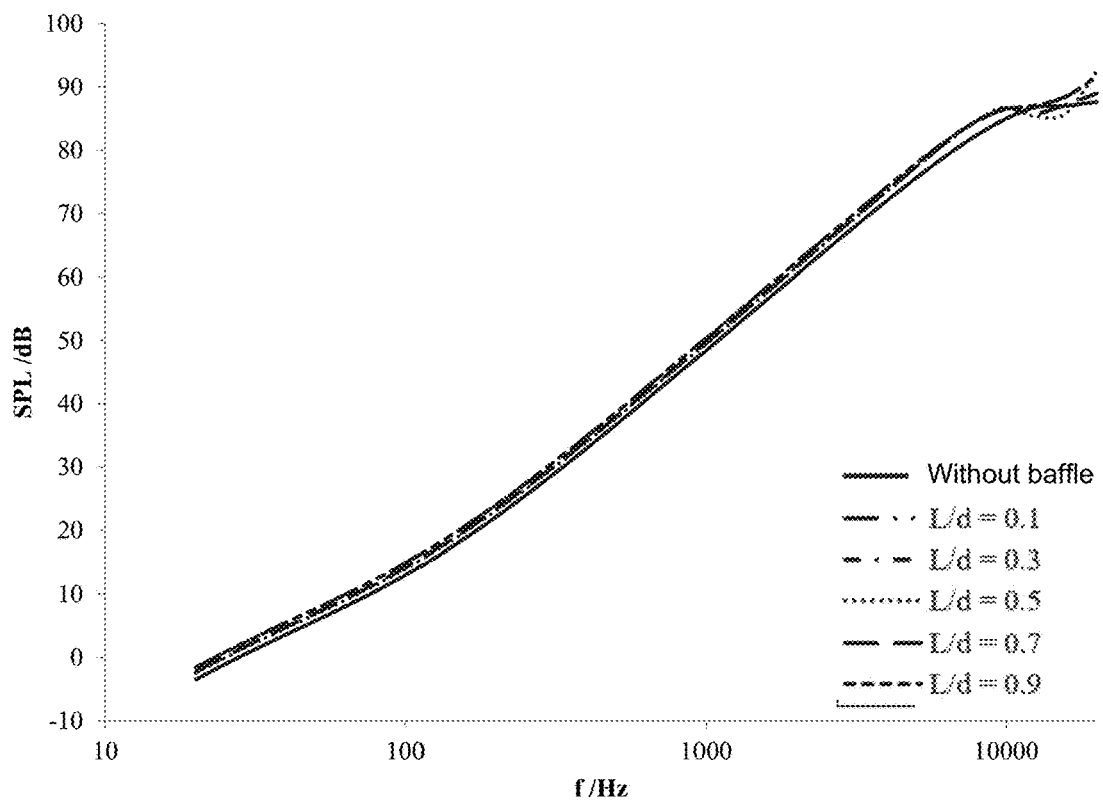
FIG. 38 is a graph illustrating a variation of a volume of the far-field leakage as a function of frequency when a baffle is at different positions according to some embodiments of the present disclosure.
Figure 39:
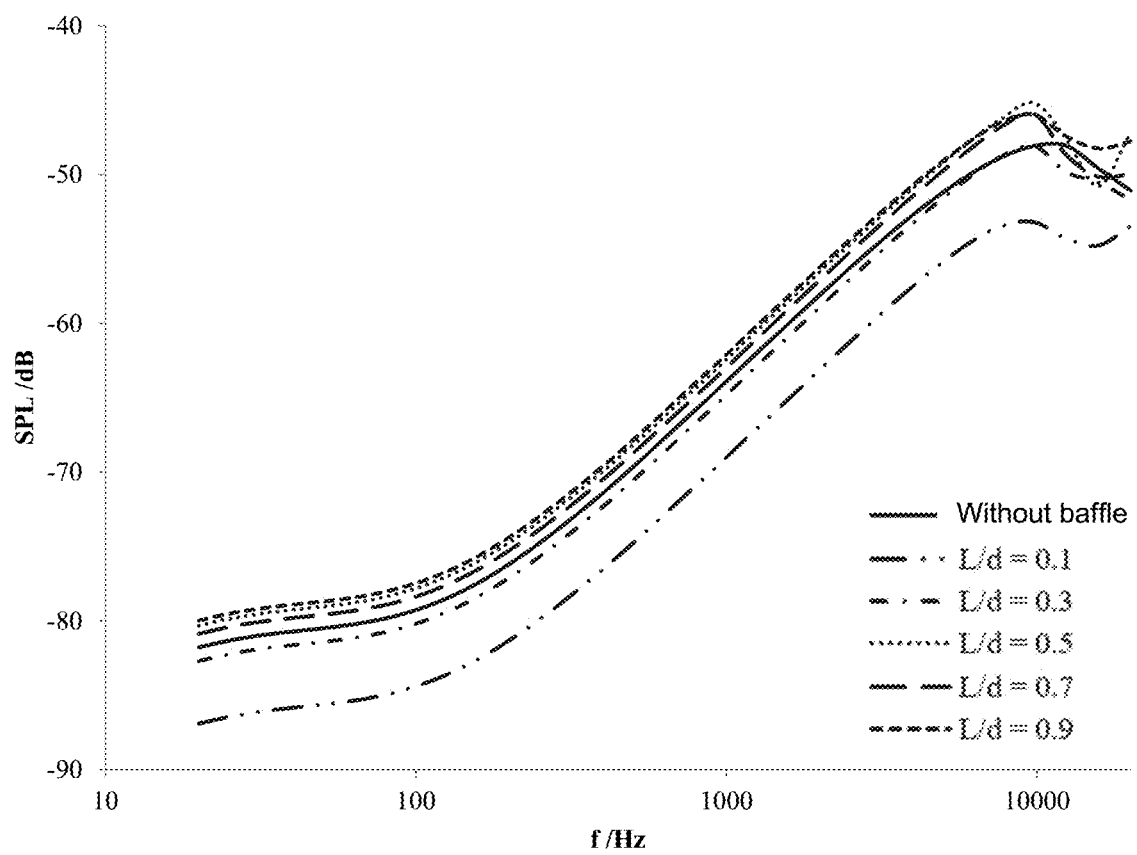
FIG. 39 is a graph illustrating a variation of a normalization parameter as a function of frequency when a baffle is at different positions according to some embodiments of the present disclosure.

FIG. 37 is a graph illustrating a variation of the volume of a near-field sound as a function of the frequency of sound when a baffle is at different positions according to some embodiments of the present disclosure. FIG. 38 is a graph illustrating a variation of the volume of a far-field leakage as a function of the frequency of sound when a baffle is at different positions according to some embodiments of the present disclosure. FIG. 39 is a graph illustrating a variation of a normalization parameter as a function of the frequency of sound when a baffle is at different positions according to some embodiments of the present disclosure. According to FIGS. 37-39, the volume of the far-field leakage may vary little with the change of the position of the baffle between the two point sources. In a situation that the distance d between the point source a1 and the point source a2 remains constant, when L decreases, the volume at the listening position may increase, the normalization parameter may decrease, and the capability to reduce sound leakage may be enhanced. In the same situation, when L increases, the volume at the listening position may increase, the normalization parameter may increase, and the capability to reduce sound leakage may be weakened. A reason for the above result may be that when L is small, the listening position may be close to the baffle, an acoustic route of the sound wave from the point source a2 to the listening position may be increased due to the baffle. In this case, an acoustic route difference between the point source a1 and the point source a2 to the listening position may be increased and the interference cancellation of the sound may be reduced. As a result, the volume at the listening position may be increased after the baffle is added. When L is large, the listening position may be faraway from the baffle. The baffle may have a small effect on the acoustic route difference between the point source a1 and the point source a2 to the listening position. As a result, a volume change at the listening position may be small after the baffle is added.

As described above, by designing positions of the sound guiding holes on the acoustic output apparatus, an auricle of a human body may serve as a baffle to separate different sound guiding holes when the user wears the acoustic output apparatus. In this case, a structure of the acoustic output apparatus may be simplified, and the output effect of the acoustic output apparatus may be further improved. In some embodiments, the positions of the two sound guiding holes may be properly designed so that a ratio of a distance between the sound guiding hole on the front side of the auricle and the auricle (or a contact point on the acoustic output apparatus for contact with the auricle) to a distance between the two sound guiding holes may be less than or equal to 0.5 when the user wears the acoustic output apparatus. In some embodiments, the ratio may be less than or equal to 0.3. In some embodiments, the ratio may be less than or equal to 0.1. In some embodiments, the ratio of the distance between the sound guiding hole on the front side of the auricle and the auricle (or a contact point on the acoustic output apparatus for contact with the auricle) to the distance between the two sound guiding holes may be larger than or equal to 0.05. In some embodiments, a second ratio of the distance between the two sound guiding holes to a height of the auricle may be larger than or equal to 0.2. In some embodiments, the second ratio may be less than or equal to 4. In some embodiments, the height of the auricle may refer to a length of the auricle in a direction perpendicular to a sagittal plane.

It should be noted that an acoustic route from an acoustic driver to a sound guiding hole in the acoustic output apparatus may have a certain effect on the volumes of the near-field sound and far-field sound leakage. The acoustic route may be changed by adjusting a cavity length between a vibration diaphragm in the acoustic output apparatus and the sound guiding hole. In some embodiments, the acoustic driver may include a vibration diaphragm. The front and rear sides of the vibration diaphragm may be coupled to two sound guiding holes through a front chamber and a rear chamber, respectively. The acoustic routes from the vibration diaphragm to the two sound guiding holes may be different. In some embodiments, a ratio of the lengths of the acoustic routes between the vibration diaphragm and the two sound guiding holes may be, for example, 0.5-2, 0.6-1.5, or 0.8-1.2.

In some embodiments, on the premise of keeping the phases of the sounds generated at the two sound guiding holes opposite, the amplitudes of the sounds generated at the two sound guiding holes may be changed to improve the output effect of the acoustic output apparatus. Specifically, impedances of acoustic routes connecting the acoustic driver and the two sound guiding holes may be adjusted so as to adjust the sound amplitude at each of the two sound guiding holes. In some embodiments, the impedance may refer to a resistance that a medium needs to overcome during displacement when acoustic waves are transmitted. The acoustic routes may or may not be filled with a damping material (e.g., a tuning net, a tuning cotton, etc.) so as to adjust the sound amplitude. For example, a resonance cavity, a sound hole, a sound slit, a tuning net, and/or a tuning cotton may be disposed in an acoustic route so as to adjust the acoustic resistance, thereby changing the impedances of the acoustic route. As another example, an aperture of each of the two sound guiding holes may be adjusted to change the acoustic resistance of the acoustic routes corresponding to the two sound guiding holes. In some embodiments, a ratio of the acoustic impedance of the acoustic route between the acoustic driver (the vibration diaphragm) and one of the two sound guiding holes to the acoustic route between the acoustic driver and the other sound guiding hole may be 0.5-2 or 0.8-1.2.

It should be noted that the above descriptions are merely for illustration purposes, and not intended to limit the present disclosure. It should be understood that, for those skilled in the art, after understanding the principle of the present disclosure, various modifications and changes may be made in the forms and details of the acoustic output apparatus without departing from this principle. For example, the listening position may not be on the line connecting the two point sources, but may also be above, below, or in an extension direction of the line connecting the two point sources. As another example, a measurement method of the distance from a point source to the auricle, and a measurement method of the height of the auricle may also be adjusted according to different scenarios. These similar changes may be all within the protection scope of the present disclosure.

Figure 40:
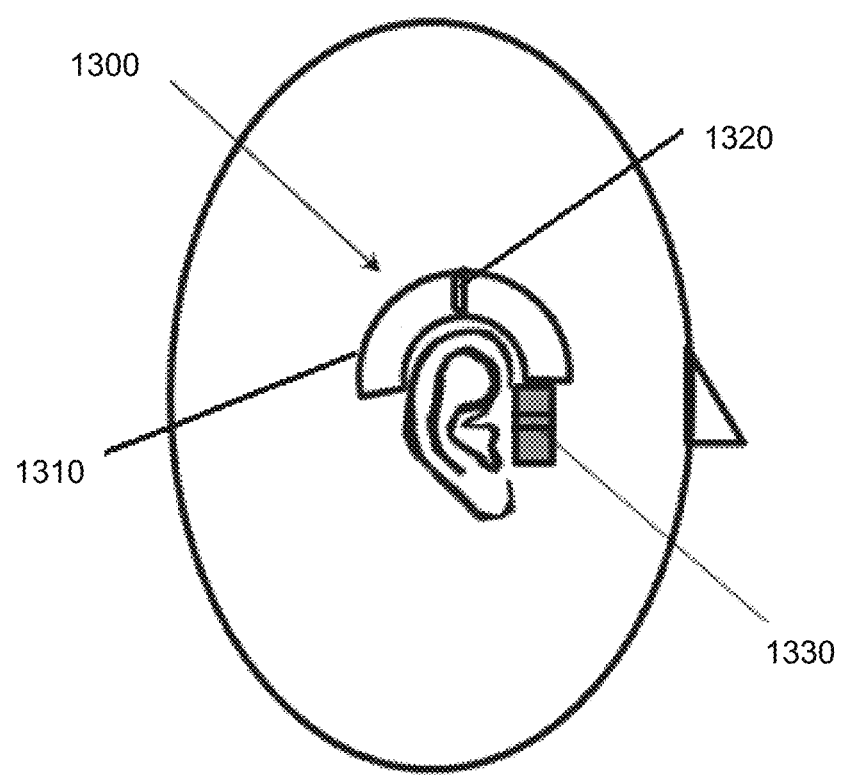
FIG. 40 is a schematic diagram illustrating another exemplary acoustic output apparatus according to some embodiments of the present disclosure.

FIG. 40 is a schematic diagram illustrating another exemplary acoustic output apparatus according to some embodiments of the present disclosure.

For human ears, the frequency band of sound that can be heard may be concentrated in a mid-low-frequency band. An optimization goal in the mid-low-frequency band may be to increase a volume of the sound heard by the user. If the listening position is fixed, parameters of the two point sources may be adjusted such that the volume of the sound heard by the user may increase significantly while a volume of leaked sound may be substantially unchanged (an increase in the volume of the sound heard by the user may be greater than an increase in the volume of the sound leakage). In a high-frequency band, a sound leakage reduction effect of the two point sources may be weaker. In the high-frequency band, an optimization goal may be reducing a sound leakage. The sound leakage may be further reduced by adjusting the parameters of the two point sources of different frequencies. In some embodiments, the acoustic output apparatus 1300 may also include an acoustic driver 1330. The acoustic driver 1330 may output sounds from two of second sound guiding holes. Details regarding the acoustic driver 1330, the second sound guiding holes, and a structure therebetween may be described with reference to the acoustic driver 1320 and the first sound guiding holes. In some embodiments, the acoustic driver 1330 and the acoustic driver 1320 may output sounds of different frequencies. In some embodiments, the acoustic output apparatus may further include a controller configured to cause the acoustic driver 1320 to output sound in the first frequency range, and cause the acoustic driver 1330 to output sound in the second frequency range. The second frequency range may include frequencies higher than the first frequency range. For example, the first frequency range may be 100 Hz-1000 Hz, and the second frequency range may be 1000 Hz-10000 Hz.

In some embodiments, the acoustic driver 1320 may be a low-frequency speaker, and the acoustic driver 1330 may be a mid-high-frequency speaker. Due to different frequency response characteristics of the low-frequency speaker and the mid-high-frequency speaker, frequency bands of the output sound may also be different. High-frequency bands and low-frequency bands may be divided by using the low-frequency speakers and the mid-high-frequency speakers, and accordingly, two low-frequency point sources and two mid-high-frequency point sources may be constructed to perform near-field sound output and a far-field leakage reduction. For example, the acoustic driver 1320 may provide two point sources for outputting low-frequency sound through the sound guiding hole 1311 and the sound guiding hole 1312, which may be mainly used for outputting sound in low-frequency band. The two low-frequency point sources may be distributed on both sides of an auricle to increase a volume near the near-field ear. The acoustic driver 1330 may provide two point sources for outputting mid-high-frequency sound through two second sound guiding holes. A mid-high-frequency sound leakage may be reduced by adjusting a distance between the two second sound guiding holes. The two mid-high-frequency point sources may be distributed on both sides of the auricle or on the same side of the auricle. Alternatively, the acoustic driver 1320 may provide two point sources for outputting full-frequency sound through the sound guiding hole 1311 and the sound guiding hole 1312 so as to further increase the volume of the near-field sound.

Further, the distance d2 between the two second sound guiding holes may be less than the distance d1 between the sound guiding hole 1311 and the sound guiding hole 1312, that is, d1 may be larger than d2. For illustration purpose, as shown in FIG. 12, it may be possible to obtain a stronger sound leakage reduction capability than a single point source and one set of two point sources by setting two sets of two point sources including one set of two low-frequency point sources and one set of two high-frequency point sources with different distances.

It should be noted that the positions of the sound guiding holes of the acoustic output apparatus may be not limited to the case that the two sound guiding holes 1311 and 1312 corresponding to the acoustic driver 1320 are distributed on both sides of the auricle, and the case that the two sound guiding holes corresponding to the acoustic driver 1330 are distributed on the front side of the auricle. For example, in some embodiments, two second sound guiding holes corresponding to the acoustic driver 1330 may be distributed on the same side of the auricle (e.g., a rear side, an upper side, or a lower side of the auricle). As another example, in some embodiments, the two second sound guiding holes corresponding to the acoustic driver 1330 may be distributed on both sides of the auricle. In some embodiments, when the sound guiding holes 1311 and the sound guiding hole 1312 (and/or the two second sound guiding holes) are located at the same side of the auricle, a baffle may be disposed between the sound guiding holes 1311 and the sound guiding hole 1312 (and/or the two second sound guiding holes) so as to further increase the volume of the near-field sound and reduce the far-field sound leakage. For a further example, in some embodiments, the two sound guiding holes corresponding to the acoustic driver 1320 may also be located at the same side of the auricle (e.g., a front side, a rear side, an upper side, or a lower side of the auricle).

Figure 41:
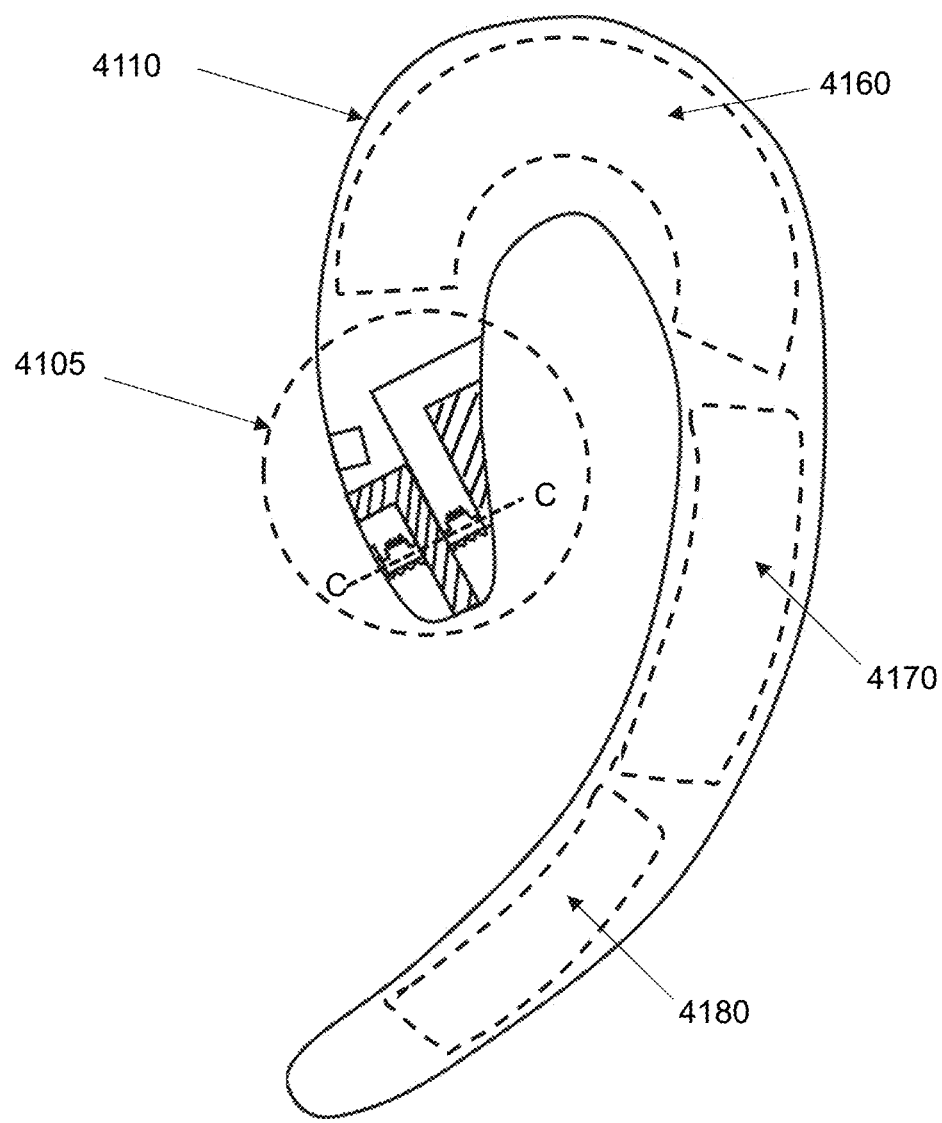
FIG. 41 is a cross-sectional structure diagram of an exemplary open earphone according to some embodiments of the present disclosure.
Figure 42:
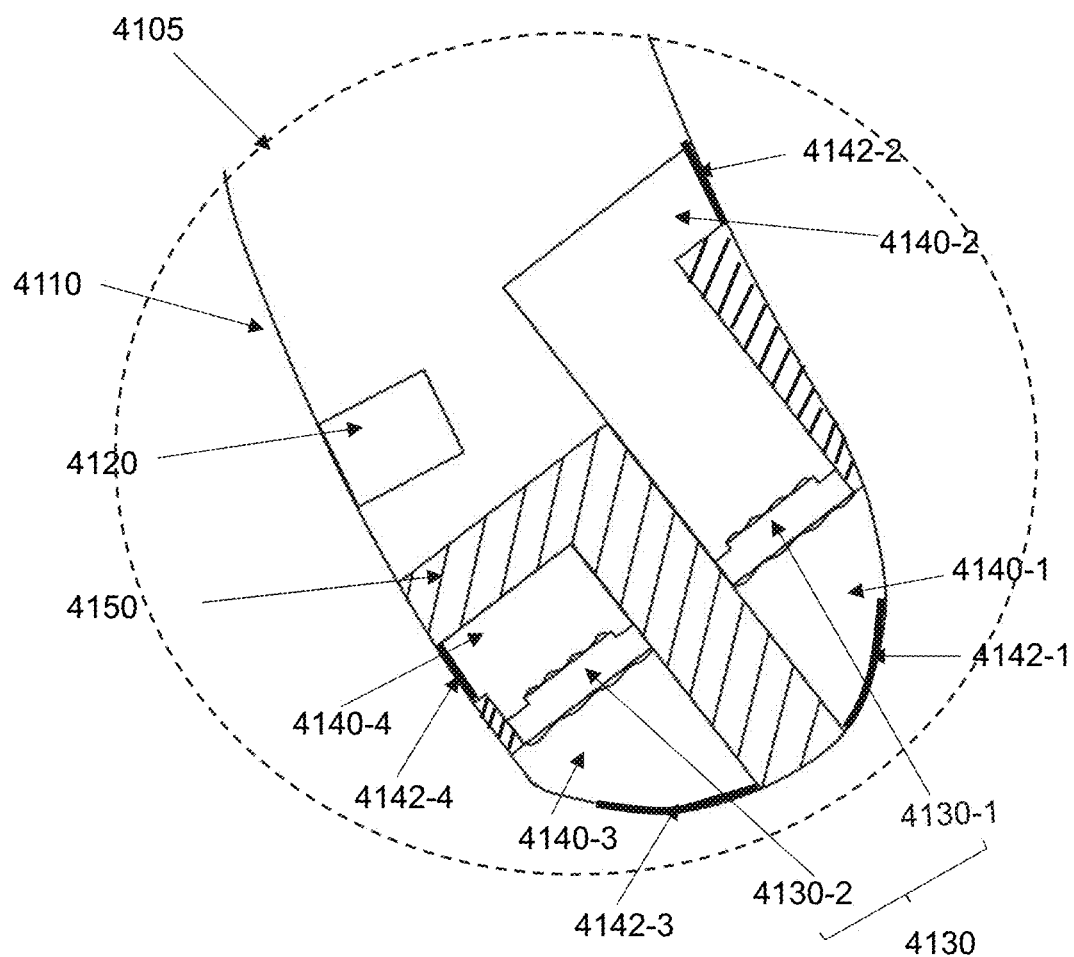
FIG. 42 is a schematic diagram illustrating a vocal structure of an exemplary open earphone according to some embodiments of the present disclosure.
Figure 43:
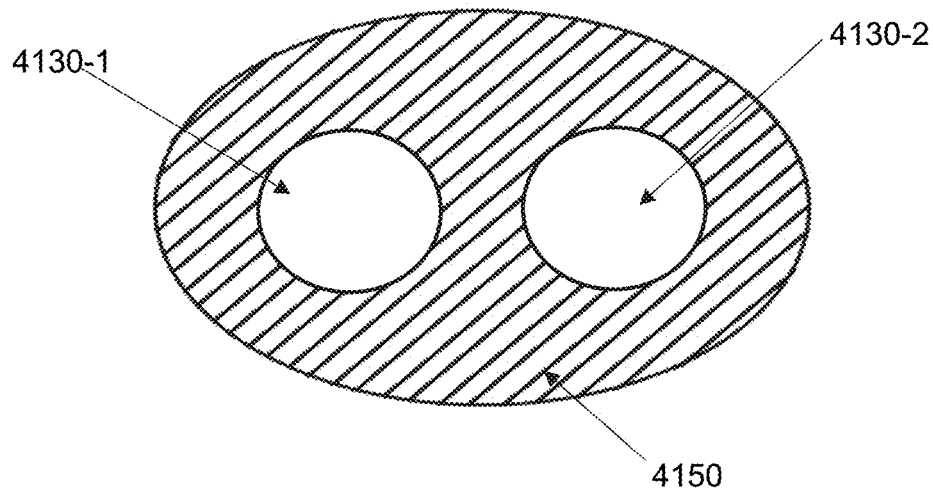
FIG. 43 is a schematic cross-sectional view of an exemplary structure of a baffle of an exemplary open earphone according to some embodiments of the present disclosure.

FIG. 41 is a schematic cross-sectional view of an exemplary open earphone according to some embodiments of the present disclosure. FIG. 42 is a schematic diagram illustrating a vocal structure of an exemplary open earphone according to some embodiments of the present disclosure. For example, FIG. 42 may be an enlarged view of a vocal structure 4105 as shown in FIG. 41. FIG. 43 is a schematic cross-sectional view of an exemplary structure of a baffle of an open earphone according to some embodiments of the present disclosure. For example, FIG. 43 may be a schematic cross-sectional view facing C-C of the baffle as shown in FIG. 41. As shown in FIG. 41, FIG. 42, and/or FIG. 43, the open earphone 4100 may include a housing 4110, at least one microphone 4120, an acoustic driver 4130, a sound guiding tube 4140 corresponding to the acoustic driver 4130 (e.g., a sound guiding tube 4140-1, a sound guiding tube 4140-2, a sound guiding tube 4140-3, a sound guiding tube 4140-4, etc.), a baffle 4150, a circuit board 4160, a Bluetooth module 4170, and a power module 4180. In some embodiments, the open earphone 4100 may further include an electronic frequency division module (not shown in FIG. 41, may refer to e.g., the electronic frequency division module 710). In some embodiments, the electronic frequency division module, the acoustic driver 4130, and the sound guiding tube 4140 may be collectively referred to as an acoustic output component. More detailed descriptions regarding the acoustic output component may be found in the descriptions of the acoustic output apparatuses in FIGS. 4-40, and are not repeated here. In some embodiments, the open earphone 4100 shown in FIGS. 41-43 is only one specific embodiment of the open earphone 200 shown in FIGS. 1 and 2. For example, an external structure of the connecting component of the open earphone 200 may be designed as an ear hook structure (e.g., the open earphone 4100). As another example, the external structure of the connecting component of the open earphone 200, may be designed as a headband structure (e.g., the open earphone 4600 shown in FIG. 46).

In some embodiments, the electronic frequency division module may be placed in the housing 4110. Exemplary electronic frequency division module may include a passive filter, an active filter, an analog filter, a digital filter, or the like, or any combination thereof. In some embodiments, by setting the acoustic driver 4130 with different frequency response characteristics (e.g., a low-frequency transducer, an intermediate-frequency transducer, and/or a high-frequency transducer), sounds output by the transducer with different frequency responses may contain different frequency band components. In some embodiments, frequency division processing of audio signals may also be implemented in acoustic routes. For example, the acoustic driver 4130 may generate full-band sound. By setting the acoustic routes with different acoustic impedances, the sound output by the acoustic driver 4130 may be acoustically filtered, such that sounds output through different acoustic routes may have different frequency components. More descriptions regarding the acoustic route frequency division may refer to FIG. 7 and its descriptions, and are not repeated herein. In some embodiments, the frequency division processing of audio signals may also be implemented by combining the two or more methods.

The sound signals with different frequencies generated by the acoustic driver 4130 may be output to a user from different sound guiding holes 4142 (e.g., a sound guiding hole 4142-1, a sound guiding hole 4142-2, a sound guiding hole 4142-3, a sound guiding hole 4142-4, etc.) via different sound guiding tubes 4140. It should be noted that the sound guiding tubes 4140 are merely an exemplary implementation of acoustic routes in which sound may be propagated in the open earphone 4100. Those skilled in the art may also think that sound may be propagated in the open earphone 4100 via other acoustic routes (e.g., a structure of a sound cavity, a resonance cavity, a sound hole, a sound slit, a tuning net, or the like, or any combination thereof) or other manner, and is not limited herein.

In some embodiments, frequency division signals generated by processing the audio signal may have frequency bands that are narrower than and within the frequency band of the audio signal. For example, the frequency range of the audio signal may be from 10 Hz to 30 kHz. The frequency band of a frequency division signal may be from 100 Hz to 200 Hz, which is narrower than and within the frequency band of the audio signal. In some embodiments, a combination of the frequency bands of the frequency division signals may completely cover the frequency band of the audio signal. Additionally or alternatively, the combination of the frequency bands of the frequency division signals may partially cover the frequency band of the audio signal. In some embodiments, at least two of the frequency division signals may have different frequency bands. Different frequency bands may refer to two or more frequency bands with at least one different parameter in a frequency band center value and/or a frequency band width. Optionally, each frequency division signal may have a feature frequency band that is different from frequency bands of other frequency division signals. That is, the feature frequency band refers to a frequency band including a frequency band range that does not overlap with frequency bands of other frequency division signals. Different frequency division signals may have the same frequency bandwidth or different frequency bandwidths. In some embodiments, an overlap between frequency bands of a pair of adjacent frequency division signals in the frequency domain may be avoided, thereby improving the sound output effect. Among the frequency division signals generated after processing, two frequency division signals with closest center frequencies may be considered to be adjacent to each other in the frequency domain. More detailed descriptions regarding the frequency bands of a pair of adjacent frequency division signals may be found in FIGS. 45A and 45B and the descriptions thereof. In some embodiments, as affected by factors such as filter characteristics of actual circuit, frequency characteristics of a transducer, frequency characteristics of a sound channel, etc., low-frequency and high-frequency sounds actually output by the open earphone 4100 may generate a certain overlap (aliasing) in a frequency band near a frequency division point. It may be understood that the overlaps may not affect the reduction effect of the overall sound leakage of the open earphone 4100 provided in the present disclosure.

The housing 4110 may be an external structure of the open earphone 4100. The shape of the housing 4110 may be configured according to the type of the open earphone (e.g., an ear hook type, a headband type) and specific requirements during use, and is not limited herein. FIG. 41 and FIG. 46 are schematic diagrams of the exemplary open earphone 200 according to some embodiments of the present disclosure. As shown in FIG. 41, the housing 4110 may cooperate with an auricle of the user, and be hung on an ear of the user, such that the open earphone 4100 may not fall easily. The open earphone 4100 with the housing 4110 of the ear hook type may also be referred to as an ear hook open earphone. As shown in FIG. 46, the housing 4110 may straddle the user's head and be fixed on the head of the user in a manner similar to a headband. Two ends of the housing 4110 may be at a distance from the user's ears. The open earphone with the housing 4110 of the headband type may also be referred to as a headband open earphone.

The housing 4110 may be a hollow structure. The microphone 4120, the acoustic driver 4130, the sound guiding tube 4140, the baffle 4150, the circuit board 4160, the Bluetooth module 4170, and the power module 4180 may be placed in the hollow structure. As shown in FIG. 41, the microphone 4120 and the acoustic driver 4130 may be located at the front end of the housing 4110. The circuit board 4160 may be located at the middle of the housing 4110. The Bluetooth module 4170 and the power module 4180 may be located at the back end of the housing 4110. In some embodiments, the microphone 4120, the acoustic driver 4130, the sound guiding tube 4140, the baffle 4150, the circuit board 4160, the Bluetooth module 4170, and the power module 4180 may be located at any other suitable positions of the housing 4110, which are not specifically limited herein. For example, the acoustic driver 4130-1, the microphone 4120, and the circuit board 4160 may be located at the front end of the housing 4110. The Bluetooth module 4170 may be located at the middle of the housing 4110. The acoustic driver 4130-2 and the power module 3880 may be located at the back end of the housing 4110. As another example, the Bluetooth module 4170 and power module 3880 may be located at the front end of the housing 4110. The microphone 4120 and the circuit board 4160 may be located at the middle of the housing 4110. Both the acoustic driver 4130-1 and the acoustic driver 4130-2 may be located at the back end of the housing 4110. The sound guiding holes may be set at the front end of the housing 4110 through the sound guiding tubes. It should be noted that positions of the microphone 4120, the acoustic driver 4130, the sound guiding tube 4140, the baffle 4150, the circuit board 4160, the Bluetooth module 4170, and the power module 3880 in the housing 4110 may be set according to requirements of open earphone 4100. The specific positions of the components in the drawings are for illustrative purposes only, and do not limit the scope of the present disclosure. As shown in FIG. 43, the acoustic driver 4130-1 and the acoustic driver 4130-2 may be separated by the baffle 4150.

In some embodiments, the housing 4110 may be integrally formed. In some embodiments, the housing 4110 may also be assembled by plugging, clamping, or the like. In some embodiments, the housing 4110 may be made of a metal material (e.g., copper, aluminum, titanium, gold, etc.), an alloy material (e.g., aluminum alloy, titanium alloy, etc.), a plastic material (e.g., polyethylene, polypropylene, epoxy resin, nylon, etc.), a fiber material (e.g., acetate fiber, propionate fiber, carbon fiber, etc.), or the like. In some embodiments, a protective casing may be set outside the housing 4110. The protective casing may be made of a soft material with certain elasticity, such as soft silica gel, rubber, etc., for providing a better touch feeling for the user.

Sound guiding holes, for example, a first sound guiding hole 4142-1, a second sound guiding hole 4142-2, a third sound guiding hole 4142-3, a fourth sound guiding hole 4142-4, etc. may be set on the surface of the housing 4110. The open earphone 4100 may transmit sound to the user through the sound guiding holes 4142 via air. The acoustic driver 4130 may convert a frequency division signal (e.g., an electric signal) into a sound signal. The acoustic driver 4130 may transmit the sound signal to a sound guiding hole through a corresponding sound guiding tube. Then the sound may be transmitted to the user through the guiding hole. In order to further describe how the setting of the sound guiding holes on the housing 4110 affects the sound output effect of the open earphone 4100, the sound may be regarded as being transmitted outward from the sound guiding hole. The present disclosure may describe the sound guiding holes on the open earphone 4100 as sound sources for outputting sound (of course, the actual sound source is still a vocal device). For brevity and illustrative purposes, when the sizes of the sound guiding holes on the open earphone 4100 are small, each sound guiding hole may be approximated as a point source.

The microphone 4120 may receive an external sound signal (e.g., a user's voice signal). The microphone 4120 may convert the received sound signal into an electrical signal. The sound signal received by the microphone 4120 may be processed (e.g., filtered, denoised, amplificated, smoothed, and/or frequency divided, etc.) to obtain an audio signal (or a frequency division signal). The audio signal may be sent to other objects or devices that communicate with the open earphone 4100 through other components of the open earphone 4100 (e.g., a Bluetooth component, a WIFI component).

The acoustic driver 4130 may convert input electrical signals into sound signals. The conversion technique may be a sound vibration technique. In some embodiments, the acoustic driver 4130 may process received audio signals into frequency division signals due to different frequency responses of the received audio signals. The acoustic driver 4130 may convert the frequency division signals into sound signals in different frequency bands. In some embodiments, the acoustic driver 4130 may directly receive frequency division signals in different frequency bands. The acoustic driver 4130 may convert the received frequency division signals into sound signals. Then, the acoustic driver 4130 may respectively output the sound signals to the user who wears the open earphone 4100. In some embodiments, the acoustic driver 4130 may include at least two speaker units (or transducers). Merely by way of example, FIG. 41, FIG. 42, and FIG. 43 all describe two speaker units, that is, a first speaker unit 4130-1 and a second speaker unit 4130-2. The first speaker unit 4130-1 may correspond to a low-frequency signal, and the second speaker unit 4130-2 may correspond to a high-frequency signal. In some embodiments, the acoustic driver 4130 may include an air-conducted speaker, a bone-conducted speaker, a hydroacoustic transducer, an ultrasonic transducer, or the like, or any combination thereof. In some embodiments, the acoustic driver 4130 may include a dynamic coil speaker, a moving iron speaker, a piezoelectric speaker, an electrostatic speaker, a magnetostrictive speaker, a balanced armature speaker, or the like, or any combination thereof. In some embodiments, each speaker unit may have the same frequency response characteristic. In some embodiments, each speaker unit may have different frequency response characteristics.

It should be noted that a correspondence between a specific speaker unit and a specific frequency division signal may refer to that a frequency band of a frequency division signal input to the specific speaker unit may be the same as a frequency band of the specific frequency division signal. The correspondence between a specific speaker unit and a specific frequency division signal may also refer to that the specific speaker unit may generate the specific frequency division signal. The correspondence between a specific speaker unit and a specific frequency division signal may also refer to that a frequency band of a sound signal that is processed by the specific speaker unit and transmitted through a sound guiding hole may be the same as a frequency band of the specific frequency division signal.

Each speaker unit may convert input electrical signals (e.g., different frequency division signals) into sound signals through a sound vibration technique for outputting. In some embodiments, each speaker unit may correspond to two sound guiding holes 4142. Each speaker unit may output a set of sound signals with opposite phases and the same intensity, which are transmitted to the user through the sound guiding tube 4140 and the corresponding sound guiding holes 4142, respectively. For example, the speaker unit may include a diaphragm, which is driven by an electric signal to generate vibrations. The front and back sides of the diaphragm may simultaneously output a sound with a positive phase and a sound with a negative phase respectively. In some embodiments, by setting positions of the sound guiding holes, phases of the sound with a positive phase and the sound with a negative phase at a listening position (i.e., a near field such as the center of an ear hole of the user's ear) may be the same or close and superimposed, and phases of the sound with a positive phase and the sound with a negative phase at a far field (common sound leakage points in the surrounding environment) may be reversed and cancelled. In this way, the open earphone 4100's ability to reduce sound leakage at far field may be improved while a sound volume at the near field is ensured. In some embodiments, the two sound guiding holes corresponding to the same speaker unit may be referred to as two point sources. For example, the first sound guiding hole 4142-1 and the second sound guiding hole 4142-2 corresponding to the speaker unit 4130-1 may be referred to as two point sources. The third sound guiding hole 4142-3 and the fourth sound guiding hole 4142-4 corresponding to the speaker unit 4130-2 may also be referred to as two point sources. In some embodiments, frequency division signals transmitted from sound guiding holes of the two point sources may include the same frequency band and amplitude, and different (e.g., opposite) phases. In some embodiments, the frequency division signals transmitted from the sound guiding holes of the two point sources may include the same frequency band and phase. In some embodiments, the speaker unit may only correspond to a single sound guiding hole. That is, the speaker unit may correspond to a single point source. The speaker unit may only output a unique frequency division signal. For example, a side of the speaker unit 4130-1 facing the sound guiding hole 4142-2 may be closed. Two point sources may be constructed by using two speaker units (i.e., two single point sources). For example, high-frequency two point sources may be constructed using two balanced armature speakers (i.e., the two point sources corresponding to high-frequency signals). In some embodiments, parameters such as a frequency, a phase, and an amplitude derivative of the frequency division signal corresponding to each single point source in each group of two point sources may be adjusted individually. For example, each single point source in each group of two point sources may include the same frequency, and the same or different phases. As another example, each single point source in each group of two point sources may include the same frequency, and the same or different amplitudes.

In some embodiments, the higher the frequency of frequency division signal corresponding to the speaker unit is, the shorter the distance between the sound guiding holes corresponding the speaker unit may be. For example, the first speaker unit 4130-1 may output low-frequency signals, and the second speaker unit 4130-2 may output high-frequency signals. The distance between the first sound guiding hole 4142-1 and the second sound guiding hole 4142-2 corresponding to the first speaker unit 4130-1 may be greater than the distance between the third sound guiding hole 4142-3 and the fourth sound guiding hole 4142-4 corresponding to the second speaker unit 4130-2. By setting the distance between sound guiding holes corresponding to a speaker unit, the ability of the open earphone 4100 to reduce sound leakage may be improved. When the two point sources have a fixed distance, the sound leakage generated by the two point sources may increase as the audio frequency increases, and the ability to reduce sound leakage may decrease as the audio frequency increases. When a value of the frequency is greater than a certain value, the sound leakage generated by the two point sources may be greater than that generated by a single point source. A frequency with the certain value may be an upper limit frequency under which the two point sources may reduce the sound leakage. More descriptions regarding the frequency and the distance between the two point sources, and the upper limit frequency for reducing sound leakage may be found elsewhere in the present disclosure (e.g., FIG. 5, FIG. 6 and the descriptions thereof). For different frequency division signals, it is possible to obtain a stronger sound leakage reduction capability than single point sources by setting multiple groups of two point sources with different distances. For example, the audio signal may be divided into three (e.g., low, medium, and high) frequency bands. Different distances may be set to obtain two low-frequency point sources, two medium-frequency point sources and two high-frequency point sources. The distance of the low-frequency point sources may be the largest, the distance of the intermediate-frequency point sources distance may be medium, and the distance of the high-frequency point sources may be the smallest. In the low-frequency band, as an increased volume of the sound listening is larger than an increased volume of the sound leakage after enlarging the distance between sound sources, a higher volume output may be achieved in the low-frequency band. At the same time, as the sound leakage of the two point sources in the low-frequency band is originally small, the sound leakage that increases slightly after enlarging the distance between sound sources may remain at a low level. In the high-frequency band, by reducing the distance between sound sources, the problems of low upper limit frequency and narrow frequency band in the reduction of sound leakage may be overcame. In a higher frequency band, the effect of reducing sound leakage may be stronger, which may meet the requirements of an open earphone.

In some embodiments, the acoustic driver 4130 may include only the first speaker unit 4130-1 and the second speaker unit 4130-2. The first speaker unit 4130-1 may correspond to a low-frequency signal, and the second speaker unit 4130-2 may correspond to a high-frequency signal. In some embodiments, a frequency division point between the low and high frequencies may be between 600 Hz-1.2 kHz. In some embodiments, the first speaker unit 4130-1 may correspond to two sound guiding holes 4142-1 and 4142-2. The second speaker unit 4130-2 may correspond to two sound guiding holes 4142-3 and 4142-4. The distance (denoted as $d_l$) between the sound guiding holes 4142-1 and 4142-2 and the distance (denoted as $d_h$) between the sound guiding holes 4142-3 and 4142-4 may be any value. Merely by way of example, $d_l$ may be greater than $d_h$, for example, $d_l$ being not greater than 40 mm (e.g., in the range of 20 mm-40 mm), and $d_h$ being not greater than 12 mm. Preferably, $d_l$ may not be less than 12 mm, and $d_h$ may not be greater than 7 mm (e.g., in the range of 3 mm-7 mm). More preferably, $d_l$ may be 30 mm, and $d_h$ may be 5 mm. As another example, $d_l$ may be at least two times more than $d_h$. Preferably, $d_l$ may be at least three times more than $d_h$. Preferably, $d_l$ may be at least 5 times more than $d_h$. In some embodiments, a range of $$\frac{d_l}{d_h}$$

may be 2-10. Preferably, the range of $$\frac{d_l}{d_h}$$

may be 2.5-9.5. More preferably, the range of $$\frac{d_l}{d_h}$$

may be 3-9. More preferably, the range of $$\frac{d_l}{d_h}$$

may be 3.5-8.5. More preferably, the range of $$\frac{d_l}{d_h}$$

may be 4-8. More preferably, the range of $$\frac{d_l}{d_h}$$

may be 4.5-7.5. More preferably, the range of $$\frac{d_l}{d_h}$$

may be 5-7. More preferably, the range of $$\frac{d_l}{d_h}$$

may be 5.5-6.5. More preferably, $$\frac{d_l}{d_h}$$

may be 6.

Figure 44:
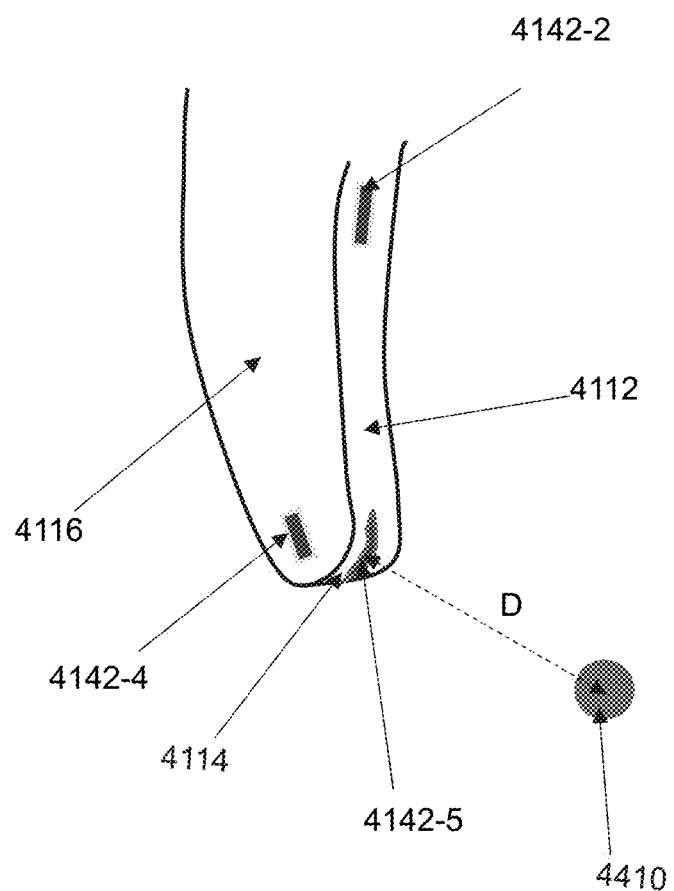
FIG. 44 is a schematic diagram illustrating an exemplary open earphone according to some embodiment of the present disclosure.

In some embodiments, each group of two point sources may include a near-ear point source and a far-ear point source. For example, when the user wears the open earphone 4100, the first sound guiding hole 4142-1 may be closer to the ear hole than the second sound guiding hole 4142-2, and the third sound guiding hole 4142-3 may be closer to the ear hole than the fourth sound guiding hole 4142-4. The first sound guiding hole 4142-1 and the third sound guiding hole 4142-3 may be referred to as near-ear point sources, and the second sound guiding hole 4142-2 and the fourth sound guiding hole 4142-4 may be referred to as far-ear point sources. In some embodiments, the distance (denoted as L) between the first sound guiding hole 4142-1 and the third sound guiding hole 4142-3 may not be greater than 20 mm. Optionally, L may not be greater than 18 mm. More preferably, L may not be greater than 16 mm. More preferably, L may not be greater than 14 mm. More preferably, L may not be greater than 12 mm. More preferably, L may not be greater than 10 mm. More preferably, L may not be greater than 9 mm. More preferably, L may not be greater than 8 mm. More preferably, L may not be greater than 7 mm. More preferably, L may not be greater than 6 mm. More preferably, L may not be greater than 5 mm. More preferably, L may not be greater than 4 mm. More preferably, L may not be greater than 3 mm. More preferably, L may not be greater than 2 mm. More preferably, L may not be greater than 1 mm. More preferably, L may be equal to zero. When L is equal to 0, the near-ear point sources may be combined into a single sound guiding hole, which may be used as a main sound guiding hole to transmit sound to the user's ear hole. For example, the first sound guiding hole 4142-1 and the third sound guiding hole 4142-3 may be combined into a single sound guiding hole (e.g., a sound guiding hole 4142-5 as shown in FIG. 44). In some embodiments, at least a portion of the structure of the at least one sound guiding hole may face the ear of the user, such that the sound emitted from the sound guiding hole may be transmitted toward the user's ear hole (as shown in FIG. 44).

In some embodiments, the shape of a sound guiding hole may include but not limited to a stripe, a circle, an oval, a square, a trapezoid, a rounded quadrilateral, a triangle, an irregular shape, or the like, or any combination thereof. In some embodiments, the shape of each sound guiding hole may be the same or different. For example, shapes of the first sound guiding hole 4142-1 and the third sound guiding hole 4142-3 may be circles, and shapes of the second sound guiding hole 4142-2 and the fourth sound guiding hole 4142-4 may be ovals. As another example, the shape of the first sound guiding hole 4142-1 may be a stripe, the shape of the second sound guiding hole 4142-2 may be an oval, the shape of the third sound guiding hole 4142-3 may be a circle, and the shape of the fourth sound guiding hole 4142-4 may be a triangle. As another example, shapes of the first sound guiding hole 4142-1, the second sound guiding hole 4142-2, the third sound guiding hole 4142-3, and the fourth sound guiding hole 4142-4 may be stripes.

In some embodiments, diameters or sizes of sound guiding holes corresponding to different speaker units may be the same or different. In some embodiments, when the size of each sound guiding hole is different, the corresponding volume of listening and/or sound leakage may also be different. In some embodiments, the two point sources may achieve a stronger capacity of reducing sound leakage by setting an appropriate near-far aperture ratio (i.e., a ratio of the size of a sound guiding hole at a near-ear point to the size of a sound guiding hole at a far-ear point). In some embodiments, the higher the frequency band of the frequency division signal corresponding to the two point sources is, the smaller the near-far aperture ratio may be. That is, as the frequency band of the frequency division signal corresponding to the two point sources becomes higher, an aperture of the sound source at a near-ear point and an aperture of the sound source at a far-ear point may gradually become the same. For example, for two point sources corresponding to low-frequency signals, the aperture of the sound source at a near-ear point may be set larger than the aperture of the sound source at a far-ear point. For two point sources corresponding to high-frequency signals, the aperture of the sound source at a near-ear point may be set to be the same as or similar to that of the sound source at a far-ear point.

In some embodiments, for the two point sources corresponding to low frequency signals, the near-far aperture ratio may not be less than 1. Optionally, the near-far aperture ratio may not be less than 5. Preferably, the near-far aperture ratio may not be less than 10. More preferably, the near-far aperture ratio may not be less than 15. More preferably, the near-far aperture ratio may not be less than 20. More preferably, the near-far aperture ratio may not be less than 25. More preferably, the near-far aperture ratio may not be less than 30.

In some embodiments, for the two point sources corresponding to high-frequency signals, the near-far aperture ratio may not be greater than 10. Preferably, the near-far aperture ratio may not be greater than 8. More preferably, the near-far aperture ratio may not be greater than 6. More preferably, the near-far aperture ratio may not be greater than 4. More preferably, the near-far aperture ratio may not be greater than 3. More preferably, the near-far aperture ratio may not be greater than 2. More preferably, the near-far aperture ratio may be equal to 1.

In some embodiments, the user may obtain different listening effects by adjusting positions of different sound guiding holes. More descriptions regarding positions of the sound guiding holes and the listening position may be found elsewhere in the present disclosure (e.g., FIG. 31 and the description thereof). In some embodiments, in order to ensure that the user has a better listening effect, the distance (denoted as D) between the center point of the sound source at a near-ear point of each group of two point sources and the center point of the user's ear hole 4410 may not be greater than 10 cm. Preferably, $D_n$ may not be greater than 9 cm. More preferably, $D_n$ may not be greater than 8 cm. More preferably, $D_n$ may not be greater than 7 cm. More preferably, $D_n$ may not be greater than 6 cm. More preferably, $D_n$ may not be greater than 5 cm. More preferably, $D_n$ may not be greater than 4 cm. More preferably, $D_n$ may not be greater than 3 cm. More preferably, $D_n$ may not be greater than 2.5 cm. More preferably, $D_n$ may not be greater than 2 cm. More preferably, $D_n$ may not be greater than 1.5 cm. More preferably, $D_n$ may not be greater than 1 cm. More preferably, $D_n$ may not be greater than 0.5 cm. More preferably, $D_n$ may not be greater than 0.4 cm. More preferably, $D_n$ may not be greater than 0.3 cm. More preferably, $D_n$ may not be greater than 0.2 cm. More preferably, $D_n$ may not be greater than 0.1 cm.

In some embodiments, the open earphone 4100 may include a low-frequency speaker unit and a high-frequency speaker unit. The near-ear sound guiding holes corresponding to the low-frequency speaker unit and the near-ear sound guiding holes corresponding to the high-frequency speaker unit may be combined into a single sound guiding hole. For example, as shown in FIG. 44, the first sound guiding hole 4142-1 and the third sound guiding hole 4142-3 may be combined into the sound guiding hole 4142-5. In some embodiments, one end of the sound guiding hole 4142-5 may be set on an end surface 4112, and the other end of the sound guiding hole 4142-5 may be set on an end surface 4114. In this way, when the user wears the open earphone 4100, the first sound guiding hole 4142-1 and the third sound guiding hole 4142-3 (i.e., sound sources at the near-ear point) may face the user's ear hole, such that a volume of sound heard by the user may be higher. In some embodiments, a second sound guiding hole 4142-2 may be set on the end surface 4112. A fourth sound guiding hole 4142-4 may be set on the end surface 4116. In some embodiments, the first sound guiding hole 4142-1, the second sound guiding hole 4142-2, the third sound guiding hole 4142-3, and the fourth sound guiding hole 4142-4 may be set on the end surface 4112 (or the end surface 4116). In some embodiments, the third sound guiding hole 4142-3 may be set on the end surface 4112, and the fourth sound guiding hole 4142-4 may be set on an opposite side of the end surface 4112. In some embodiments, as shown in FIG. 41, the first sound guiding hole 4142-1 and the second sound guiding hole 4142-2 may be set on any position of the front end of the housing 4110 (e.g., the end surface 4112, the end surface 4114, or the end surface 4116). The third sound guiding hole 4142-3 and the fourth sound guiding hole 4142-4 may be set on any position on the back end of the housing 4110. In some embodiments, the first sound guiding hole 4142-1 and the third sound guiding hole 4142-3 may be set on the front end of the housing 4110, the second sound guiding hole 4142-2 and the fourth sound guiding hole 4142-4 may be set on the back end of the housing 4110. In some embodiments, when the user wears the open earphone 4100, the distance (denoted as D) between the center point of the sound guiding hole 4142-5 and the center point of the ear hole near the sound guiding hole (e.g, the ear hole 4410) may not be greater than 10 cm. Preferably, D may not be greater than 9 cm. More preferably, D may not be greater than 8 cm. More preferably, D may not be greater than 7 cm. More preferably, D may not be greater than 6 cm. More preferably, D may not be greater than 5 cm. More preferably, D may not be greater than 4 cm. More preferably, D may not be greater than 3 cm. More preferably, D may not be greater than 2.5 cm. More preferably, D may not be greater than 2 cm. More preferably, D may not be greater than 1.5 cm. More preferably, D may not be greater than 1 cm. More preferably, D may not be greater than 0.5 cm. More preferably, D may not be greater than 0.4 cm. More preferably, D may not be greater than 0.3 cm. More preferably, D may not be greater than 0.2 cm. More preferably, D may not be greater than 0.1 cm.

In some embodiments, a baffle structure may be set between the two point sources, such that the volume of sound leakage at the far field may not be increased significantly and the volume of the listening at the near field may be significantly increased, thereby improving the user's listening effect. More descriptions regarding improving the listening effect by setting the baffle between the two point sources may be found elsewhere in the present disclosure (e.g., FIGS. 14-37 and the descriptions thereof). In some embodiments, two low-frequency point sources may include a sound guiding hole set at the near-ear point, and a corresponding sound guiding hole at the far-ear point set at the back end of the housing 4110. In this way, when the user wears the open earphone 4100, the sound source at the near-ear point may be separated from the sound source at the far-ear point by the user's ear contour. In this situation, the ear contour may play a role of the baffle, which significantly increases the volume of the listening at the near-field position and improves the user's listening effect.

In some embodiments, as the internal friction or viscous force of medium in a sound guiding tube may have a great impact on sound transmission, a diameter of the sound guiding tube may not be too small, otherwise excessive loss of sound may be caused and the output volume may be reduced. However, when the diameter of the sound guiding tube is too large and the transmitted sound is greater than a certain frequency, higher-order waves may be generated in the sound guiding tube. Therefore, in order to avoid the sound guiding tube from generating higher-order waves in the range of sound to be transmitted and ensure only planar waves propagating along a direction of the sound guiding tube, the radius of the sound guiding tube may be set reasonably. In some embodiments, the radius of the sound guiding tube may be 0.5 mm-10 mm. Preferably, the radius of the sound guiding tube may be 0.5 mm-9 mm. More preferably, the radius of the sound guiding tube may be 0.7 mm-8 mm. More preferably, the radius of the sound guiding tube may be 0.9 mm-7.5 mm. More preferably, the radius of the sound guiding tube may be 1 mm-7 mm. More preferably, the radius of the sound guiding tube may be 1.5 mm-6.5 mm. More preferably, the radius of the sound guiding tube may be 2 mm-6 mm. More preferably, the radius of the sound guiding tube may be 2.5 mm-5.5 mm. More preferably, the radius of the sound guiding tube may be 3 mm-5 mm. More preferably, the radius of the sound guiding tube may be 3.5 mm-4.5 mm. More preferably, the radius of the sound guiding tube may be 3.7 mm-4.2 mm.

In some embodiments, the sound guiding tube may interact with an impedance of a nozzle (i.e., the sound guiding hole), causing a sound with a specific frequency to form a standing wave in the sound guiding tube. The sound output from the sound guiding hole may form peaks/valleys at certain frequencies, which affects the sound output effect. The longer the length of the sound guiding tube is, the lower the frequency of generating peaks/valleys may be and the greater the number (or count) of peaks/valleys may be. Preferably, the length of the sound guiding tube may not be more than 300 mm. More preferably, the length of the sound guiding tube may not be more than 250 mm. More preferably, the length of the sound guiding tube is not more than 200 mm. More preferably, the length of the sound guiding tube may not be more than 150 mm. More preferably, the length of the sound guiding tube may not be more than 100 mm. More preferably, the length of the sound guiding tube may not be more than 50 mm. More preferably, the length of the sound guiding tube may not be more than 30 mm. More preferably, the length of the sound guiding tube may not be more than 20 mm. More preferably, the length of the sound guiding tube may not be more than 10 mm. In some embodiments, an impedance matching layer may be set at the sound guiding hole to reduce the effect of peaks/valleys.

In some embodiments, a length-diameter ratio (i.e., a ratio of length to diameter) of a sound guiding tube may affect the sound inside the sound guiding tube, which has an effect of low-pass filtering and damping and eventually reduces the sound volume. The attenuation of the sound volume in a high frequency may be greater that in a low frequency. In order to ensure that the attenuation of the sound volume does not affect listening, the length-diameter ratio of the sound guiding tube may not be greater than 200. Preferably, the length-diameter ratio of the sound guiding tube may not be greater than 180. More preferably, the length-diameter ratio of the sound guiding tube may not be greater than 160. More preferably, the length-diameter ratio of the sound guiding tube may not be greater than 150. More preferably, the length-diameter ratio of the sound guiding tube may not be greater than 130. More preferably, the length-diameter ratio of the sound guiding tube may not be greater than 110. More preferably, the length-diameter ratio of the sound guiding tube may not be greater than 80. More preferably, the length-diameter ratio of the sound guiding tube may not be greater than 50. More preferably, the length-diameter ratio of the sound guiding tube may not be greater than 30. More preferably, the length-diameter ratio of the sound guiding tube may not be greater than 10.

In some embodiments, parameters (e.g., a length, a radius, a length-diameter ratio, etc.) of each sound guiding tube may be the same or different. For example, the length of the first sound guiding tube 4140-1 may be 5 mm, and the length of the second sound guiding tube 4140-2 may be 30 mm. As another example, lengths of the first sound guiding tube 4140-1 and the third sound guiding tube 4140-3 may both be 5 mm.

In some embodiments, as the phase of a frequency division signal corresponding to each point source may be different and the volume of the listening and sound leakage may also be different, different output effects may be achieved by adjusting the phase of the each point source. In some embodiments, in order to reduce a far-field sound leakage of the open earphone 4100, the acoustic driver 4130-1 may generate low-frequency sounds with the same (or approximately equal) amplitude and opposite (or approximately opposite) phases at the first sound guiding hole 4142-1 and the second sound guiding hole 4142-2, respectively. The acoustic driver 4130-2 may generate high-frequency sounds of equal (or approximately equal) amplitude and opposite (or approximately opposite) phases at the third sound guiding hole 4142-3 and the fourth sound guiding hole 4142-4, respectively. In some embodiments, the higher a frequency band of the frequency division signal corresponding to the two point sources is, the larger the phase difference may be. For example, for two point sources formed by setting two speaker units, if the two point sources correspond to low-frequency signals, the phase difference of the low-frequency signals transmitted from the two point sources may be adjusted to be equal to or approximately equal to 0°. If the two point sources correspond to high-frequency signals, the phase difference of the high-frequency signals transmitted from the two point sources may be adjusted to be equal to or approximately equal to 180°. In some embodiments, by adjusting the phases of the two point sources, the phase difference of the two point sources at the near-field listening position (or the center of the ear hole) may be equal to or approximately equal to 0°, and the phase difference of the two point sources at the far field may be equal to or approximately equal to 180°. In some embodiments, the phase difference of two point sources may be equal to 5°, 10°, 20°, 50°, 70°, 90°, 100°, 120°, 130°, 150°, 170°, 175°, 180°, or the like, or any combination thereof.

The circuit board 4160 may integrate one or more components to achieve one or more functions. For example, a frequency division processing unit may be integrated on the circuit board 4160 to implement a frequency division process on audio signals. As another example, a signal processing unit may be integrated on the circuit board to adjust the phase and amplitude of the audio signals. The Bluetooth module 4170 may be used to enable the open earphone 4100's communication with external devices. For example, the open earphone 4100 and external audio equipment may communicate through the Bluetooth module 4170. In some embodiments, the Bluetooth module 4170 may be integrated on the circuit board 4160. The power module 3880 may be used to provide power to one or more components of the open earphone 4100. In some embodiments, the power module 3880 may include a storage battery, a dry battery, a lithium battery, a Daniel battery, a fuel cell, or the like. Structures such as the circuit board 4160, the Bluetooth module 4170, and the power module 3880 of the open earphone 4100 may be set with reference to settings of conventional headphones, and is not repeated here.

It should be noted that the above description of the open earphone 4100 is merely for illustrative purposes, and not intended to limit the scope of the present disclosure. For those skilled in the art, various changes and modifications may be made according to the description of the present disclosure. The feature, structure, method, and other features of the exemplary embodiment described herein may be combined in various ways to obtain additional and/or alternative exemplary embodiments. In some embodiments, the open earphone 4100 may include one or more additional components. Additionally or alternatively, one or more components of the open earphone 4100 may be omitted. For example, a feedback microphone may be added to the open earphone 4100. The feedback microphone may be used to reduce residual noise (e.g., circuit current noise). As another example, the baffle 4150 may be omitted. As another example, one or more buttons (e.g., a volume up button, a volume down button, a power on/off button, a Bluetooth switch, etc.) may be set on the housing 4110. As another example, the housing 4110 may be designed as a waterproof structure. For details, see descriptions elsewhere in the present disclosure (e.g., FIGS. 46-65 and descriptions thereof). As another example, the open earphone 4100 may be connected to the user terminal through the Bluetooth module 4170. The user terminal may display a control interface, through which the user may send control instructions such as increasing/decreasing the volume. The control instructions may be received by the Bluetooth module 4170 for further controlling the open earphone 4100. In some embodiments, the Bluetooth module 4170 may be omitted. The open earphone 4100 may communicate with external devices via a data cable.

Figure 45A:
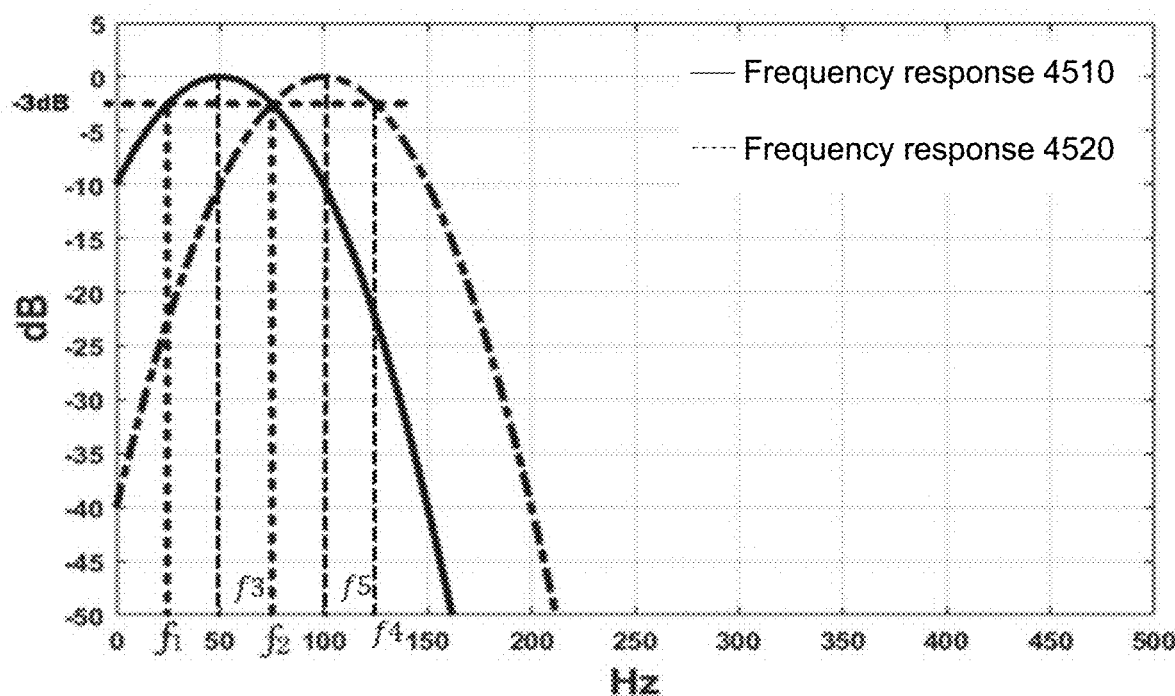
FIGS. 45A and 45B are schematic graphs illustrating exemplary frequency responses of speaker units according to some embodiments of the present disclosure.
Figure 45B:
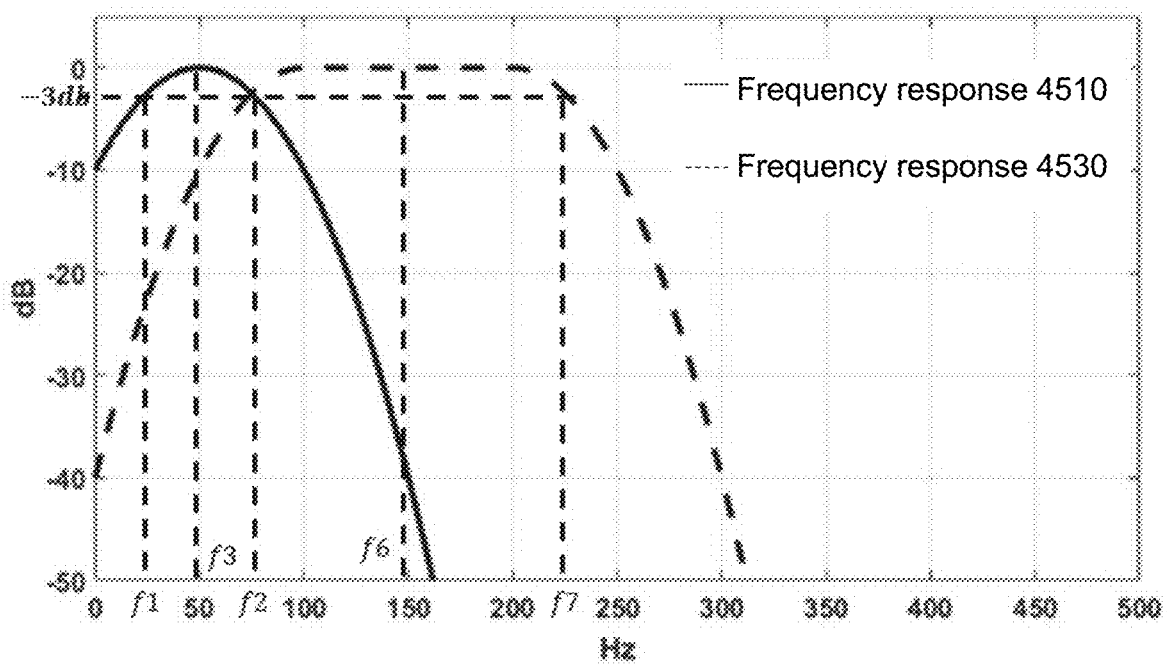
Figure 46:
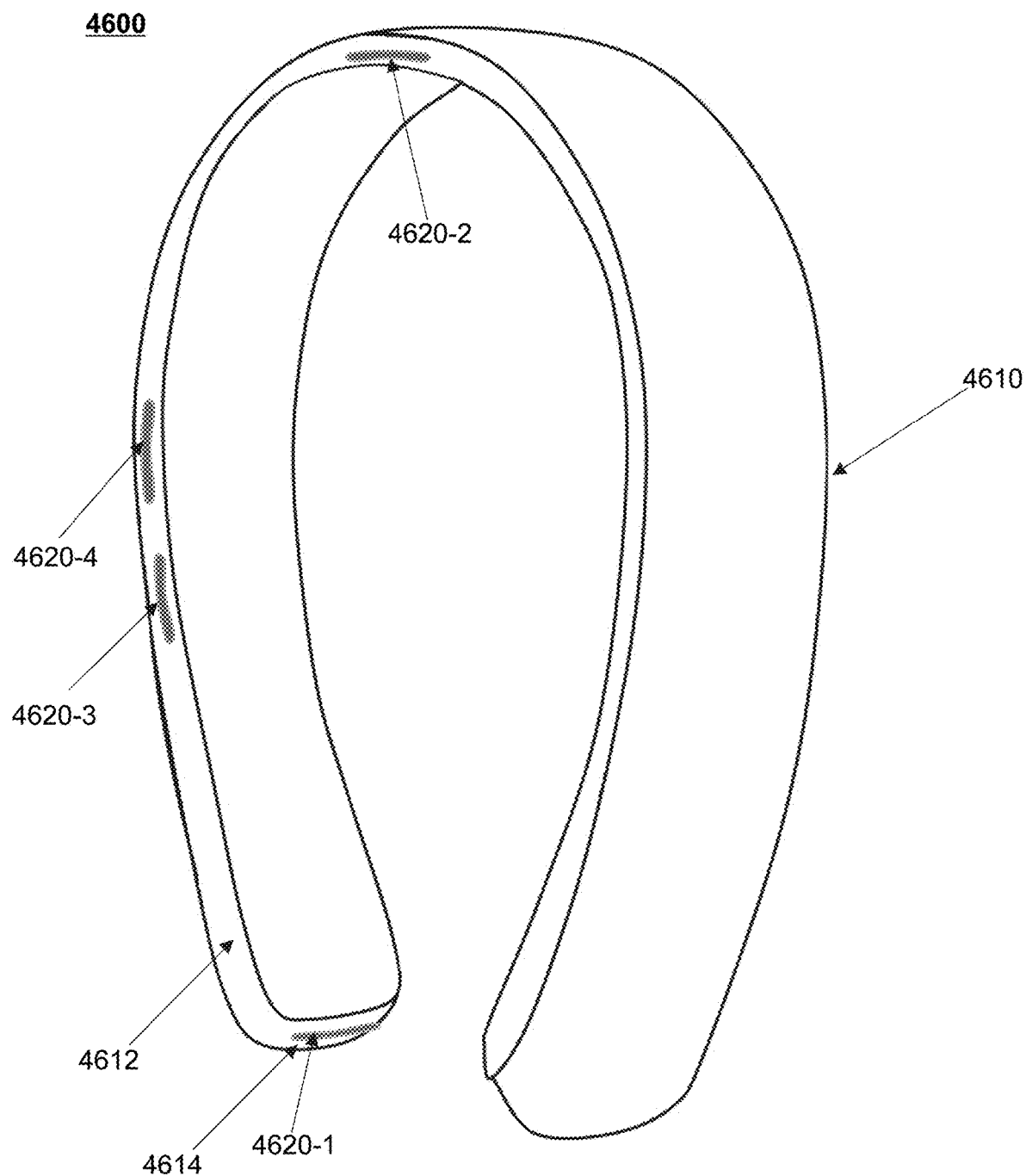
FIG. 46 is a schematic diagram illustrating an exemplary open earphone according to some embodiments of the present disclosure.

FIG. 45A is a schematic diagram illustrating an exemplary frequency response 4510 of the first speaker unit 4130-1 and an exemplary frequency response 4520 of the second speaker unit 4130-2 according to some embodiments of the present disclosure. FIG. 45B is a schematic diagram illustrating an exemplary frequency response 4510 of the first speaker unit 4130-1 and another exemplary frequency response 4520 of the second speaker unit 4130-2 according to some embodiments of the present disclosure. The first speaker unit 4130-1 may process an audio signal to generate a first frequency division signal. The second speaker unit 4130-2 may process an audio signal to generate a second frequency division signal. In the frequency division signals, the second frequency division signal may be adjacent to the first frequency division signal in the frequency domain.

In some embodiments, the frequency responses of the first speaker unit 4130-1 and the second speaker unit 4130-2 may have the same frequency bandwidth. For example, as shown in FIG. 45A, the frequency response 4510 of the first speaker unit 4130-1 may include a low half power point f1, a high half power point f2, and a center frequency f3. As used herein, a half-power point of a certain frequency response may refer to a frequency point with a specific power suppression (e.g., −3 dB). The frequency bandwidth of frequency response 4510 may be equal to the difference between f2 and f1. The frequency response 4520 of the second speaker unit 4130-2 may include a low half power point f2, a high half power point f4, and a center frequency f5. The frequency bandwidth of frequency response 4520 may be equal to the difference between f4 and f2. The frequency bandwidths of the first speaker unit 4130-1 and the second speaker unit 4130-2 may be equal to each other.

In some embodiments, the frequency responses of the first speaker unit 4130-1 and the second speaker unit 4130-2 may have different frequency bandwidths. For example, as shown in FIG. 45B, the frequency response 4530 of the second speaker unit 4130-2 may include a low half power point f2, a high half power point f7 (greater than f4), and a center frequency f6. The frequency bandwidth 4530 of the second speaker unit 4130-2 may be equal to the difference between f7 and f2, which is greater than the frequency bandwidth of the frequency response 4510 of the first speaker unit 4130-1.

In some embodiments, the frequency responses of the first speaker unit 4130-1 and the second speaker unit 4130-2 may intersect at a specific frequency point. The intersection point of the frequency responses may cause a certain overlapping range between the first and second frequency responses. In an ideal case, there may be no overlapping between the frequency responses of the first speaker unit 4130-1 and the second speaker unit 4130-2. However, in practice, there may be a certain overlapping range, causing an interference between the first frequency division signal and the second frequency division signal and affecting the quality of the first frequency division signal and the second frequency division signal. For example, the larger the overlapping range is, the larger the interference may be, and the lower the quality of the first and second frequency division signals may be.

In some embodiments, the specific frequency point where the frequency responses of the first speaker unit 4130-1 and the second speaker unit 4130-2 intersect may be close to the half power point of the frequency response of the first speaker unit 4130-1 and/or the half power point of the frequency response of the second speaker unit 4130-2. Taking FIG. 45A as an example, the frequency response 4510 and the frequency response 4520 may intersect at a high half power point f2 of the frequency response 4510, wherein the intersection point may be a low half power point of the frequency response 4520. As used herein, if a power level difference between a frequency point and a half power point is not greater than a threshold (e.g., 2 dB), the frequency point may be considered to be close to the half power point. In this case, there may be less energy loss or repetition in the frequency responses of the first speaker unit 4130-1 and the second speaker unit 4130-2, which may result in an appropriate overlapping range between the frequency responses of the first speaker unit 4130-1 and the second speaker unit 4130-2. For example, when the half power point is −3 dB and the threshold is −2 dB, if the frequency responses intersect at a frequency point at a power level greater than −5 dB and/or less than −1 dB, the overlap range may be considered to be relatively small. In some embodiments, a center frequency and/or bandwidth of the frequency responses of the first speaker unit 4130-1 and the second speaker unit 4130-2 may be adjusted to obtain a narrower or appropriate overlapping range between the frequency responses of the first speaker unit 4130-1 and the second speaker unit 4130-2, which may avoid an overlap between the frequency bands of the first and second frequency division signals.

It should be noted that the examples shown in FIGS. 45A and 45B are merely for illustration purposes, and not intended to limit the scope of the present disclosure. For those skilled in the art, many changes and modifications may be made under the teaching of the present disclosure. However, those variations and modifications do not depart from the scope of the present disclosure. For example, one or more parameters (e.g., the frequency bandwidth, the high half power point, the low half power point, and/or the center frequency) of the frequency response(s) of the first speaker unit 4130-1 and/or the second speaker unit 4130-2 may be variable.

FIG. 46 is a schematic diagram illustrating an exemplary open earphone according to some embodiments of the present disclosure. As shown in FIG. 46, the open earphone 4600 may be referred to as a headband earphone. The open earphone 4600 may have a similar configuration to the open earphone 4100. For example, the open earphone 4600 may include a housing 4610, a microphone, acoustic drivers (e.g., speaker units), sound guiding tubes corresponding to the acoustic drivers, a baffle, a circuit board, a Bluetooth module, a power module, etc. A first sound guiding hole 4620-1, a second sound guiding hole 4620-2, a third sound guiding hole 4620-3, and a fourth sound guiding hole 4620-4 corresponding to the acoustic drivers may be set on the housing 4310. As shown in FIG. 46, the first sound guiding hole 4620-1 and the second sound guiding hole 4620-2 of the open earphone 4600 may correspond to a low-frequency speaker unit; and the third sound guiding hole 4620-3 and the fourth sound guiding hole 4620-4 may correspond to a high-frequency speaker unit. In some embodiments, the first sound guiding hole 4620-1 may be set on the end face 4614, the second sound guiding hole 4620-2 may be set on the end surface 4612 and located at the top of the housing 4610, and the third sound guiding hole 4620-3 and the fourth sound guiding hole 4620-4 may be set on the end surface 4612 and located at the middle of the left end and/or the right end of the housing 4610. More descriptions regarding the open earphone 4600 may refer to the description of the open earphone 4100, and are not repeated here. For example, when the user wears the open earphone 4600, the distance between the center point of the first sound guiding hole 4620-1 and the center point of the user's ear hole on the nearest side may be the same as the distance between the center point of the sound guiding hole 4142-5 in the open earphone 4400 and the center point of the user's ear hole on the nearest side. As another example, the shapes and sizes of the first sound guiding hole 4620-1, the second sound guiding hole 4620-2, the third sound guiding hole 4620-3 and the fourth sound guiding hole 4620-4 in the open earphone 4600 may be the same as that of the first sound guiding hole 4142-1, the second sound guiding hole 4142-2, the third sound guiding hole 4142-3 and the fourth sound guiding hole 4142-4 in the open earphone 4100, respectively.

It should be noted that the ear hook earphone may be taken as an example to illustrate the open earphone disclosed in the present disclosure, and not intended to limit the application scope of the present disclosure in other open earphones. The positions of the acoustic drivers, sound guiding tubes, and sound guiding holes on the open earphone disclosed in the present disclosure may also be for illustration purposes, and not intended to limit the scope of the present disclosure. For those skilled in the art, various changes and modifications may be made according to the description of the present disclosure. The feature, structure, method, and other features of the exemplary embodiment described herein may be combined in various ways to obtain additional and/or alternative exemplary embodiments. For example, the open earphone 4100 may include three speaker units, and the three speaker units may respectively correspond to a low-frequency audio signal, a medium-frequency audio signal, and a high-frequency audio signal (i.e., a low-frequency speaker unit, a medium-frequency speaker unit, and a high-frequency speaker unit). The low-frequency speaker unit and a corresponding sound guiding tube and a corresponding sound guiding hole may be located at the front end of the housing 4110. The medium-frequency speaker unit and a corresponding sound guiding tube and a corresponding sound guiding hole may be located at the middle of the housing 4110. The high-frequency speaker unit and corresponding sound guiding tube and sound guiding hole may be located at the back end of the housing 4110. As another example, the low-frequency speaker unit, the medium-frequency speaker unit and the high-frequency speaker unit may be set at the back end of the housing 4110, and each sound guiding hole may be located at the front end of the housing 4110 through corresponding sound guiding tubes. As another example, the high-frequency/low-frequency speaker units in the open earphone 4600 may correspond to four sound guiding tubes and four sound guiding holes. The four sound guiding holes may be divided into two pairs, each of which is respectively set on the left or right side of the housing 4610 as a low-frequency two point sources for the left or right ear of the user.

Figure 47:
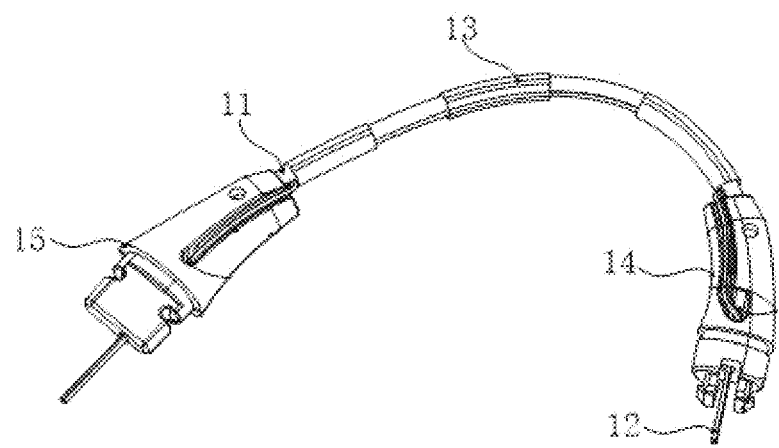
FIG. 47 is a schematic diagram illustrating an exemplary structure of an ear hook of the open earphone 200 shown in FIG. 3 according to some embodiments of the present disclosure.
Figure 48:
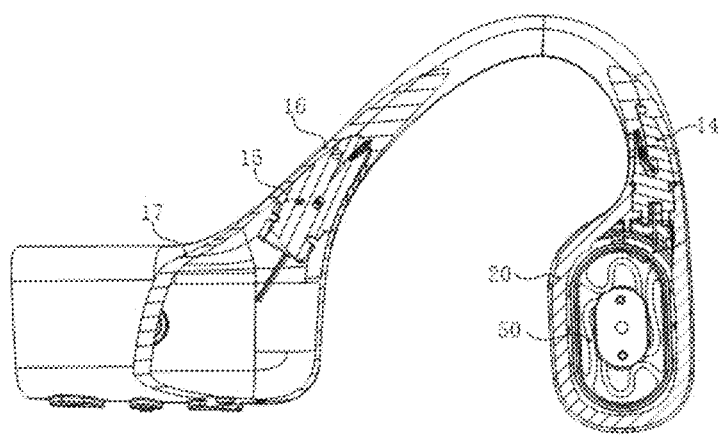
FIG. 48 is a schematic diagram illustrating a partial cross-sectional view of the open earphone 200 shown in FIG. 3 according to some embodiments of the present disclosure.

FIG. 47 is a schematic diagram illustrating an exemplary structure of an ear hook of the open earphone 200 shown in FIG. 3 according to some embodiments of the present disclosure. FIG. 48 is a schematic diagram illustrating a partial cross-sectional view of the open earphone 200 shown in FIG. 3 according to some embodiments of the present disclosure. In some embodiments, describing in connection with FIGS. 3, 47 and 48, the ear hook 10 may include an elastic metal wire 11, a lead wire 12, a fixed casing 13, and a plug end 14 and a plug end 15 set at both ends of the elastic metal wire 11. In some embodiments, the ear hook 10 may also include a protective casing 16 and a housing casing 17 that is integrally formed with the protective casing 16. The protective casing 16 may be injection-molded on the periphery of the elastic wire 11, the wire 12, the fixed casing 13, the plug end 14, and the plug end 15, such that the protective casing 16 may be fixedly connected to the elastic metal wire 11, the wire 12, the fixed casing 13, the plug end 14 and the plug end 15, respectively. Therefore, it is not necessary to injection-mold the protective casing 16 separately to cover the periphery of the elastic wire 11, the plug end 14, and the plug end 15, thereby the manufacturing and assembling process may be simplified, and the protective casing 16 may be more firmly and stably fixed.

In some embodiments, when the protective casing 16 is molded, the housing casing 17 may be integrally molded with the protective casing 16 on a side near the plug end 15 simultaneously. In some embodiments, the housing casing 17 may be integrally molded with the protective casing 16 into a whole. The circuit housing 30 may be connected to one end of the ear hook 10 by fixing with the plug end 15. A socket 22 of the chip housing 20 may be connected to another end of the ear hook 10 by fixing with the plug end 14. The housing casing 17 may cover the periphery of the circuit housing 30. In some embodiments, the protective casing 16 and the housing casing 17 may be made of a soft material with a certain elasticity, such as soft silicone, rubber, or the like. In some embodiments, the housing casing 17 may include a bag-shaped structure with one end open, such that the circuit housing 30 may enter the inside of the housing casing 17 through the open end of the housing casing 17. Specifically, the open end of the housing casing 17 may be an end of the housing casing 17 departing from the protective casing 16, such that the circuit housing 30 may enter the inside of the housing casing 17 from the end of the housing casing 17 away from the protective casing 16 and be covered by the housing casing 17.

Figure 49:
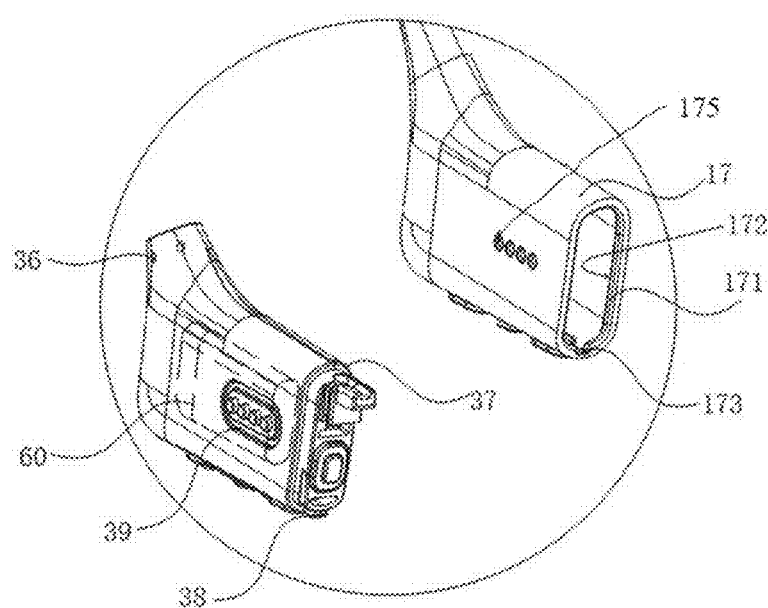
FIG. 49 is a schematic diagram illustrating a partially enlarged view of part E in FIG. 3 according to some embodiments of the present disclosure.

FIG. 49 is a schematic diagram illustrating a partially enlarged view of part E in FIG. 3 according to some embodiments of the present disclosure. In connection with FIGS. 3 and 47, in some embodiments, an annular flange 171 protruding inward may be set on the open end of the housing casing 17. The end of the circuit housing 30 away from the ear hook 10 may be set as a stair shape, thereby forming an annular platform 37. When the housing casing 17 covers the periphery of the circuit housing 30, the annular flange 171 may be in contact with the annular platform 37. The annular flange 171 may be formed by the inner wall surface of the open end of the housing casing 17 protruding to a certain thickness toward the inside of the housing casing 17. The annular flange 171 may include a flange surface 172 facing the ear hook 10. The annular platform 37 may be opposite to the flange surface 172 and face a direction of the circuit housing 30 departing from the ear hook 10. The height of the flange surface 172 of the annular flange 171 may not be greater than the height of the annular platform 37, such that when the flange surface 172 of the annular flange 171 is in contact with the annular platform 37, the inner wall surface of the housing casing 17 may be in fully contact with the sidewall surface of the circuit housing 30, such that the housing casing 17 may tightly cover the periphery of the circuit housing 30. In some embodiments, a sealant may be applied in a joint region of the annular flange 171 and the annular platform 37. Specifically, when the housing casing 17 is coated, a sealant may be pasted on the annular platform 37 to firmly connect the housing casing 17 with the circuit housing 30.

In some embodiments, a positioning block 38 may be set on the circuit housing 30. The positioning block 38 may be configured on the annular platform 37. The positioning block 38 may extend along a direction of the circuit housing 30 away from the ear hook 10. Specifically, the positioning block 38 may be configured on an auxiliary sidewall 34 of the circuit housing 30. A thickness of the positioning block 38 protruding on the auxiliary sidewall 34 may be consistent with the height of the annular platform 37. One or more positioning blocks 38 may be set according to requirements. Accordingly, a positioning groove 173 corresponding to the positioning block 38 may be configured at the annular flange 171 of the housing casing 17, such that when the housing casing 17 covers the periphery of the circuit housing 30, the positioning groove 173 may cover at least a portion of the positioning block 38.

Figure 50:
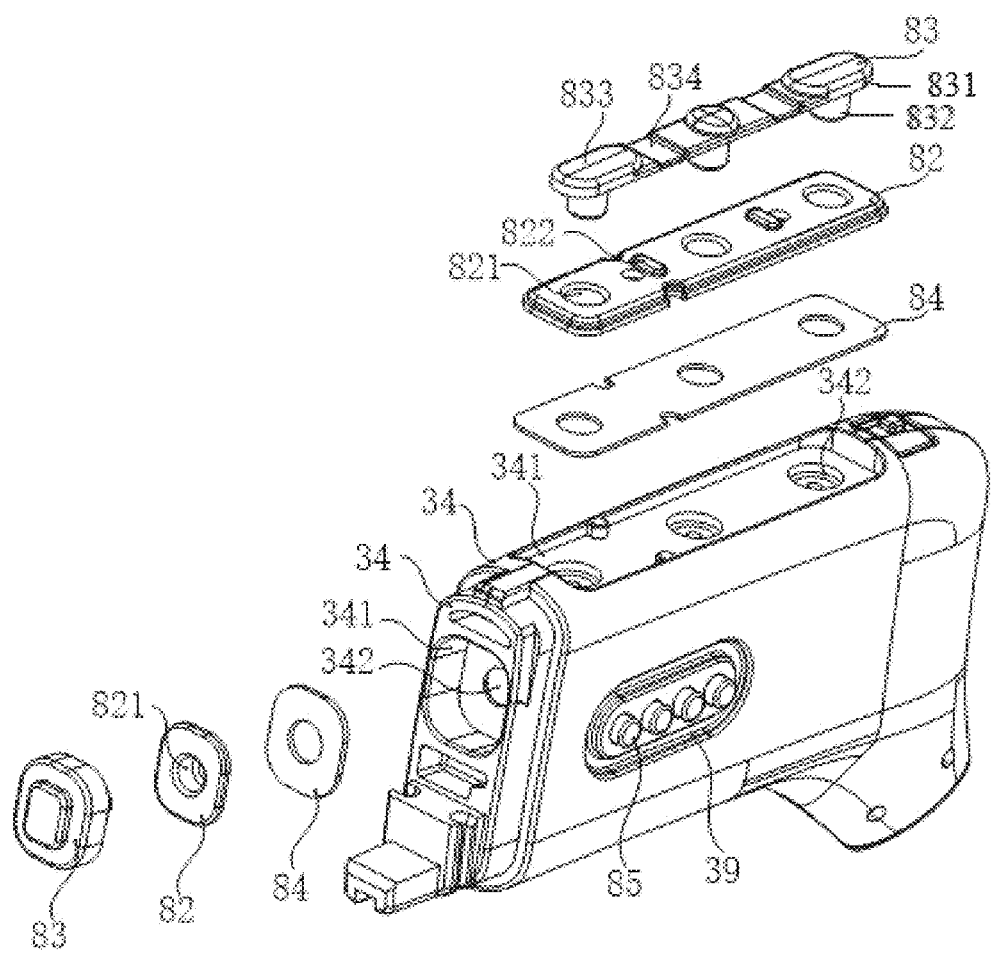
FIG. 50 is a schematic diagram illustrating an exemplary exploded view of a circuit housing and a button structure according to some embodiments of the present disclosure.
Figure 51:
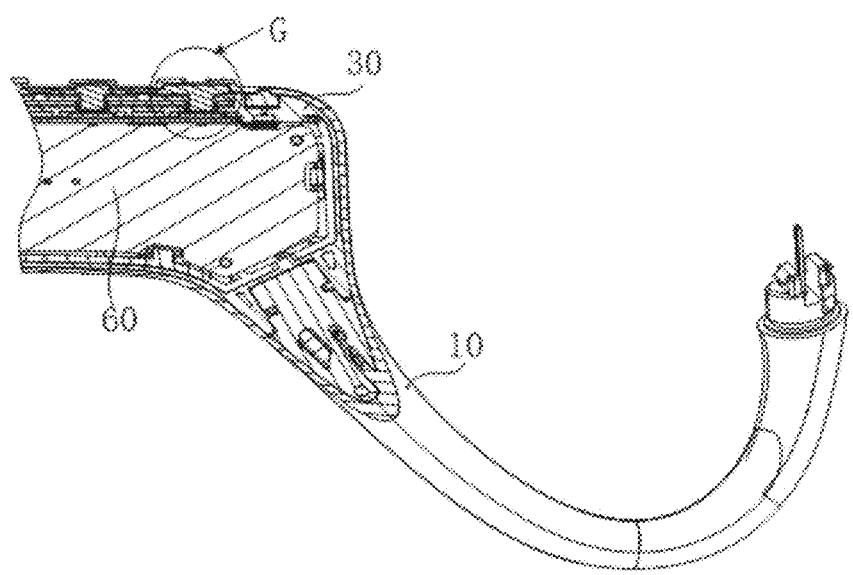
FIG. 51 is a schematic diagram illustrating an exemplary partial cross-sectional view of a circuit housing, a button structure, and an ear hook according to some embodiments of the present disclosure.
Figure 52:
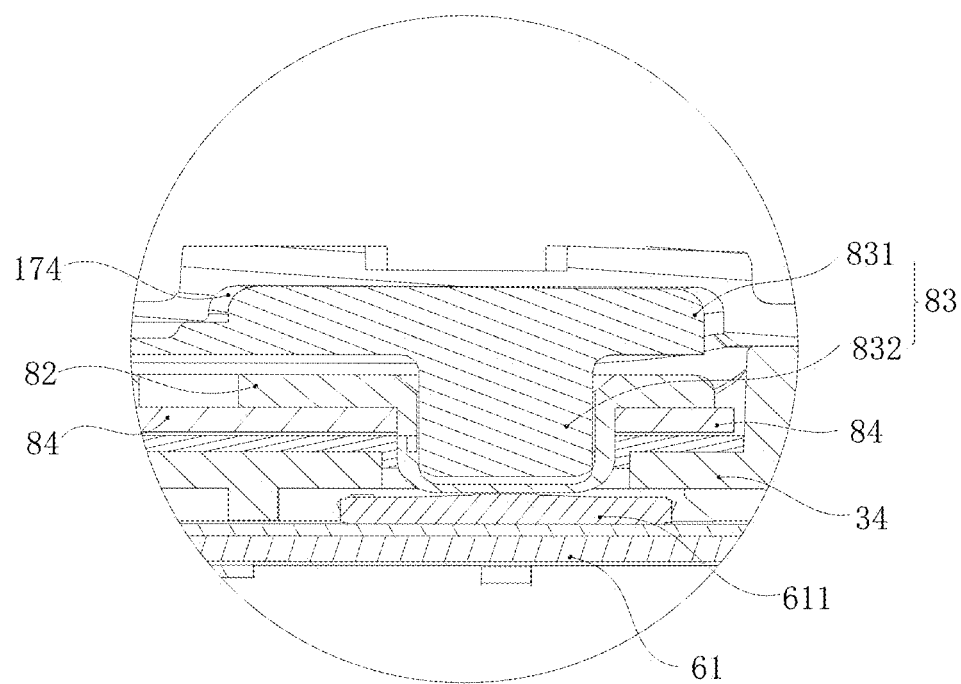
FIG. 52 is schematic diagram illustrating an exemplary partial enlarged view of part G shown in FIG. 51 according to some embodiments of the present disclosure.

FIG. 50 is a schematic diagram illustrating an exemplary exploded view of a circuit housing and a button structure according to some embodiments of the present disclosure. FIG. 51 is a schematic diagram illustrating an exemplary partial cross-sectional view of a circuit housing, a button structure, and an ear hook according to some embodiments of the present disclosure. FIG. 52 is a schematic diagram illustrating an exemplary partial enlarged view of part G shown in FIG. 51 according to some embodiments of the present disclosure. In connection with FIGS. 3, 50, 51, and 52, in some embodiments, a button structure may be set on the open earphone 200. In some embodiments, the circuit housing 30 may be set as a flat shape. Two sidewalls oppositely configured with relatively large areas of the circuit housing 30 may be the main sidewalls 33. Two sidewalls oppositely configured with relatively small areas connected to the two main sidewalls 33 may be auxiliary sidewalls 34. A first recessed area 341 may be set on the outer surface of each auxiliary sidewall 34 of the circuit housing 30. A button hole 342 may be further set in the first recessed area 341. The button hole 342 may connect the outer surface and the inner surface of the auxiliary sidewall 34. The auxiliary sidewalls 34 of the circuit housing 30 may include an auxiliary sidewall 34 facing the back side of a user's head when the user wears the open earphone 200, and may also include an auxiliary sidewall 34 facing the lower side of the user's head when the user wears the open earphone 200. The number (or count) of the first recessed areas 341 may be one or more. One or more button holes 342 may be set in each first recessed area 341 according to actual requirements, which is not specifically limited herein.

In some embodiments, the open earphone 200 may also include an elastic pad 82 and a button 83, and the control circuit 60 may include a button circuit board 61. The elastic pad 82 may be set on the first recessed area 341. Specifically, the elastic pad 82 may be fixed on the outer surface of an auxiliary sidewall 34 corresponding to the first recessed area 341 to cover the outside of the button hole 342. Thereby, the elastic pad 82 may play a role of sealing and waterproofing, such that external liquid may be prevented from entering the inside of the circuit housing 30 through the button hole 342. In some embodiments, a second recessed area 821 corresponding to the button hole 342 may be set on the elastic pad 82. The second recessed area 821 may extend to the inside of the button hole 342. In some embodiments, the elastic pad 82 may be made of a soft material, such as a soft silicone or rubber. In addition, the elastic pad 82 may be thin. It may be difficult for the thin elastic pad 82 to be adhered firmly when the thin elastic pad 82 is directly bonded to the outer surface of the auxiliary sidewall 34. As the elastic pad 82 is set between the button 83 and the button hole 342, when the user presses the button, the elastic pad 82 may generate a force opposite to the pressing direction due to the deformation, preventing the button from moving relative to the button hole 342.

In some embodiments, a rigid pad 84 may be disposed between the elastic pad 82 and the circuit housing 30. The rigid pad 84 and the elastic pad 82 may be closely fixed to each other, specifically, by means of gluing, bonding, injection molding, etc. The rigid pad 84 and the auxiliary sidewall 34 may further be bonded. Specifically, double-sided adhesive may be used to form an adhesive layer between the rigid pad 84 and the auxiliary sidewall 34, such that the elastic pad 82 may be firmly fixed on the outer surface of the auxiliary sidewall 34. In addition, as the elastic pad 82 is soft and thin, it is difficult to maintain a flat state when the user presses the button. By abutting the rigid pad 84, the elastic pad 82 may be kept flat.

In some embodiments, a through hole 841 may be set on the rigid pad 84, such that the second recessed area 821 of the elastic pad 82 may further extend to the inside of the button hole 342 through the through hole 841. In some embodiments, the rigid pad 84 may be made of stainless steel, or other rigid materials (e.g., plastic). The rigid pad 84 may abut the elastic pad 82 by integral molding.

In some embodiments, the button 83 may include a button body 831 and a button contact point 832 protruding on a side of the button body 831. The button body 831 may be disposed on a side of the elastic pad 82 away from the circuit housing 30, and the button contact point 832 may extend to the inside of the second recessed area 821 and further extend to the button hole 342. As the open earphone 200 in this embodiment is relatively thin and light and the pressing travel of the button 83 is short, using a soft button may reduce the user's pressing feeling and bring an unsatisfactory experience, while using the button 83 made of a hard plastic material may bring a well pressing feeling for the user.

The button circuit board 61 may be disposed inside the circuit housing 30, and a button switch 611 corresponding to the button hole 342 may be set on the button circuit board 61. Therefore, when the user presses the button 83, the button contact point 832 may contact and trigger the button switch 611 to further implement corresponding function.

In this embodiment, by setting the second recessed area 821 on the elastic pad 82, on one hand, the second recessed area 821 may cover the entire button hole 342, thereby improving the waterproof performance. On the other hand, in the natural state, the button contact point 832 may extend to the inside of the button hole 342 through the second recessed area 821, thereby shortening the button pressing travel and reducing the space occupied by the button structure. Therefore, the open earphone 200 may both have a good waterproof performance and occupy less space.

In some embodiments, the button 83 may include one or more button single bodies 833. In an application scenario, the button 83 may include at least two button single bodies 833 disposed away from each other and at least one connecting portion 834 connected to the button single bodies 833. The button single bodies 833 and the connecting portion(s) 834 may be integrally formed. Correspondingly, a button contact point 832 may be set on each button single body 833. Each button single body 833 may further correspond to a buttonhole 342 and a button switch 611. A plurality of button single bodies 833 may be set on each of the first recessed areas 341. The user may trigger different button switches 611 by pressing different button single bodies 833 to further realize various functions.

In some embodiments, elastic bumps 822 may be set on the elastic pad 82 for supporting the connecting portion 834. As the button 83 includes a plurality of connected button single bodies 833, the setting of the elastic bumps 822 may enable a specific button single body 833 being individually pressed when the user presses the specific button single body 833, avoiding other button single bodies 833 being pressed together due to linkage. Thereby, the ability to accurately trigger the corresponding button switch 611 may be provided. It should be noted that the elastic bump 822 may not be necessary. For example, the elastic bump 822 may be a protruding structure without elasticity, or the protruding structure may not be set according to actual requirements. In some embodiments, a groove 174 corresponding to the button 83 may be set on the inner wall of the housing casing 17, such that the outer periphery of the circuit housing 30 and the button may be coated.

Figure 53:
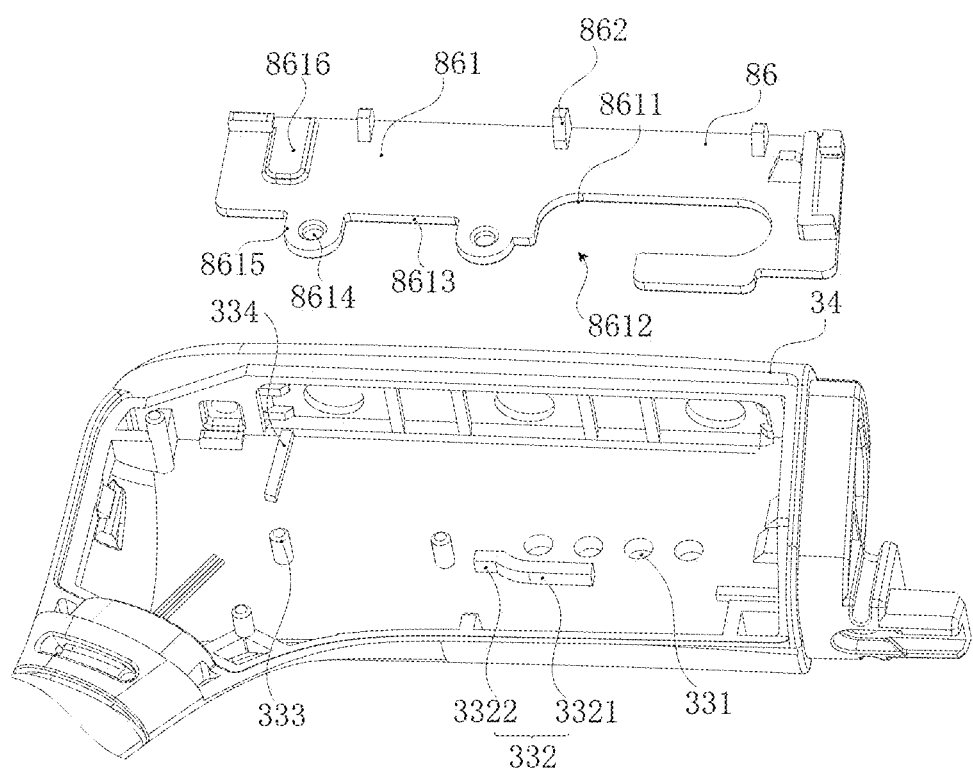
FIG. 53 is a schematic diagram illustrating an exemplary exploded view of a partial structure of a circuit housing and auxiliary piece according to some embodiments of the present disclosure.
Figure 54:
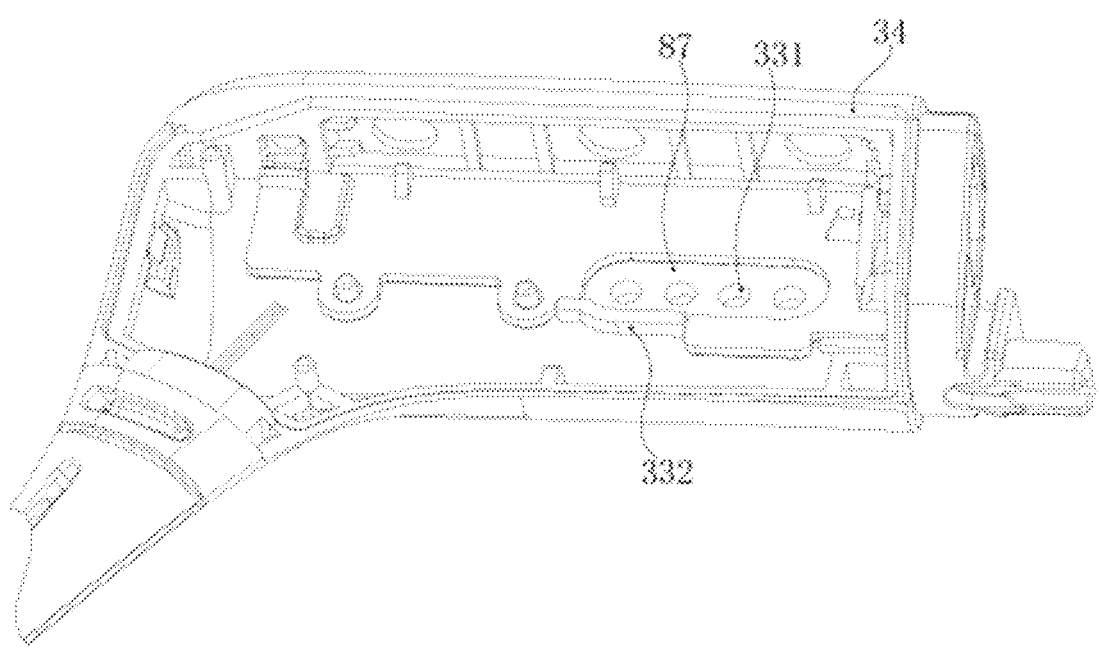
FIG. 54 is schematic diagram illustrating an exemplary partial structure of a circuit housing and an auxiliary piece according to some embodiments of the present disclosure.

FIG. 53 is a schematic diagram illustrating an exemplary exploded view of a partial structure of a circuit housing and auxiliary piece according to some embodiments of the present disclosure. FIG. 54 is schematic diagram illustrating an exemplary partial structure of a circuit housing and an auxiliary piece according to some embodiments of the present disclosure. In connection with FIGS. 3, 53 and 54, in some embodiments, the open earphone 200 may also include the auxiliary piece 86 located inside the circuit housing 30. The auxiliary piece 86 may include a board 861. A hollowed area 8611 may be set on the board 861. The board 861 may be disposed on the inner surface of the main sidewall 33 by means of hot melting, hot pressing, or bonding, such that a mounting hole 331 set on the main sidewall 33 may be located inside the hollowed area 8611. Specifically, the board surface of the board 861 may abut the inner surface of the main sidewall 33 in parallel. The auxiliary piece 86 may have a certain thickness. When disposed on the inner surface of the main sidewall 33, the auxiliary piece 86 with the inner sidewall of the hollowed area 8611 of the auxiliary piece 86 and the main sidewall 33 may together form a glue groove 87 located at the periphery of the conductive column 85 inserted into the mounting hole 331.

In some embodiments, a sealant may be applied in the glue groove 87 to seal the mounting hole 331 from the inside of the circuit housing 30 to improve a sealing performance of the circuit housing 30, thereby improving the waterproof performance of the open earphone 200.

In some embodiments, the material of the auxiliary piece 86 may be the same as that of the circuit housing 30. The auxiliary piece 86 may be molded separately from the circuit housing 30. It should be noted that, during the molding stage of the circuit housing 30, there may often be other structures near the mounting hole 331, such as molding the button hole 342. Molds corresponding to these structures during molding may need to be removed from the inside of the circuit housing 30. At this time, if the glue groove 87 corresponding to the mounting hole 331 is integrally formed directly inside the circuit housing 30, the protrusion of the glue groove 87 may interfere with the removal of the molds of these structures, thereby causing inconvenience in production. In this embodiment, the auxiliary piece 86 and the circuit housing 30 may be separate structures. After the two structures being separately molded, the auxiliary piece 86 may be installed inside the circuit housing 30 and form the glue groove 87 together with the main sidewall 33 of the circuit housing 30, such that during the molding stage of the circuit housing 30, the molds of part of the structures may not be blocked when removing from the inside of the circuit housing 30, which causes a smooth progress in production.

In some embodiments, when the circuit housing 30 is molded, the removal of the molds may only occupy a part of the space of the glue groove 87. A part of the glue groove 87 may be integrally formed on the inner surface of the main sidewall 33 without affecting the removal of the mold, and the other part of the glue groove 87 may still be formed by the auxiliary piece 86.

In some embodiments, a first strip rib 332 may be integrally formed on the inner surface of the main sidewall 33, and the location of the first strip rib 332 may not affect the removal of the mold of the circuit housing 30. A notch 8612 may be set in the hollowed area 8611 of the auxiliary piece 86. The first stripe rib 332 may correspond to the notch 8612. After the circuit housing 30 and the auxiliary piece 86 being respectively formed, the auxiliary piece 86 may be placed on the inner surface of the main sidewall 33, such that the first strip rib 332 at least partially fits the notch 8612, and then the first strip rib 332 and the auxiliary piece 86 may cooperate to make the glue groove 87 closed.

In this embodiment, as the first strip rib 332 may not block the removal of the molds, the sidewall of the glue groove 87 may be composed of the first strip rib 332 and auxiliary piece 86 which are integrally formed on the inner surface of the main sidewall 33.

In some embodiments, the first stripe rib 332 may further extend to abut the side edge 8613 of the board 861, thereby positioning the board 861. The first strip rib 332 may include a rib main body 3321 and a positioning arm 3322. The rib main body 3321 may be configured to match and fit the notch 8612 of the hollowed area 8611, thereby forming a sidewall of the glue groove 87. The positioning arm 3322 may be formed by extending from one end of the rib main body 3321 to a side edge 8613 of the board 861 to abut the side edge 8613, thereby positioning the board 861 at the side edge 8613.

In some embodiments, the height of the first strip rib 332 protruding on the inner surface of the main sidewall 33 may be greater than, less than, or equal to the thickness of the auxiliary piece 86, as long as the first strip rib 332 can form the glue groove 87 together with the auxiliary piece 86 and position the board 861 of the auxiliary piece 86, which is not specifically limited herein.

In some embodiments, a positioning hole 8614 may be set on the board 861. The positioning hole 8641 may pass through a motherboard surface of the board 861. A positioning column 333 corresponding to the positioning hole 8614 may be integrally formed on the inner surface of the main sidewall 33. After the auxiliary piece 86 being set on the inner surface of the main sidewall 33, the positioning column 333 may be inserted into the positioning hole 8614, thereby further positioning the auxiliary piece 86. The numbers (counts) of the positioning holes 8614 and the positioning columns 333 may be the same. In some embodiments, the numbers of the positioning holes 8614 and the positioning columns 333 may both be two.

In an application scenario, at least two lugs 8615 may be formed on the side edge 8613 of the board 861, and two positioning holes 8614 may be respectively disposed on the corresponding lugs 8615. A second strip rib 334 may be integrally formed on the inner surface of the main sidewall 33. The second strip rib 334 may be extended in a direction toward the auxiliary sidewall 34, and be perpendicular to an extending direction of the positioning arm 3322 of the first strip rib 332. A positioning groove 8616 with a strip shape corresponding to the second strip rib 334 may be set on the board 861. The positioning groove 8616 may be recessed in a direction away from the main sidewall 33. One end of the positioning groove 8616 may be connected to the side edge 8613 of the board 861 and be perpendicular to the side edge 8613.

In an application scenario, the positioning groove 8616 may be formed only by a recessed surface of the board 861 that is conformed to the main sidewall 33. The depth of the positioning groove 8616 may be less than the thickness of the board 861. At this time, the surface of the board 861 opposite to the recessed surface may not be affected by the positioning groove 8616. In another application scenario, the depth of the positioning groove 8616 may be greater than the depth of the board 861, such that when a surface of the board 861 near the main sidewall 33 is recessed, the other opposite surface protrudes toward the recessed direction, thereby cooperating to form the positioning groove 8616. After the auxiliary piece 86 being set on the inner surface of the main sidewall 33, the second strip rib 334 may be embedded in the strip positioning groove 8616 with strip shape to further position the board 861.

In connection with FIG. 3, FIG. 49 and FIG. 50, in some embodiments, an exposed hole 175 corresponding to the conductive column 85 may be set on the housing casing 17. After the housing casing 17 being covered around the periphery of the circuit housing 30, an end of the conductive column 85 located outside the circuit housing 30 may further be exposed through the exposed hole 175 to be further connected to external circuits of the open earphone 200, such that the open earphone 200 may be charged or transmit data through the conductive column 85.

In some embodiments, the outer surface of the circuit housing 30 may be recessed with a glue groove 39 surrounding a plurality of mounting holes 331. Specifically, the shape of the glue groove 39 may be an oval ring, and the plurality of mounting holes 331 may be respectively set on the circuit housing 30 surrounded by the groove 39. A sealant may be applied on the glue groove 39. After the housing casing 17 and the circuit housing 30 being assembled, the housing casing 17 may be in sealed connection with the circuit housing 30 through the sealant at the peripheries of the mounting holes 331, such that when external liquid enters the inside of the housing casing 17 through the exposed hole 175, the housing casing 17 may slide around the periphery of the circuit housing 30. In addition, the mounting hole 331 may be further sealed from the outside of the circuit housing 30 to further improve the sealing performance of the circuit housing 30, thereby improving the waterproof performance of the open earphone 200.

It should be noted that the above description of the open earphone 200 is merely for illustration purposes, and not intended to limit the scope of the present disclosure. For those skilled in the art, various changes and modifications may be made according to the description of the present disclosure. However, the changes and modifications may not depart from the spirit of the present disclosure. For example, the number (or count) of the first recessed areas 341 may be one or more, and one or more button holes 342 may be set on each of the first recessed areas 341, which is not limited herein. All such modifications are within the scope of the present disclosure.

Figure 55:
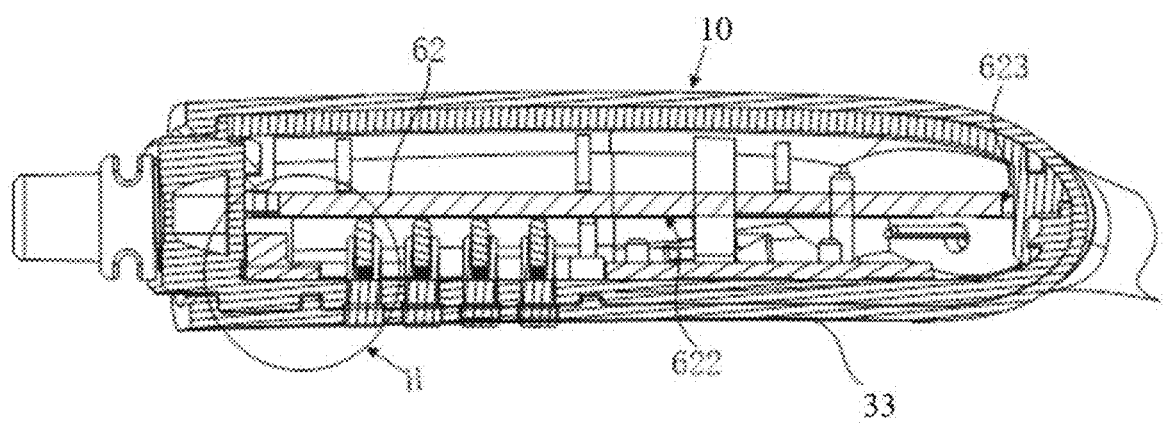
FIG. 55 is a schematic diagram illustrating an exemplary cross-sectional view of a circuit housing, a conductive column, and a main control circuit board according to some embodiments of the present disclosure.
Figure 56:
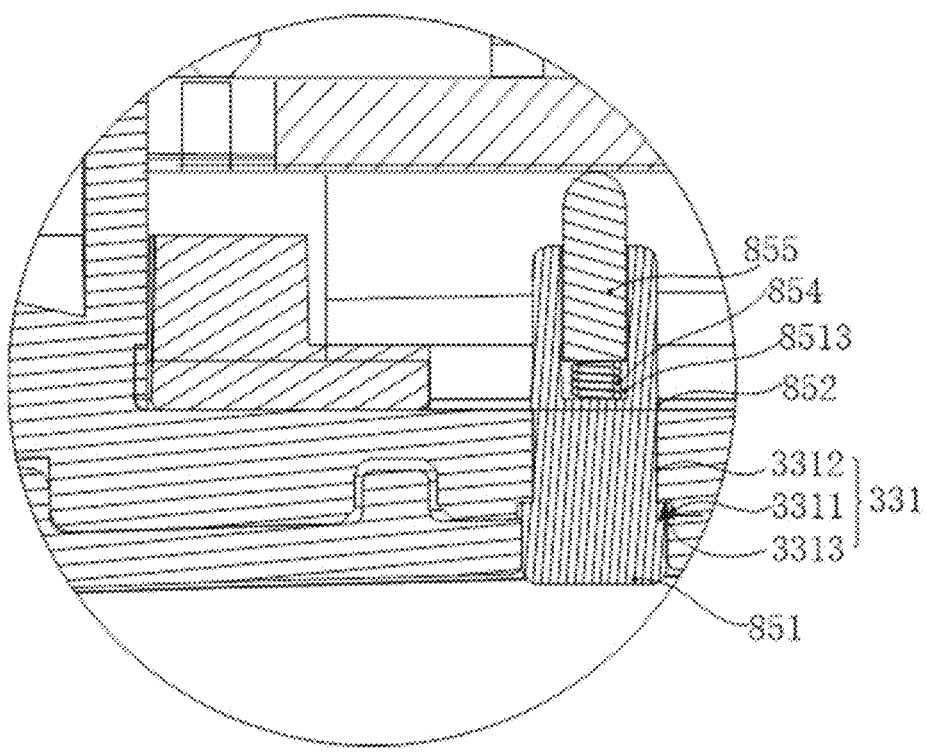
FIG. 56 is a schematic diagram illustrating an exemplary partial enlarged view of part H in FIG. 11 according to some embodiments of the present disclosure.
Figure 57:
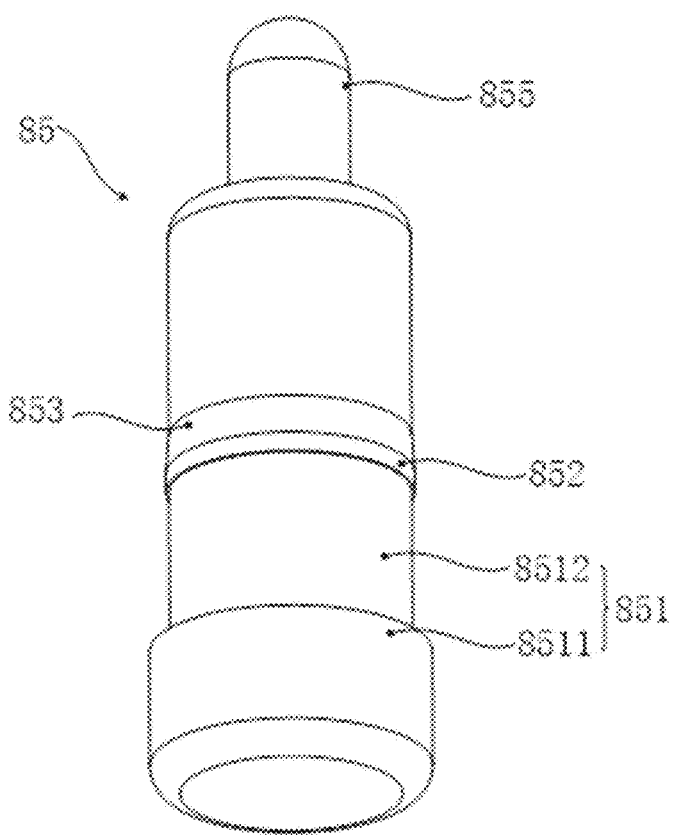
FIG. 57 is a schematic diagram illustrating an exemplary conductive column according to some embodiments of the present disclosure.

FIG. 55 is a schematic diagram illustrating an exemplary cross-sectional view of a circuit housing, a conductive column, and a main control circuit board according to some embodiments of the present disclosure. FIG. 56 is a schematic diagram illustrating an exemplary partial enlarged view of part H in FIG. 11 according to some embodiments of the present disclosure. FIG. 57 is a schematic diagram illustrating an exemplary conductive column according to some embodiments of the present disclosure.

As shown in FIG. 55, in some embodiments, the open earphone 200 may include at least one conductive column, and the control circuit contained in the circuit housing 30 may include the main control circuit board 62. The conductive column may connect the main control circuit board 62 inside the circuit housing 30 and a charging circuit and/or data transmission line outside the circuit housing 30 to charge the open earphone 200 and/or transmit data for the open earphone 200.

In connection with FIGS. 55-57, in some embodiments, at least one mounting hole 331 may be set on the main sidewall 33 of the circuit housing 30. The conductive column 85 may be inserted into the corresponding mounting hole 331. The conductive column 85 and the mounting hole 331 may correspond in a one-to-one manner. In this embodiment, the numbers (counts) of the conductive columns 85 and the mounting holes 331 may both be four. The four conductive columns 85 may be respectively inserted into the corresponding mounting holes 331, and be arranged side by side in a straight line at regular intervals. Two conductive columns 85 located at the outside may be used as charging interfaces, and two conductive columns 85 located at the middle may be used as data transmission interfaces.

In some embodiments, for each of the conductive columns 85, the conductive column 85 may include a columnar body 851 inserted into the mounting hole 331. In some embodiments, a positioning protrusion 852 may be set on the outer peripheral surface of the columnar body 851. The positioning protrusion 852 may be engaged with the inner surface of the main sidewall 33, thereby fixing the conductive column 85 to the mounting hole 331. Specifically, the positioning protrusion 852 may be set in an annular shape around the circumferential direction of the columnar body 851. An extended inclined surface 853 connecting the outer peripheral surface of the columnar body 851 and the positioning protrusion 852 may be set on a side of the annular positioning protrusion 852 facing the inside of the circuit housing 30. When installing the conductive column 85, the conductive column 85 may be gradually inserted into the inside of the circuit housing 30 along the extended inclined surface 853 and the mounting hole 331 from the outside of the circuit housing 30. Further, the positioning protrusion 852 may completely pass the mounting hole 331. The positioning protrusion 852 may face a platform outside the circuit housing 30, and be engaged with the inner surface of the main sidewall 33, such that the conductive column 85 may be fixed in the mounting hole 331 through the positioning protrusion 852.

In this embodiment, by the setting of the positioning protrusion 852 during the assembly process, the conductive column 85 may be inserted into the mounting hole 331 from the outer surface of the main sidewall 33 of the circuit housing 30. Further, the positioning protrusion 852 may be pressed into the mounting hole 331 so as to be fixed to the inner surface of the main sidewall 33 of the circuit housing 30 without installing from the inside of the circuit housing 30. As a result, the assembly of the open earphone 200 may be more convenient and efficiency of production may be improved. Further, by the setting of the extended inclined surface 853, the positioning protrusion 852 may pass through the mounting hole 331 more smoothly during the assembly process. The positioning protrusion 852 may enable the conductive column 85 to be engaged with the inner surface of the main sidewall 33 when the conductive column 85 enters the mounting hole 331, such that the conductive column 85 may be firmly fixed in the mounting hole 331.

In some embodiments, the columnar body 851 may be divided into a first columnar body 8511 and a second columnar body 8512, with respect to an insertion direction of the columnar body 851 along the mounting hole 331. The two columnar bodies may be integrally formed by a conductive metal material such as copper, silver, or an alloy into an integrated structure. In a direction perpendicular to the insertion direction of the conductive column 85 into the mounting hole 331, a cross section of the first columnar body 8511 may be larger than a cross section of the second columnar body 8512. The positioning protrusion 852 may be set on the second columnar body 8512.

In some embodiments, the mounting hole 331 may be divided into a first hole section 3311 and a second hole section 3312 corresponding to the first columnar body 851 and the second columnar body 852 in cross section along the insertion direction, and an annular platform 3313 may be formed at the junction of the first hole section 3311 and the second hole section 3312. The annular platform 3313 may connect the outer surface of the main sidewall 33. When the columnar body 851 is inserted into the mounting hole 331, a side of the first columnar body 8511 facing the second columnar body 8512 may be supported on the annular platform 3313. At the same time, a side of the positioning protrusion 852 on the outer peripheral surface of the second columnar body 8512 facing the first columnar body 8511 may be engaged with the inner surface of the main sidewall 33. Therefore, the conductive column 85 may simultaneously be engaged with both the inner and outer sides of the main sidewall 33 around the mounting hole 331, such that the conductive column 85 may be fixed in the mounting hole 331.

In some embodiments, an accommodating cavity 8513 along the axial direction may be set on the columnar body 851. An open end of the accommodating cavity 8513 may be on an end surface of the second columnar body 8512 facing the inside of the circuit housing 30. In some embodiments, the accommodating cavity 8513 may pass through a portion of the second columnar body 8512 located at the inner side of the circuit housing 30 along a direction parallel to the insertion direction, and stop before reaching the positioning protrusion 852. In some embodiments, the specific position of the accommodating cavity 8513 may be set according to requirements, which is not limited herein.

In some embodiments, the conductive column 85 may also include a spring 854 inside the accommodating cavity 8513 and a conductive contact point 855. One end of the conductive contact point 855 may abut the spring 854 inside the accommodating cavity 8513, and the other end of the conductive contact point 855 may be exposed to the inside of the circuit housing 30 through the open end of the accommodating cavity 8513. In some embodiments, the material of the conductive contact point 855 may be the same as that of the columnar body 851. The spring 854 may be connected to the second columnar body 851 and the conductive contact point 855 by a certain manner such as bonding or welding. Alternatively, the spring 854 may be directly placed in the accommodating cavity 8513 and elastically clamped in the accommodating cavity 8513 through the engagement of the columnar body 851 and the main sidewall 33 of the circuit housing 30 and the engagement of the conductive contact point 855 and the main control circuit board 62.

In some embodiments, contacts corresponding to the position of the conductive column 85 may be set on the main control circuit board 62 inside the circuit housing 30. In some embodiments, the main control circuit board 62 may include a main surface 622 with a relatively large area and a side surface 623 with a relatively small area connected to the main surface 622. The main surface 622 of the main control circuit board 62 may be parallel or approximately parallel to the main sidewall 33 of the circuit housing 30, and the contacts may be correspondingly disposed on the main surface 622 of the main control circuit board 62.

The insertion direction of the conductive column 85 into the mounting hole 331 may be parallel to the axial direction of the conductive column 85 and be perpendicular to the main sidewall 33 and the main surface 622 of the main control circuit board 62. After the conductive column 85 being installed in the mounting hole 331, the spring 854 may be elastically deformed when clamped by the conductive contact point 855 and the columnar body 851. Then, the conductive contact point 855 may be elastically pressed on the corresponding contact, thereby achieving the electrical connection between the conductive column 85 and the main control circuit board 62.

It should be noted that the above description of the open earphone 200 is merely for illustrative purposes, and not intended to limit the scope of the present disclosure. For those skilled in the art, various changes and modifications may be made according to the description of the present disclosure. However, the changes and modifications may not depart from the spirit of the present disclosure. For example, the conductive column 85 and the mounting hole 311 may not be limited to a horizontal arrangement as shown in the drawings, and may also include a vertical arrangement, matrix arrangement, circular arrangement and other regular or irregular arrangements. All such modifications are within the scope of the present disclosure.

Figure 58:
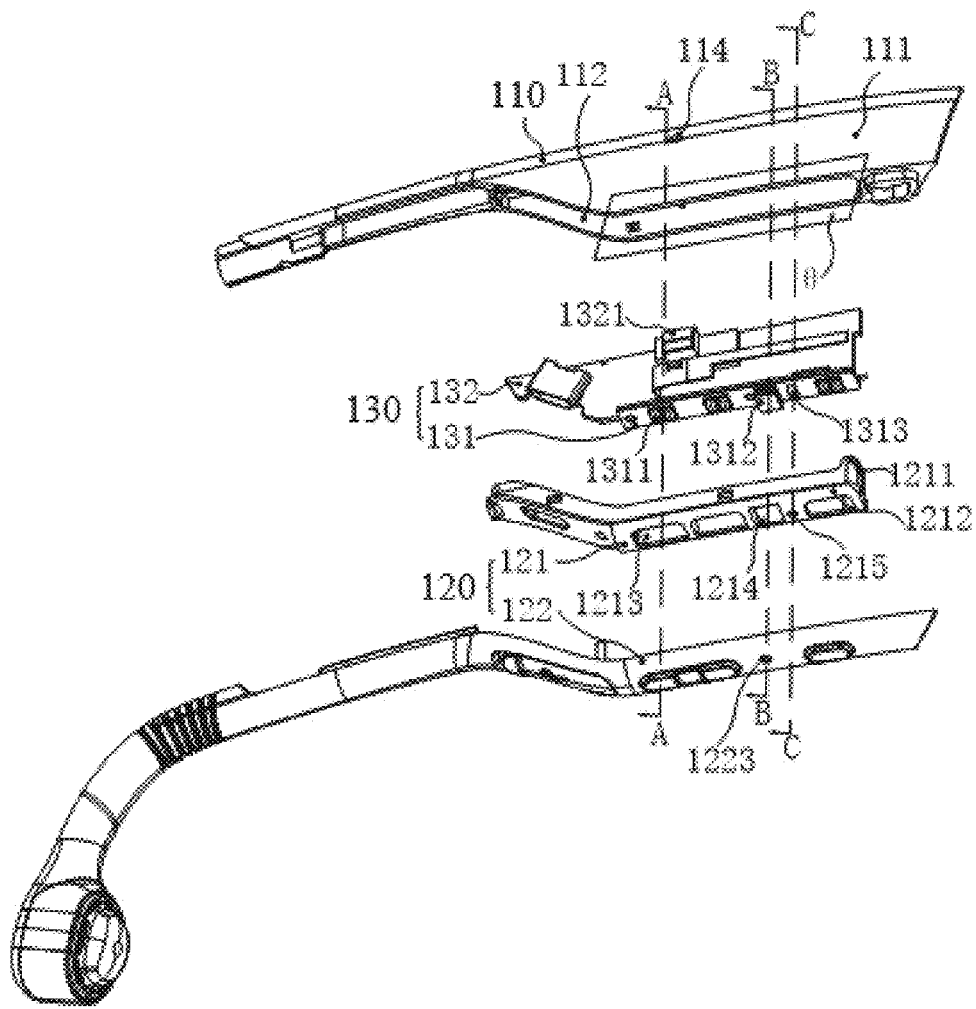
FIG. 58 is a schematic diagram illustrating an exemplary exploded structure of an electronic component according to some embodiments of the present disclosure.
Figure 59:
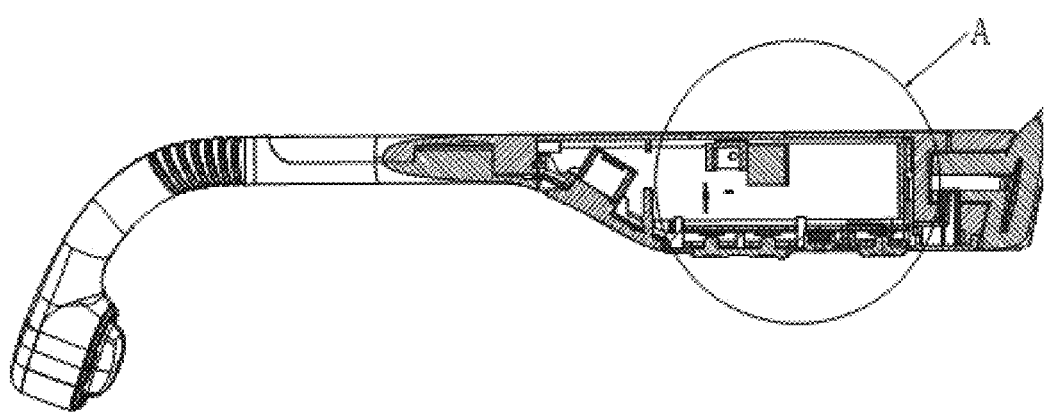
FIG. 59 is a schematic diagram illustrating an exemplary partial cross-sectional view of an electronic component according to some embodiments of the present disclosure.
Figure 60:
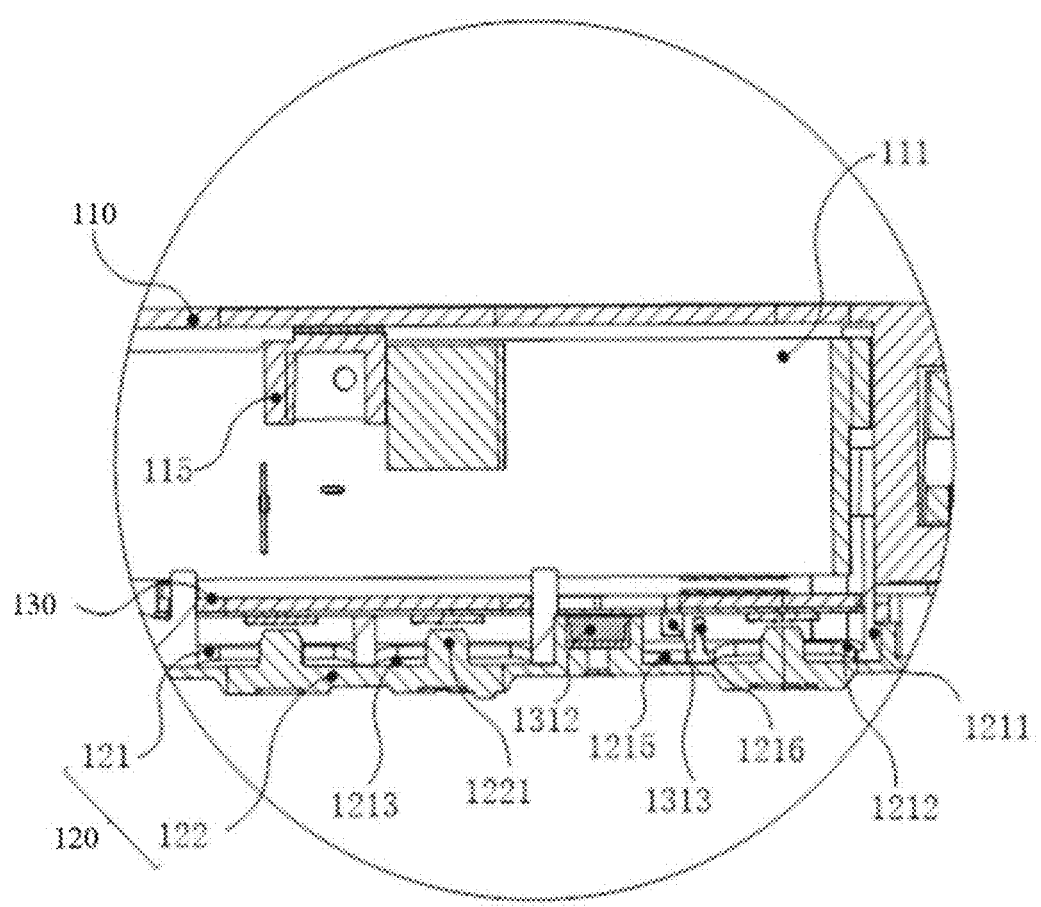
FIG. 60 is a schematic diagram illustrating an exemplary enlarged view of part A in FIG. 59 according to some embodiments of the present disclosure.

FIG. 58 is a schematic diagram illustrating an exemplary exploded structure of an electronic component according to some embodiments of the present disclosure. FIG. 59 is a schematic diagram illustrating an exemplary partial cross-sectional view of an electronic component according to some embodiments of the present disclosure. FIG. 60 is a schematic diagram illustrating an exemplary enlarged view of part A in FIG. 59 according to some embodiments of the present disclosure. The electronic component in the present disclosure may be applied to other electronic devices. The electronic devices may be any electronic device that needs to sealed, such as earphones, MP3 players, hearing aids, mobile phones, tablet computers, glasses with circuit components and electronic devices, etc., which is not specifically limited herein. In some embodiments, the electronic component may include a circuit housing and internal circuits as shown in FIG. 3. In some embodiments, the electronic component may also be referred to as a circuit housing.

In connection with FIGS. 58-60, in some embodiments, the electronic component (or the circuit housing) may include an accommodating body 110 and a cover 120. A cavity 111 having an opening 112 at one end thereof may be set on the accommodating body 110. The cover 120 may be covered on the opening 112 of the cavity 111 to seal the cavity 111.

In some embodiments, the accommodating body 110 may be at least apart of an electronic device. The accommodating body 110 in this embodiment may specifically be a structure to accommodate one or more components (e.g., a circuit board, a battery, electronic components, etc.) of an electronic device, e.g., the whole or a part of the circuit housing 30 of the open earphone 200. In some embodiments, the accommodating body 110 may accommodate the circuit board, the battery, and the electronic components through the cavity 111 with the opening 112.

The shape of the cover 120 may be at least partially matched with the opening 112, such that the cover 120 may be placed on the opening 112 to seal the cavity 111. The material of the cover 120 may be different from or partially the same as the accommodating body 110. In some embodiments, the cover 120 may include a rigid support 121 and a soft cover layer 122. The rigid support 121 may be physically connected to the accommodating body 110. The cover layer 122 may be integrally injection-molded on the surface of the rigid support 121 to provide a seal for the cavity 111 after the rigid support 121 is connected to the accommodating body 110.

In some embodiments, the material of the rigid support 121 may include hard plastic, and the material of the cover layer 122 may include soft silicone or rubber. The shape of a side of the rigid support 121 facing the accommodating body 110 may be matched with the opening 112. The rigid support 121 may be fixed to the opening 112 of the cavity 111 by means of plugging, buckling, etc., so as to be physically connected to the accommodating body 110. A gap may be formed at the physical connection between the rigid support 121 and the accommodating body 110, which may reduce the sealing performance of the cavity 111. Further, the soft cover layer 122 may be integrally injection-molded on the outer surface of the rigid support 121 away from the accommodating body 110 and cover the connection between the rigid support 121 and the accommodating body 11, thereby achieving the sealing of the cavity 111.

In some embodiments, the rigid support 121 may include an insertion portion 1211 and a cover portion 1212. The cover portion 1212 may be covered on the opening 112. The insertion portion 1211 may be set on a side of the cover portion 1212 and extend into the cavity 111 along the inner wall of the cavity 111 to fix the cover portion 1212 on the opening 112.

In some embodiments, the insertion portion 1211 may not be inserted through the inner wall of the cavity 111. For example, a plug-in portion matching with the shape of the insertion portion 1211 of the rigid support 121 may be set inside the cavity 111, such that the insertion portion 1211 may be engaged with the plug-in portion and fix the plug portion inside the cavity 111. For example, the shape of the insertion portion 1211 may include a cylinder, and the shape of the plug-in portion may include a cylindrical ring that may surround the cylindrical insertion portion 1211. An inner diameter of the plug-in portion with the cylindrical ring shape may be appropriately less than an outer diameter of the cylindrical insertion portion 1211, such that when the insertion portion 1211 is inserted into the plug-in portion, the interference fit between the insertion portion 1211 and the insertion portion may cause the rigid support 121 to be stably connected to the cavity 111. In some embodiments, other insertion technique may also be used as long as the insertion portion 1211 is inserted into the cavity 111 and fixed to the cavity 111.

The covering portion 1212 may be disposed on a side of the insertion portion 1211 away from the cavity 111. The covering portion may cover the opening 112 after the insertion portion 1211 is inserted into the cavity 111. The covering portion 1212 may include a complete structure, or some holes may be set on the covering portion 1212 as needed to achieve a certain function.

Figure 61:
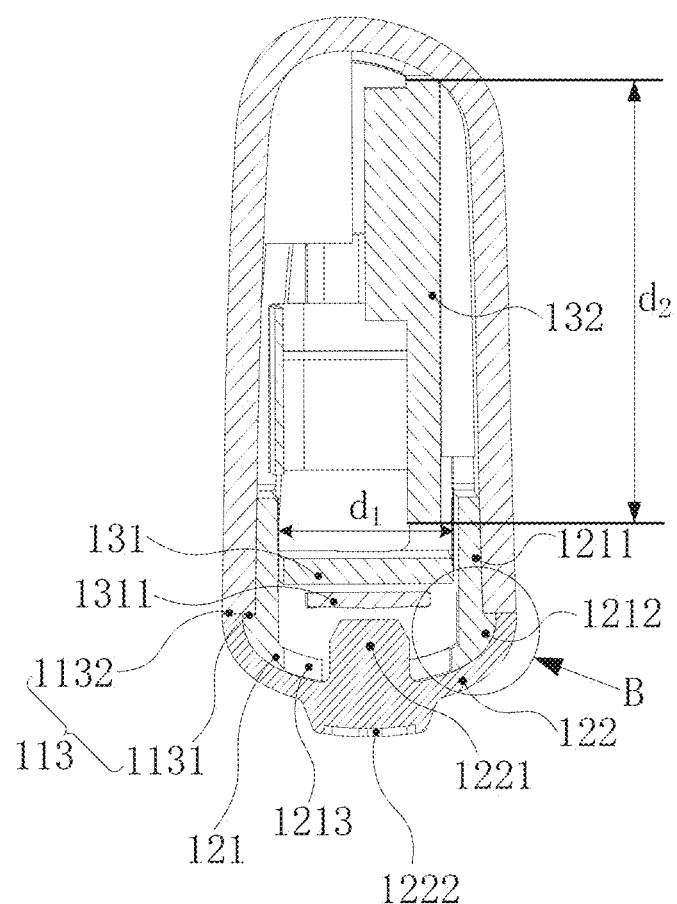
FIG. 61 is a schematic diagram illustrating an exemplary cross-sectional view of the electronic component in an assembled state along A-A axis in FIG. 58 according to some embodiments of the present disclosure.

FIG. 61 is a schematic diagram illustrating an exemplary cross-sectional view of the electronic component in an assembled state along A-A axis in FIG. 58 according to some embodiments of the present disclosure. In connection with FIGS. 58 and 61, in some embodiments, the accommodating body 110 may include an opening edge 113 that matches with the opening 112. The covering portion 1212 may be pressed on an inner region 1131 of the opening edge 113 close to the opening 112. The cover layer 122 may cover an outer surface of the cover portion 1212 away from the accommodating body 110 and be pressed on an outer region 1132 on the periphery of the inner region 1131 of the opening edge 113, which may achieve the sealing with the opening edge 113.

The inner region 1131 and the outer region 1132 of the opening edge 113 may both belong to the opening edge 113, and not other regions outside the opening edge 113. The inner region 1131 of the opening edge 113 may be a region of the opening edge 113 close to the opening 112, and the outer region 1132 of the opening edge 113 may be a region of the opening edge 113 away from the opening 112.

In some embodiments, the covering portion 1212 of the rigid support 121 may be pressed on the inner region 1131 of the opening edge 113 close to the opening 112, such that the covering portion 1212 may initially seal the opening edge 113. However, as materials of the accommodating body 110 and the rigid support 121 may both be hard materials, the connection between the accommodating body 110 and the rigid support 121 and the further covering of the covering portion 1212 may not achieve a good sealing effect. A gap may be easily formed between the opening edge 113 and an end of the cover portion 1212 that is pressed on the opening edge 113 away from the opening 112, and further the cavity 111 may be connected to the gap, thereby reducing the sealing performance.

According to the above description, in some embodiments, the cover layer 122 may cover the outer surface of the covering portion 1212 away from the accommodating body 110. The cover layer 122 may further be pressed on the outer region 1132 on the periphery of the inner region 1131 of the opening edge 113, such that the gap formed between the cover portion 1212 of the rigid support 121 and the opening edge 113 may be further covered. As the material of the cover layer 122 is a soft material, the sealing effect and waterproof performance of the electronic component may be improved.

Figure 62:
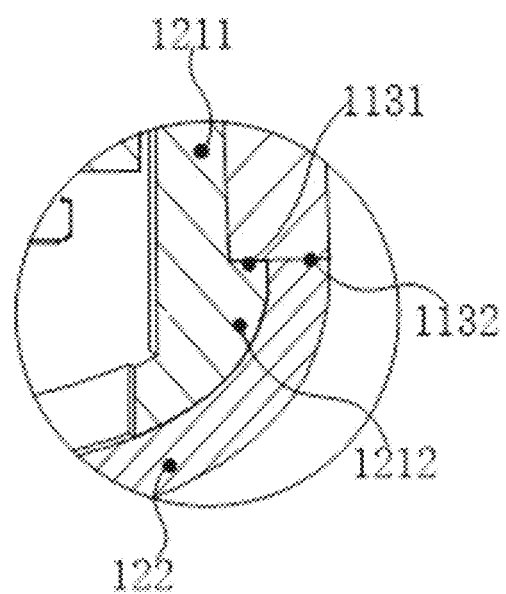
FIG. 62 is a schematic diagram illustrating an exemplary enlarged view of part B in FIG. 61 according to some embodiments of the present disclosure.

FIG. 62 is a schematic diagram illustrating an exemplary enlarged view of part B in FIG. 61 according to some embodiments of the present disclosure. In connection with FIGS. 58, 61, and 62, in some embodiments, when the cover 120 is fastened, the periphery of the covering portion 1212 may cover the inner region 1131 of the opening edge 113 and contact with the inner region 1131 of the opening edge 113. The cover layer 122 may be set on a side of the covering portion 1212 away from the accommodating body 110, such that the covering portion 1212 located at the inner region 1131 of the opening edge 113 may be sandwiched between the inner region 1131 of the opening edge 113 and the cover layer 122. The cover layer 122 may further extend along a direction away from the opening 112 and along a direction toward the opening edge 113 until contacting the outer region 1132 of the opening edge 113. Therefore, a contact end surface of the cover portion 1212 and the opening edge 113 and a contact end surface of the cover layer 122 and the opening edge 113 may be flat as each other, and a structure of "opening edge 113-covering portion 1212-cover layer 122" may be formed on the inner region 1131 of the opening edge 113.

Figure 63:
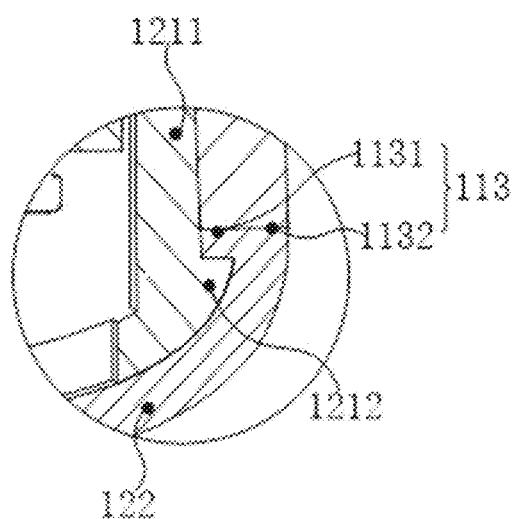
FIG. 63 is a schematic diagram illustrating an exemplary partial cross-sectional view of an electronic component according to some embodiments of the present disclosure.

FIG. 63 is a schematic diagram illustrating an exemplary partial cross-sectional view of an electronic component according to some embodiments of the present disclosure. In connection with FIGS. 58, 60 and 63, in some embodiments, after the cover layer 122 extends to contact the outer region 1132 of the opening edge 113, the cover layer 122 may further extend along a region between the cover portion 1212 and the opening edge 113 to the inner region 1131 of the opening edge 113. It is assumed that between the inner region 1131 of the opening edge 113 and the covering portion 1212, the covering portion 1212 may be pressed on the inner region 1131 of the opening edge 113 to form a structure of "opening edge 113-cover layer 122-covering portion 1212-cover layer 122". In some embodiments, the soft cover layer 122 may further extend between the rigid support 121 and the opening edge 113 on the basis of covering the covering portion 1212 of the rigid support 121, thereby further improving the sealing performance between the cavity 111 and the cover 120 and the waterproof effect of the electronic component.

In some embodiments, the electronic component may also include a circuit component 130 disposed in the cavity 111. A switch 1311 may be set on the circuit component 130. In some embodiments, the circuit component 130 may include a first circuit board 131, and the switch 1311 may be disposed on an outer side of the first circuit board 131 facing the opening 112 of the cavity 111.

Accordingly, a switch hole 1213 corresponding to the switch 1311 may be set on the rigid support 121. The cover layer 122 may further cover the switching hole 1213, and a pressing portion 1221 may be set at a position corresponding to the switching hole 1213. The pressing portion 1221 may extend toward the inside of the cavity 111 through the switching hole 1213. When a corresponding position of the cover layer 122 is pressed, the pressing portion 1221 may press the switch 1311 of the circuit component 130, thereby triggering the circuit component 130 to execute a preset function.

The pressing portion 1221 set on the cover layer 122 may be formed by protruding a side of the cover layer 122 facing the rigid support 121 toward the switch hole 1213 and the switch 1311. The shape of the pressing portion 1221 may be matched with the switch hole 1213, such that when a corresponding position of the cover layer 122 is pressed, the pressing portion 1221 may pass through the switch hole 1213 and reach the corresponding switch 1311 on the first circuit board 131. At the same time, a length of the pressing portion 1221 in a direction toward the switch 1311 may be set to satisfy a condition that the switch 1311 may not be pressed when the corresponding position of the cover layer 122 is not pressed, and the switch 1311 may be pressed when the corresponding position of the cover layer 122 is pressed.

In some embodiments, a pressing portion 1222 may be formed at a position on the cover layer 122 corresponding to the pressing portion 1221 protruding toward a side away from the rigid support 121, such that the user may clarify the position of the switch 1311 and press the corresponding pressing portion 1222 to trigger the circuit component 130 to execute corresponding function.

Figure 64:
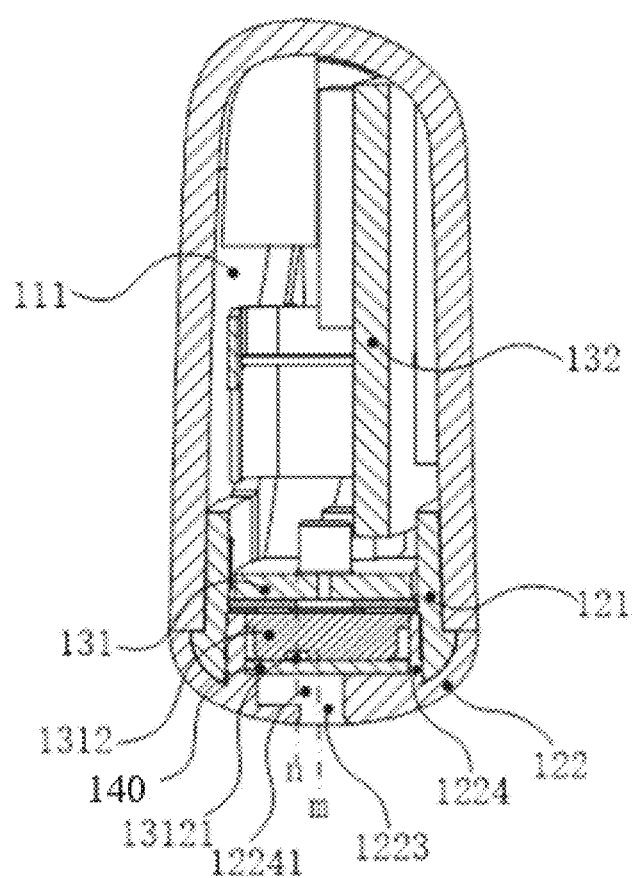
FIG. 64 is a schematic diagram illustrating an exemplary cross-sectional view of the electronic component in an assembled state along B-B axis in FIG. 58 according to some embodiments of the present disclosure.

FIG. 64 is a schematic diagram illustrating an exemplary cross-sectional view of the electronic component in an assembled state along B-B axis in FIG. 58 according to some embodiments of the present disclosure. In connection with FIGS. 58 and 64, the electronic component may include a first microphone element 1312. In some embodiments, the first microphone element 1312 may be disposed on the first circuit board 131 of the circuit component 130 to be accommodated in the cavity 111. For example, the first microphone element 1312 and the switch 1311 may be disposed on the first circuit board 131 at intervals. The first microphone element 1312 may be used to receive sound signals from outside of the electronic component, and convert the sound signals into electrical signals for analysis and processing.

In some embodiments, a microphone hole 1214 corresponding to the first microphone element 1312 may be set on the rigid support 121. A first sound guiding hole 1223 corresponding to the microphone hole 1214 may be set on the cover layer 122. A first sound blocking element 1224 may be set at a position corresponding to the microphone hole 1214. The first sound blocking element 1224 may extend toward the inside of the cavity 111 through the microphone hole 1214 and match with a sound guiding channel 12241. One end of the sound guiding channel 12241 may connect the first sound guiding hole 1223 with the cover layer 122. The first microphone element 1312 may be inserted into the sound guiding channel 12241 from the other end of the sound guiding channel 12241.

In some embodiments, when the electronic component further includes the switch 1311, the switch hole 1213 and the microphone hole 1214 may be disposed on the rigid support 121 at intervals.

In some embodiments, the first sound guiding hole 1223 may be set through the cover layer 122 and correspond to the position of the first microphone element 1312. The first sound guiding hole 1223 may correspond to the microphone hole 1214 on the rigid support 121, and further communicate the first microphone element 1312 with the outside of the electronic component, such that the sound outside the electronic component may be received by the first microphone element 1312 through the first sound guiding hole 1223 and the microphone hole 1214.

The shape of the first sound guiding hole 1223 may be any shape as long as sound from the outside of the electronic component may be input. In some embodiments, the first sound guiding hole 1223 may include a circular hole with a relatively small size, which is set in a region of the cover layer 122 corresponding to the microphone hole 1214. The first sound guiding hole 1223 with the small size may reduce the communication between the first microphone element 1312 or the like in the electronic component and the outside, thereby improving the sealing performance of the electronic component.

In some embodiments, the first sound blocking element 1224 may extend from the cover layer 122 to the periphery of the first sound guiding hole 1223, pass through the microphone hole 1214, and extend to the inside of the cavity until reaching the periphery of the first microphone element 1312. Therefore, the sound guiding channel 12241 from the first sound guiding hole 1223 to the first microphone element 1312 may be formed, such that the sound signal entering the sound guiding holes of the electronic component may directly reach the first microphone element 1312 through the sound guiding channel 12241.

In some embodiments, the shape of the sound guiding channel 12241 in a cross-section perpendicular to a length direction of the sound guiding channel 12241 may be the same as or different from the shape of the microphone hole 1214 or the first microphone element 1312. In some embodiments, the cross-sectional shapes of the microphone hole 1214 and the first microphone element 1312 in a direction perpendicular to the rigid support 121 toward the cavity 111 may be squares. The size of the microphone hole 1214 may be slightly larger than the outer dimension of the sound guiding channel 12241. The internal size of the sound guiding channel 12241 may not be less than the outer dimension of the first microphone element 1312. Therefore, the sound guiding channel 12241 may pass through the first sound guiding hole 1223 to the first microphone element 1312 and cover the periphery of the first microphone element 1312.

In this way, the first sound guiding hole 1223 and the sound guiding channel 12241 that cover the periphery of first microphone element 1312 may be set on the cover layer 122 of the electronic component. The sound guiding channel 12241 may pass through the microphone hole 1214 from the first sound guiding hole 1223 to the first microphone element 1312. The sound guiding channel 12241 may enable the sound signal to reach the first microphone element 1312 through the first sound guiding hole 1223 and to be received by the first microphone element 1312, thereby reducing the leakage of the sound signal in propagation process and improving the efficiency of the electronic component for receiving the sound signal.

In some embodiments, the electronic component may also include a waterproof mesh 140 disposed in the sound guiding channel 12241. The waterproof mesh 140 may abut a side of the cover layer 122 facing the first microphone element 1312, and cover the first sound guiding hole 1223.

In some embodiments, the rigid support 121 may protrude at a position close to the first microphone element 1312 within the sound guiding channel 12241 to form a convex surface opposite to the first microphone element 1312, such that the waterproof mesh 140 may be sandwiched between the first microphone element 1312 and the convex surface. In some embodiments, the waterproof mesh 140 may be directly bonded to the periphery of the first microphone element 1312. The specific setting manner of the waterproof mesh 140 may not be limited herein.

In addition to the waterproof effect of the first microphone element 1312, the waterproof mesh 140 may also have functions such as sound transmission. Such sound transmission function may avoid adversely affecting the sound receiving effect of a sound receiving area 13121 of the first microphone element 1312.

In some embodiments, the cover 120 may include a strip shape. A main axis of the first sound guiding hole 1223 and a main axis of the sound receiving area 13121 of the first microphone element 1312 may be spaced from each other in a width direction of the cover 120. The main axis of the sound receiving area 13121 of the first microphone element 1312 may refer to a main axis of the sound receiving area 13121 of the first microphone element 1312 in the width direction of the cover 120, such as the axis n as shown in FIG. 64 The main axis of the first sound guiding hole 1223 may be the axis m as shown in FIG. 64.

It should be noted that, due to the need of the circuit component 130, the first microphone element 1312 may be disposed at a first position of the first circuit board 131. When the first sound guiding hole 1223 is set, the first sound guiding hole 1223 may be disposed at a second position of the cover 120 due to requirements such as beauty and convenience. In some embodiments, as the main axis of the first sound guiding hole 1223 and the main axis of the sound receiving area 13121 of the first microphone element 1312 may be spaced from each other in the width direction of the cover 120, the sound input through the first sound guiding hole 1223 may not be able to reach the sound receiving area 13121 of the first microphone element 1312 along a straight path.

In some embodiments, in order to guide the sound signal to the first microphone element 1312 through the first sound guiding hole 1223, the sound guiding channel 12241 may be set in a curved shape.

In some embodiments, the main axis of the first sound guiding hole 1223 may be in the middle of the cover 120 in the width direction of the cover 120.

In some embodiments, the cover 120 may be a part of the housing of the electronic device. In order to meet an overall aesthetic requirement of the electronic device, the first sound guiding hole 1223 may be disposed in the middle in the width direction of the cover body 120, such that the first sound guiding hole 1223 looks more symmetrical and meets the visual requirements of people.

In some embodiments, the guide channel 12241 may be set to have a stair shape along the cross section along B-B axis as shown in FIG. 58, such that the sound signal introduced by the first sound guiding hole 1223 may be transmitted to the first microphone element 1312 through the stair-shaped sound guiding channel 12241 and be received by the first microphone element 1312.

Figure 65:
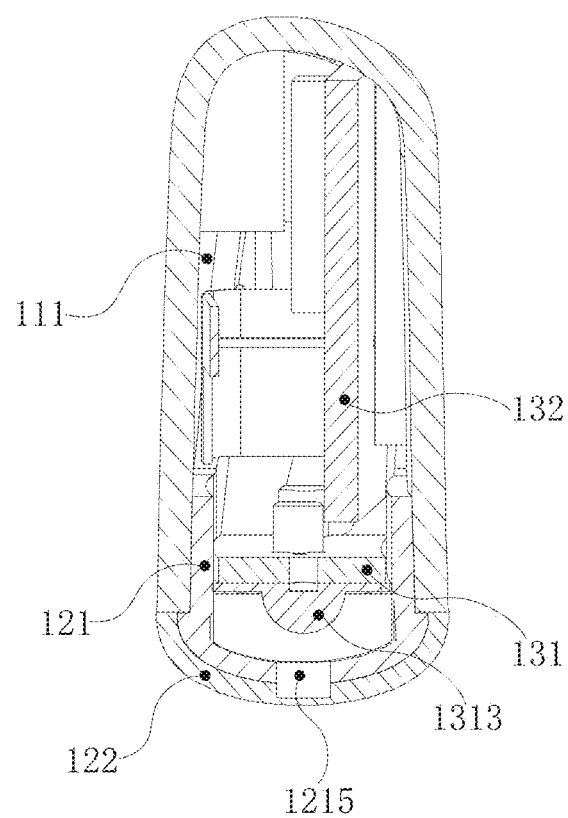
FIG. 65 is a schematic diagram illustrating an exemplary cross-sectional view of the electronic component in an assembled state along C-C axis in FIG. 58 according to some embodiments of the present disclosure.

FIG. 65 is a schematic diagram illustrating an exemplary cross-sectional view of the electronic component in an assembled state along C-C axis in FIG. 58 according to some embodiments of the present disclosure. In connection with FIG. 58 and FIG. 65, in some embodiments, the electronic component may further include a light emitting element 1313. The light emitting element 1313 may be set on the first circuit board 131 of the circuit component 130 to be accommodated in the cavity 111. For example, the light emitting element 1313 may be arranged on the first circuit board 131 in a certain arrangement together with the switch 1311 and the first microphone element 1312.

In some embodiments, a light emitting hole 1215 corresponding to the light emitting element 1313 may be set on the rigid support 121. The cover layer 122 may cover the light emitting hole 1215. The thickness of a region of the cover layer 122 corresponding to the light emitting hole 1215 may be set to allow light generated by the light emitting element 1313 to be transmitted through the cover layer 122.

In some embodiments, in situations of covering the light emitting hole 1215, the cover layer 122 may transmit the light emitted from the light emitting element 1313 to the outside of the electronic component through certain means. In some embodiments, the thickness of the cover layer 122 corresponding to an entire region or a part of region of the light emitting hole 1215 may be less than the thickness of the cover layer 122 corresponding to an outer region of the light emitting hole 1215, such that the light emitted by the light emitting element 1313 may pass through the light emitting hole 1215 and be transmitted through the cover layer 122. Of course, other manners may be used to enable the region where the cover layer 122 covers the light hole 1215 to transmit the light, which is not specifically limited herein.

In some embodiments, on the basis of covering the light emitting hole 1215 corresponding to the light emitting element 1313, the cover layer 122 may further be set to enable the light emitted by the light emitting element 1313 to be transmitted from the cover layer 122 to the outside of the electronic component. Therefore, the light emitting element 1313 may be sealed by the cover layer 122 without affecting the light emitting function of the electronic component, so as to improve the sealing performance and waterproof performance of the electronic component.

It should be noted that the above description of the electronic components is merely for illustrative purposes, and not intended to limit the scope of the present disclosure. For those skilled in the art, various changes and modifications may be made according to the description of the present disclosure. For example, the number (or count) of openings may be one or more, which is not limited herein. As another example, the number (or count) of switches may be one or more. When the number (or count) of switches is more than one, the switches may be arranged on the first circuit board 131 at intervals. All such modifications are within the scope of the present disclosure.

The beneficial effects that the present disclosure may include but are not limited to: (1) open coupling between the earphone and the ear hole may be achieved, avoiding the problems of ear hearing loss and hidden safety hazards caused by the user wearing the earphone for a long time; (2) a better sound output effect may be realized by setting the high-frequency two point sources and the low-frequency two point sources (the sound may be output in different frequency bands); (3) the open earphone may have a stronger effect of reducing sound leakage in higher frequency bands by setting two point sources with different distances; (4) the circuit housing may be firmly connected to the protective casing as being closely covered by the protective casing, which improves the waterproof performance of the open earphone; (5) the elastic pad may be covered on the outside of the button hole, which avoids external liquid from entering the inside of the circuit housing to achieve the waterproof performance of the buttons; (6) a glue groove including a plurality of mounting holes may be set on the outside surface of the circuit housing. A sealant may be pasted on the glue groove to make the housing casing firmly connect to the circuit housing on the periphery of the mounting holes by the sealant. Thereby, the external liquid may be prevented from entering the housing casing through holes, further improving the waterproof performance of the open earphone; (7) the soft cover layer may be beneficial to fit the gap between the support rob and the accommodating body, which improves the sealing performance and the waterproof performance of the earphone. It should be noted that different embodiments may have different beneficial effects. In different embodiments, the possible beneficial effects may include any one or more combination of above described beneficial effects, or any other potential beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. An open earphone, comprising:
   a housing having an ear hook structure, wherein the housing is configured to be hung on an ear of a user without blocking an ear canal of the user;
   at least one acoustic driver configured to generate sound that is emitted from at least one pair of sound guiding holes, wherein the at least one acoustic driver is located in a front end of the housing which is placed before the ear of the user, and the at least one pair of sound guiding holes are located on different end surfaces of the front end of the housing, the at least one acoustic driver including a first acoustic driver and a second acoustic driver, and the at least one pair of sound guiding holes including a pair of first sound guiding holes and a pair of second sound guiding holes, wherein:
      the first acoustic driver emits sound within a first frequency range from the pair of first sound guiding holes through two first sound guiding tubes respectively, and
      the second acoustic driver emits sound within a second frequency range from the pair of second sound guiding holes through two second sound guiding tubes respectively, the second frequency range including a frequency higher than the first frequency range; and
   a battery configured to provide power to the at least acoustic driver, wherein the battery is located at a back end of the housing which is placed behind the ear of the user.

2. The open earphone of claim 1, wherein one sound guiding hole of the at least one pair of sound guiding holes is located closer to the ear canal of the user than other one sound guiding hole of the at least one pair of sound guiding holes.

3. The open earphone of claim 1, wherein the housing is designed as a waterproof structure.

4. The open earphone of claim 1, wherein the housing is made of a plastic material.

5. The open earphone of claim 1, wherein one of the at least one pair of sound guiding holes is set to face the ear of the user.

6. The open earphone of claim 5, wherein the open earphone transmits sound to the ear of the user through the at least one pair of sound guiding holes via air.

7. The open earphone of claim 1, wherein the first frequency range includes a frequency lower than 650 Hz and the second frequency range includes a frequency higher than 1000 Hz.

8. The open earphone of claim 1, wherein the first frequency range and the second frequency range overlap each other.

9. The open earphone of claim 1, wherein
   the pair of first guiding holes are spaced apart from each other by a first distance, and
   the pair of second guiding holes are spaced apart from each other by a second distance, the first distance being greater than the second distance.

10. The open earphone of claim 9, wherein the first distance is not greater than 40 mm and the second distance is not greater than 7 mm.

11. The open earphone of claim 1, wherein a center point of one of the first sound guiding holes or the second sound guiding holes is not greater than 10 cm from a center point of the ear canal of the user.

12. The open earphone of claim 1, wherein a radius of the first guiding tubes or the second guiding tubes is between 1.75 mm and 5 mm.

13. The open earphone of claim 1, wherein a length of the first guiding tubes or the second guiding tubes is not greater than 100 mm.

14. The open earphone of claim 1, wherein a length-diameter ratio of the first guiding tubes or the second guiding tubes is not greater than 200 mm.

15. The open earphone of claim 1, wherein the sounds emitted from the pair of first sound guiding holes or the pair of second sound guiding holes are in opposite phases.

16. The open earphone of claim 1, wherein the open earphone further includes a mesh disposed in a sound guiding channel of the open earphone.

17. The open earphone of claim 1, wherein the open earphone further includes a microphone located in the front end of the housing.

18. The open earphone of claim 1, wherein the open earphone further includes a Bluetooth module for connecting the open earphone and other devices, wherein the Bluetooth module is located in the back end of the housing.

19. A method for improving sound quality of an open earphone, comprising:
   providing an open earphone, the open earphone including:
      a housing having an ear hook structure, wherein the housing is configured to be hung on an ear of a user without blocking an ear canal of the user;
   at least one acoustic driver configured to generate sound that is emitted from at least one pair of sound guiding holes, wherein the at least one acoustic driver is located in a front end of the housing which is placed before the ear of the user, and the at least one pair of sound guiding holes are located on different end surfaces of the front end of the housing, the at least one acoustic driver including a first acoustic driver and a second acoustic driver, and the at least one pair of sound guiding holes including a pair of first sound guiding holes and a pair of second sound guiding holes, wherein:
      the first acoustic driver emits sound within a first frequency range from the pair of first sound guiding holes through two first sound guiding tubes respectively, and
      the second acoustic driver emits sound within a second frequency range from the pair of second sound guiding holes through two second sound guiding tubes respectively, the second frequency range including a frequency higher than the first frequency range; and
   a battery configured to provide power to the at least acoustic driver, wherein the battery is located at a back end of the housing which is placed behind the ear of the user.

* * * * *